(12) United States Patent
Akutsu et al.

(10) Patent No.: US 11,941,255 B2
(45) Date of Patent: Mar. 26, 2024

(54) STORAGE SYSTEM AND DATA MANAGEMENT METHOD

(71) Applicant: Hitachi, Ltd., Tokyo (JP)

(72) Inventors: Hiroaki Akutsu, Tokyo (JP); Mikio Fukuoka, Tokyo (JP); Eijyu Katsuragi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/717,267

(22) Filed: Apr. 11, 2022

(65) Prior Publication Data

US 2022/0236891 A1  Jul. 28, 2022

Related U.S. Application Data

(60) Division of application No. 16/734,546, filed on Jan. 6, 2020, now Pat. No. 11,327,661, which is a continuation of application No. 16/228,940, filed on Dec. 21, 2018, now Pat. No. 10,528,274, which is a continuation of application No. 14/806,094, filed on Jul. 22, 2015, now Pat. No. 10,168,919, which is a
(Continued)

(51) Int. Cl.
*G06F 3/06* (2006.01)

(52) U.S. Cl.
CPC .......... *G06F 3/0619* (2013.01); *G06F 3/0617* (2013.01); *G06F 3/0631* (2013.01); *G06F 3/0665* (2013.01); *G06F 3/0685* (2013.01); *G06F 3/0689* (2013.01)

(58) Field of Classification Search
None
See application file for complete search history.

(56) References Cited

U.S. PATENT DOCUMENTS 8,935,493 B1   1/2015 Dolan et al.
9,026,765 B1   5/2015 Marshak et al.
(Continued)

FOREIGN PATENT DOCUMENTS

CN   102640120 A   8/2012
CN   102799543 A   11/2012
(Continued)

OTHER PUBLICATIONS

International Search Report of PCT/JP2013/051671, dated Feb. 26, 2013.
(Continued)

*Primary Examiner* — Michael Alsip
(74) *Attorney, Agent, or Firm* — MATTINGLY & MALUR, PC

(57) ABSTRACT

A storage apparatus includes a plurality of storage devices, and a control unit for providing a predetermined storage area of the plurality of storage devices to the host computer as a virtual volume group including one or more virtual volumes. The control unit configures one or more data sets having one or more redundancy levels from the plurality of storage devices, provides a storage area of a storage pool including the plurality of data sets to a part of a storage area of the virtual volume, limits a combination of the storage devices configuring the data sets to be assigned to the virtual volume to a given number of combinations of two combinations or more, uniformly distributes the storage devices, and uses a given number of different combinations of the storage devices to be assigned to the virtual volume in units of the virtual volume group.

5 Claims, 39 Drawing Sheets

Related U.S. Application Data continuation of application No. PCT/JP2013/051671, filed on Jan. 25, 2013.

(56) References Cited

U.S. PATENT DOCUMENTS

| | | |
|---|---|---|
| 2009/0292870 A1 | 11/2009 | Sambe et al. |
| 2010/0023685 A1 | 1/2010 | Ikejiri et al. |
| 2010/0107003 A1 | 4/2010 | Kawaguchi |
| 2011/0231594 A1 | 9/2011 | Sugimoto et al. |

FOREIGN PATENT DOCUMENTS

| | | |
|---|---|---|
| JP | 2009-282800 A | 12/2009 |
| JP | 2010-33261 A | 2/2010 |
| JP | 2010-102695 A | 5/2010 |
| JP | 2012-523594 A | 10/2012 |

OTHER PUBLICATIONS

Chinese Office Action received in corresponding Chinese Application No. 201380071175.5 dated Mar. 20, 2017.

FIG.8
POOL MANAGEMENT TABLE

| POOL# | Tier# | DG# | VPG# |
|---|---|---|---|
| 0 | 1 | 0 | 0 |
| | | | ... |
| | | | 3 |
| | 2 | 1 | 8 |
| | | | ... |
| | | | 23 |
| | 3 | 2 | 32 |
| | | | ... |
| | | | 63 |
| 1 | 1 | 3 | 96 |
| | | | ... |
| | | | 127 |

701

7011 7012 7013 7014

FIG.9
VIRTUAL SPARE MANAGEMENT TABLE

| DG# | V SpareDrive# | STATUS | COPY POINTER |
|---|---|---|---|
| 0 | 0 | IN USE | 0x00000300 |
| | ... | ... | ... |
| | 3 | UNUSED | INVALID VALUE |
| 1 | 4 | UNUSED | INVALID VALUE |
| | 5 | UNUSED | INVALID VALUE |
| | 6 | UNUSED | INVALID VALUE |
| 2 | 7 | UNUSED | INVALID VALUE |

DRIVE STATUS TABLE

| PPG# | PDEV# | STATUS |
|---|---|---|
| 0 | 0 | NORMAL |
|  | 1 | NO ACCESS |
|  | ... | ... |
|  | 7 | NORMAL |
| 1 | 0 | NORMAL |
|  | 1 | NORMAL |
|  | ... | ... |
|  | 7 | NORMAL |

CACHE MANAGEMENT TABLE (DIRTY BIT)

| VVOL# | VOLUME SLOT NUMBER | CACHE SLOT NUMBER | DESTAGE INHIBITION FLAG | DIRTY BITMAP |
|---|---|---|---|---|
| 2 | 0 | 5(DATA), 7(PARITY) | OFF | 101000101 ... |
|  | 1 | – | – | – |
|  | ... | ... | ... | ... |
|  | 999 | 6(DATA), 2(PARITY) | OFF | 010110010... |
| 3 | 0 | 4(DATA), 3(PARITY) | OFF | 001000001 ... |
|  | 1 | – | – | – |
|  | ... | ... | ... | ... |
|  | 499 | – | – | – |

PAGE MAPPING TABLE

| POOL NUMBER | VVOL# | Page# | VPG# | Page# |
|---|---|---|---|---|
| 0 | 1 | 0 | 1 | 0 |
|  |  | 1 | 1 | 1 |
|  |  | 2 | 1 | 33 |
|  |  | 3 | Not-Allocate |  |
|  |  | ... | ... | ... |
|  | 2 | 0 | 2 | 0 |
|  |  | 1 | 2 | 3 |
|  |  | ... | ... | ... |
| 7051 | 7052 | 7053 | 7054 | 7055 |

PAGE ASSIGNMENT PRIORITY TABLE

| VVOL# | PRIORITY | VPG# |
|---|---|---|
| 1 | 0 | 2 |
|  | 1 | 0 |
|  | 2 | 1 |
|  | 3 | 3 |
|  | ... | ... |
| 2 | 0 | 4 |
|  | 1 | 2 |
|  | ... | ... |
| 7061 | 7062 | 7063 |

V Cycle MAPPING TABLE (V2P)

| Index# | | Value | |
|---|---|---|---|
| VPG# | V Cycle# | PPG# | P Cycle# |
| 0 | 0 | 1 | 2 |
| 0 | 1 | 0 | 0 |
| 0 | 2 | 2 | 2 |
| 1 | 0 | 0 | 1 |
| 1 | 1 | 1 | 0 |
| 1 | 2 | 2 | 1 |
| 2 | 0 | 2 | 0 |
| 2 | 1 | 1 | 1 |
| 2 | 2 | 0 | 2 |

P Cycle MAPPING TABLE (REVERSE CONVERSION P2V)

| Index# | | Value | |
|---|---|---|---|
| PPG# | P Cycle# | VPG# | V Cycle# |
| 0 | 0 | 0 | 1 |
| 0 | 1 | 1 | 0 |
| 0 | 2 | 2 | 2 |
| 1 | 0 | 1 | 1 |
| 1 | 1 | 2 | 2 |
| 1 | 2 | 0 | 0 |
| 2 | 0 | 2 | 0 |
| 2 | 1 | 1 | 2 |
| 2 | 2 | 0 | 2 |

SEED TABLE

| Index# | | Value |
|---|---|---|
| VPG# | V CDEV# | SEED |
| 0 | 0 | 0 |
| 0 | 1 | 2 |
| 0 | 2 | 1 |
| 0 | 3 | 2 |
| 1 | 0 | 1 |
| 1 | 1 | 2 |
| 1 | 2 | 0 |
| 1 | 3 | 1 |
| 2 | 0 | 1 |
| 2 | 1 | 1 |
| 2 | 2 | 2 |
| 2 | 3 | 0 |

PRE-FETCH EXECUTION DRIVE LIST

| PPG# | PDEV# | I/O ISSUE COUNT |
|---|---|---|
| 0 | 0 | 1 |
|   | 1 | 2 |
|   | ... | ... |
|   | 7 | 1 |
| 1 | 8 | 3 |
|   | 9 | 2 |
|   | ... | ... |
|   | 15 | 2 |

SPARE CONVERSION TABLE

| Index# | | Value | |
|---|---|---|---|
| V spare Drive# | P Cycle# | PPG# | P CDEV# |
| 0 | 0 | 1 | 2 |
| 0 | 1 | 0 | 0 |
| 0 | 2 | 2 | 2 |
| 1 | 0 | 0 | 1 |
| 1 | 1 | 1 | 0 |
| 1 | 2 | 2 | 1 |

SPARE REVERSE CONVERSION TABLE

| Index# | | Value | |
|---|---|---|---|
| PPG# | P CDEV# | V spare Drive# | P Cycle# |
| 0 | 0 | 1 | 2 |
| 0 | 1 | 0 | 0 |
| 0 | 2 | 2 | 2 |
| 1 | 0 | 0 | 1 |
| 1 | 1 | 1 | 0 |
| 1 | 2 | 2 | 1 |
| 2 | 0 | 2 | 0 |
| 2 | 1 | 1 | 1 |
| 2 | 2 | 0 | 2 |

REBUILD OPERATION EXAMPLE
(WHEN 1 DRIVE HAS MALFUNCTIONED)

REBUILD OPERATION EXAMPLE
(WHEN 2 DRIVES HAVE MALFUNCTIONED)

FIG.29C

WHEN 3 DRIVES HAVE SIMULTANEOUSLY MALFUNCTIONED (CASE OF NO LOSS)

| | PPG#0 | | | | PPG#1 | | | | PPG#2 | | | |
|---|---|---|---|---|---|---|---|---|---|---|---|---|
| S | S | S | S | S | S | S | S | S | S | S | S | |
| 0-1 | 0-3 | 0-2 | 0-0 | 1-3 | 1-1 | 1-2 | 1-0 | 1-2 | 1-0 | 1-1 | 1-3 | |
| 2-2 | 2-1 | 2-0 | 2-3 | 2-0 | 2-3 | 2-2 | 2-1 | 2-1 | 2-0 | 2-3 | 2-2 | |
| 1-1 | 1-3 | 1-0 | 1-2 | 0-3 | 0-1 | 0-0 | 0-2 | 0-2 | 0-0 | 0-3 | 0-1 | |
| 2-3 | 2-2 | 2-1 | 2-0 | 0-0 | 0-2 | 0-1 | 0-3 | 1-0 | 1-2 | 1-3 | 1-1 | |
| S | S | S | S | S | S | S | S | S | S | S | S | |
| 0-5 | 0-7 | 0-6 | 0-4 | 1-7 | 1-5 | 1-6 | 1-4 | 1-6 | 1-4 | 1-5 | 1-7 | |
| 2-6 | 2-5 | 2-4 | 2-7 | 2-4 | 2-7 | 2-6 | 2-5 | 2-5 | 2-4 | 2-7 | 2-6 | |
| 1-5 | 1-7 | 1-4 | 1-6 | 0-7 | 0-5 | 0-4 | 0-6 | 0-6 | 0-4 | 0-7 | 0-5 | |
| 2-7 | 2-6 | 2-5 | 2-4 | 0-4 | 0-6 | 0-5 | 0-7 | 1-4 | 1-6 | 1-7 | 1-5 | |

180a 180b 180c

WHEN 3 DRIVES HAVE SIMULTANEOUSLY MALFUNCTIONED (CASE OF LOSS)

| | PPG#0 | | | | PPG#1 | | | | PPG#2 | | | |
|---|---|---|---|---|---|---|---|---|---|---|---|---|
| S | S | S | S | S | S | S | S | S | S | S | S | |
| 0-1 | 0-3 | 0-2 | 0-0 | 1-3 | 1-1 | 1-2 | 1-0 | 1-2 | 1-0 | 1-1 | 1-3 | |
| 2-2 | 2-1 | 2-0 | 2-3 | 2-0 | 2-3 | 2-2 | 2-1 | 2-1 | 2-0 | 2-3 | 2-2 | |
| 1-1 | 1-3 | 1-0 | 1-2 | 0-3 | 0-1 | 0-0 | 0-2 | 0-2 | 0-0 | 0-3 | 0-1 | |
| 2-3 | 2-2 | 2-1 | 2-0 | 0-0 | 0-2 | 0-1 | 0-3 | 1-0 | 1-2 | 1-3 | 1-1 | |
| S | S | S | S | S | S | S | S | S | S | S | S | |
| 0-5 | 0-7 | 0-6 | 0-4 | 1-7 | 1-5 | 1-6 | 1-4 | 1-6 | 1-4 | 1-5 | 1-7 | |
| 2-6 | 2-5 | 2-4 | 2-7 | 2-4 | 2-7 | 2-6 | 2-5 | 2-5 | 2-4 | 2-7 | 2-6 | |
| 1-5 | 1-7 | 1-4 | 1-6 | 0-7 | 0-5 | 0-4 | 0-6 | 0-6 | 0-4 | 0-7 | 0-5 | |
| 2-7 | 2-6 | 2-5 | 2-4 | 0-4 | 0-6 | 0-5 | 0-7 | 1-4 | 1-6 | 1-7 | 1-5 | |

180a 180b    180d

FIG.30
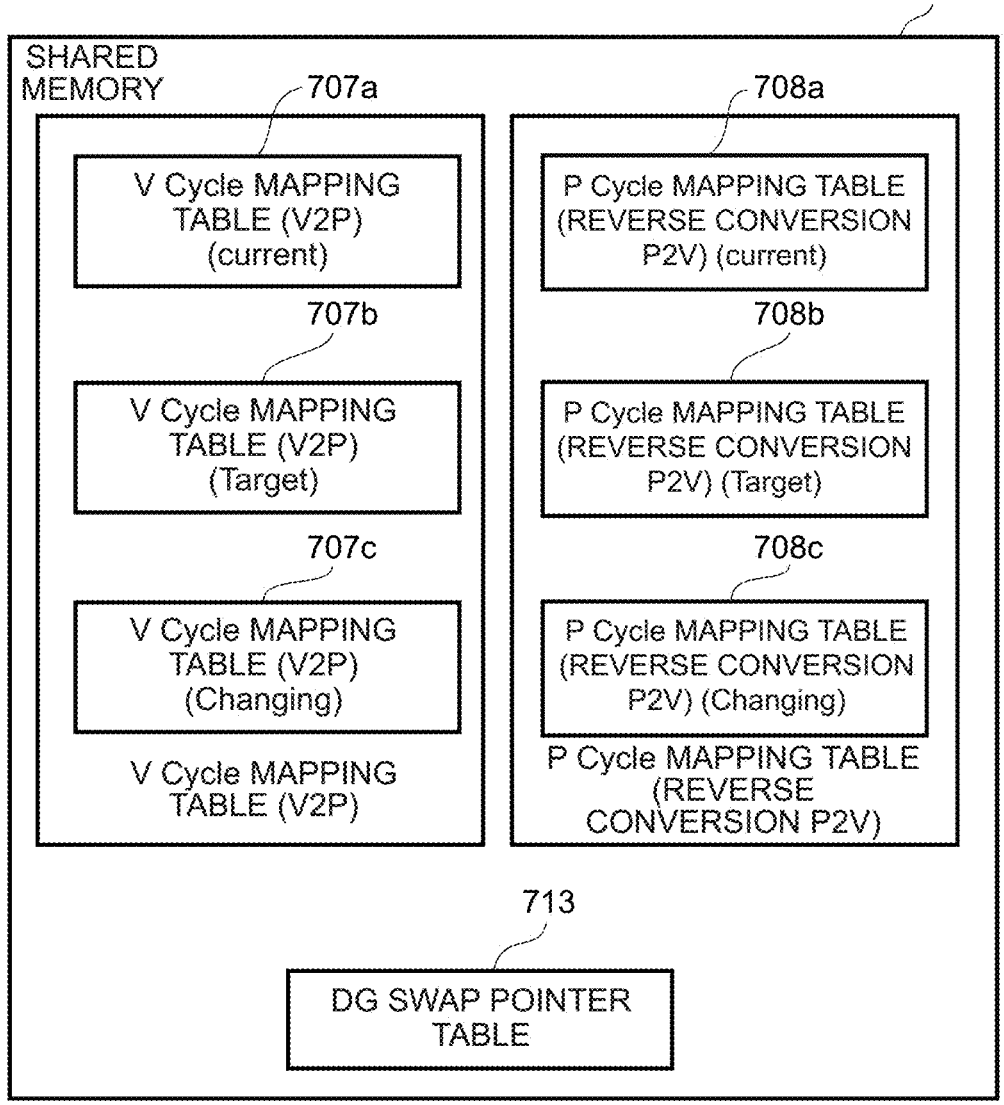
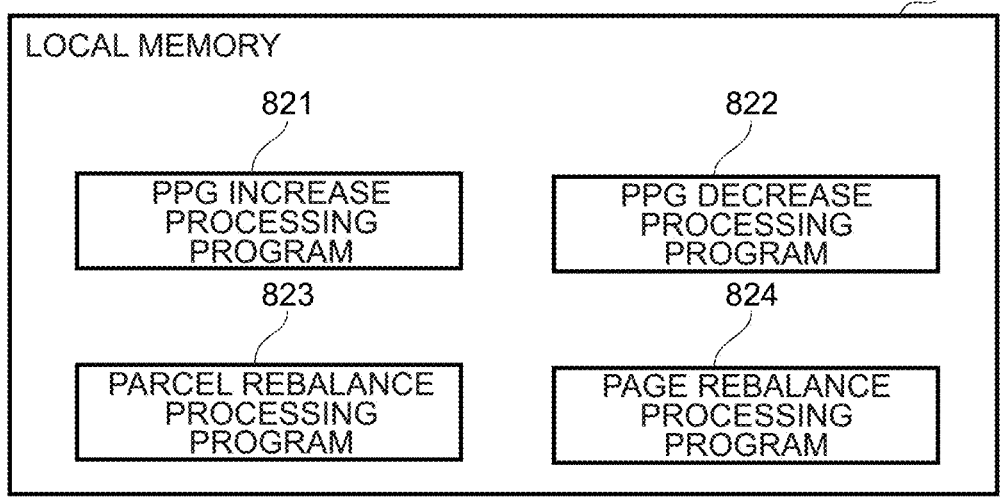

FIG.31

DG SWAP POINTER TABLE

| POOL# | Tier# | DG# | DG SWAP POINTER |
|---|---|---|---|
| 0 | 1 | 0 | 0x00000030 |
|   | 2 | 1 | INVALID VALUE |
|   | 3 | 2 | INVALID VALUE |
| 1 | 1 | 3 | INVALID VALUE |

EXAMPLE (INCREASE)

FIG.40B

·EXAMPLE (DECREASE)

STORAGE SYSTEM AND DATA MANAGEMENT METHOD

TECHNICAL FIELD

The present invention relates to a storage system in which a RAID (Redundant Array of Independent Disks) group is configured from a plurality of storage apparatuses, and can be suitably applied to a storage system and a data management method for managing data in the RAID group.

BACKGROUND ART

Conventionally, the scheme of configuring a RAID (Redundant Array of Independent Disks) group from a plurality of storage apparatuses in a storage system and providing a logical volume created based on the RAID group to a higher-level device (for example, host computer) has been available.

As technology related to RAID, PTL 1 discloses technology related to distributed RAID. Distributed RAID is technology of managing a stripe column including normal data and redundant data for restoring the normal data by distributing the stripe column to a plurality of storage apparatuses providing a storage area to a capacity pool.

CITATION LIST

Patent Literature

[PTL 1]
Specification of U.S. Patent Application Publication No. 2010/0107003

SUMMARY OF INVENTION

Technical Problem

With a general storage apparatus, when any one of the storage apparatuses configuring the RAID group storing redundant data malfunctions, data stored in the malfunctioned storage apparatus is restored (rebuilt) using redundant data or the like. In recent years, the capacity of storage apparatuses is increasing even more, and there is a problem in that much time is required for rebuilding the data. PTL 1 discloses technology for managing data by distributing such data in a plurality of storage apparatuses providing a storage area to a capacity pool. According to PTL 1, the time required for rebuilding the data can be shortened by distributing the rebuilding load.

Nevertheless, when a malfunction occurs with a drive in the capacity pool that exceeds the redundancy level (for example, 1 in the case of RAID 1 and 2 in the case of RAID 6), the data loss area spreads to the entire virtual volume corresponding to the capacity pool, and there is a problem in that much time is required for restoring data from the backup data. As a straightforward method of resolving this problem, considered may be the method of localizing the influence of data loss by dividing the pool into a plurality of pools, but there is a problem in that the load balancing performance of the host I/O or the load balancing performance of rebuilding data will deteriorate.

The present invention was devised in view of the foregoing points, and an object of this invention is to propose a storage system and a data management method capable of localizing the influence of data loss, and preventing the deterioration in the load balancing performance of the host I/O or the load balancing performance of rebuilding data.

Solution to Problem

In order to achieve the foregoing object, the present invention provides a storage apparatus which is connected, via a network, with a host apparatus that requests I/O of data, comprising a plurality of storage devices, and a control unit for providing a predetermined storage area of the plurality of storage devices to the host computer as a virtual volume group including one or more virtual volumes, wherein the control unit configures one or more data sets having one or more redundancy levels from the plurality of storage devices, provides a storage area of a storage pool including the plurality of data sets to a part of a storage area of the virtual volume, limits a combination of the storage devices configuring the data sets to be assigned to the virtual volume to a given number of combinations of two combinations or more, uniformly distributes the storage devices appearing in the given number of combinations to the storage area in the storage pool, and uses a given number of different combinations of the storage devices to be assigned to the virtual volume in units of the virtual volume group.

According to the foregoing configuration, the combination of drives configuring the page to be assigned to the virtual volume is limited to a given number of combinations of two combinations or more (this quantity is hereinafter represented as "c"), and the drive combination is defined so that the drives are uniformly distributed to the drives in the pool. In addition, a different combination (quantity c is the same) is used for each virtual volume or for each virtual volume aggregate.

For example, with respect to an R-number of physical parity groups (PPG), an R-number of virtual parity groups (VPG) corresponding thereto are provided. With the virtual parity groups (VPG), data placement is performed in a given pattern at c-number of cycles (c types of drive combinations, cumulative parcel placement per drive in c types of drives is not greater than a ceiling (c/R), c types of drive combinations are randomly changed for each virtual parity group (VPG) (total of R ways)). In addition, with the virtual volumes, a page is preferentially assigned to a specific virtual parity group (VPG) based on predetermined priority.

Consequently, the data loss area can be localized to a specific virtual volume while maintaining not only the host I/O load, but also the balancing of the rebuilding load.

Advantageous Effects of Invention

According to the present invention, it is possible to localize the influence of data loss, prevent the deterioration in the host I/O or the load balancing performance during rebuilding of data, and thereby improve the availability of the overall storage system.

BRIEF DESCRIPTION OF DRAWINGS

FIG. 8 is a chart showing an example of the pool management table according to the first embodiment.

FIG. 9 is a chart showing an example of the virtual spare management table according to the first embodiment.

FIG. 10 is a chart showing an example of the drive status table according to the first embodiment.

FIG. 11 is a chart showing an example of the cache management table according to the first embodiment.

FIG. 12 is a chart showing an example of the page mapping table according to the first embodiment.

FIG. 13 is a chart showing an example of the priority table according to the first embodiment.

FIG. 14A is a chart showing an example of the data mapping table according to the first embodiment.

FIG. 14B is a chart showing an example of the data mapping table according to the first embodiment.

FIG. 15 is a chart showing an example of the SEED table according to the first embodiment.

FIG. 16 is a chart showing an example of the pre-fetch execution drive list according to the first embodiment.

FIG. 17A is a chart showing an example of the spare conversion table according to the first embodiment.

FIG. 17B is a chart showing an example of the spare conversion table according to the first embodiment.

FIG. 29B is a conceptual diagram showing an example of the data mapping according to the first embodiment.

FIG. 29C is a conceptual diagram showing an example of the data mapping according to the first embodiment.

FIG. 30 is a block diagram showing the contents of the shared memory and the local memory of the computer system according to the second embodiment of the present invention.

FIG. 31 is a chart showing the contents of the DG swap pointer table according to the second embodiment.

FIG. 40A is a conceptual diagram showing a modified example of increase-based parcel mapping according to the second embodiment.

FIG. 40B is a conceptual diagram showing a modified example of decrease-based parcel mapping according to the second embodiment.

DESCRIPTION OF EMBODIMENTS

One embodiment of the present invention is now explained in detail with reference to the drawings.

Note that the embodiments explained below are not intended to limit the invention pertaining to the scope of claims, and all elements and their combinations explained in the embodiments are not necessarily essential as the solution of the invention.

Note that, in the ensuing explanation, while various types of information may be explained using the expression of "aaa table", such various types of information may also be expressed as a data structure other than a table. In order to indicate the non-dependence on a data structure, "aaa table" can also be referred to as "aaa information".

Moreover, in the ensuing explanation, there are cases where processing is explained with a "program" as the subject. Since a program performs predetermined processing while using storage resources (for example, memory) and/or communication interface device (for example, port) as needed as a result of being executed by a processor (for example, CPU (Central Processing Unit)), the subject of processing may also be a program. Processing that is explained with a program as the subject may be processing that is performed by a processor or a computer (for example, management computer, host computer, storage apparatus or the like) including such a processor. Moreover, a controller may be the processor itself, or include a hardware circuit to perform a part or all of the processing to be carried out by the controller. A program may be installed in the respective controllers from a program source. A program source may be, for instance, a program distribution server or a storage media.

(1) First Embodiment

(1-1) Outline of Computer System

Figure 1:
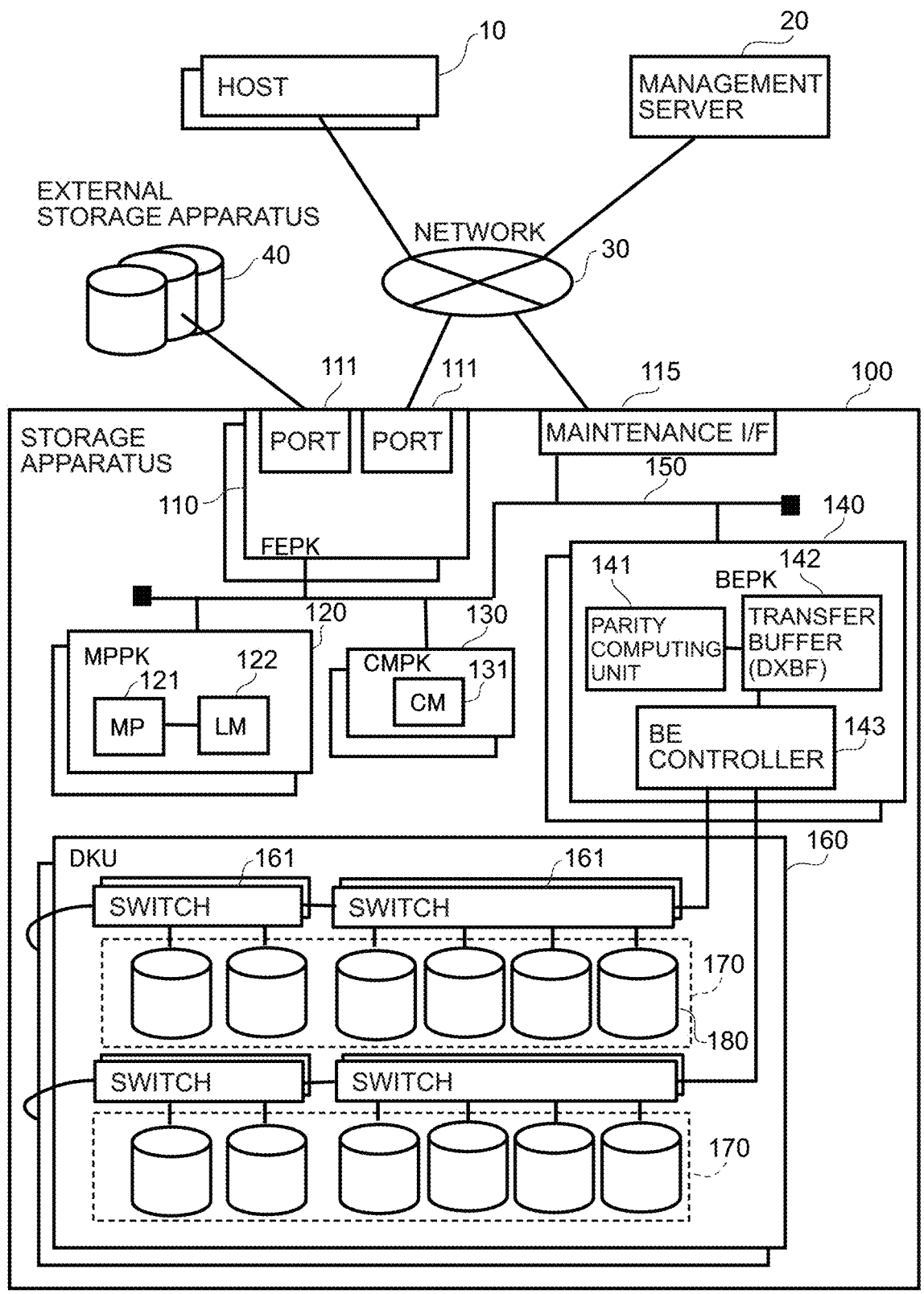
FIG. 1 is a conceptual diagram explaining the outline of the computer system according to the first embodiment of the present invention.

The outline of the computer system including the storage system is now explained with reference to FIG. 1. The storage system is configured, as shown in FIG. 1, from a higher-level storage apparatus (second storage apparatus) 100. Moreover, the storage system may also include an external storage apparatus 40 as an example of the first storage apparatus.

A DKU 160 of the higher-level storage apparatus 100 is provided with a plurality of lower-level storage apparatuses 180 as an example of the first storage apparatus. The higher-level storage apparatus 100 manages a capacity pool (hereinafter referred to as the "pool") configured from the storage areas of the plurality of lower-level storage apparatuses 180. Moreover, the higher-level storage apparatus 100 configures a RAID group by using the pool area. In other words, the higher-level storage apparatus 100 uses the plurality of lower-level storage apparatuses 180 configuring the pool area to configure the virtual parity group (VPG) as a plurality of virtual RAID groups.

The storage area of the virtual parity group is configured from a plurality of sub storage area columns. Each of the sub storage area columns extends across a plurality of storage apparatuses (lower-level storage apparatus and/or external storage apparatus) configuring the virtual parity group, and is configured from a plurality of sub storage areas corresponding to the plurality of storage apparatuses. Here, one sub storage area is referred to as a "stripe", and a column configured from a plurality of stripes is referred to as a "stripe column". The storage area of the RAID group is configured from a plurality of stripe columns.

RAID has several levels (hereinafter referred to as the "RAID levels"). For example, in RAID 5, write-target data designated by a host computer compliant with RAID 5 is divided into data of a predetermined size (hereinafter referred to as the "data units" for the sake of convenience), each of the data units is divided into a plurality of data elements, and the plurality of data elements are written in the plurality of stripes. Moreover, in RAID 5, redundant information (hereinafter referred to as the "redundant code") referred to as "parity" is generated for each of the data units in order to rebuild the data elements that can no longer be read from a storage apparatus to the malfunction of that storage apparatus, and the redundant code is also written in the stripes of the same stripe column. For example, when there are four storage apparatuses configuring the RAID group, three data elements configuring the data units are written in the three stripes corresponding to the three storage apparatuses, and the redundant code is written in the stripe of the corresponding one remaining storage apparatus. In the ensuing explanation, when the data element and the redundant code are not differentiated, there may be cases where they are both referred to as a stripe data element.

Moreover, in RAID 6, when two data elements among a plurality of data elements configuring the data units cannot be read due to a malfunction of two storage apparatuses among the plurality of storage devices configuring the RAID group or other reasons, two types of redundant code (P parity, Q parity) are generated for each of the data units so that the foregoing two data elements can be restored, and the respective redundant codes are written in the stripes of the same stripe column.

Moreover, as RAID levels other than those explained above, there are, for example, RAID 1 to 4. Moreover, as data redundancy technology, technologies such as triple mirroring (Triplication) or triple parity technique of using three parities are also available. Moreover, as the redundant code generation technology, various technologies such as Reed-Solomon coding which uses Galois operation, and EVEN-ODD are available. In this embodiment, while RAID 5, 6 are mainly explained, the present invention is not limited thereto, and can also be applied based on the substitution of the foregoing methods.

When any one of the lower-level storage apparatuses 18 among the plurality of lower-level storage apparatuses 180 malfunctions, the higher-level storage apparatus 100 restores the data elements stored in the malfunctioned storage apparatus 180, for instance, by performing the processing described below.

As the first processing, a microprocessor (indicated as MP in the drawings) 121 acquires data (for example, other data elements and parities) required for restoring the data elements stored in the malfunctioned lower-level storage apparatus 180 from the plurality of lower-level storage apparatuses 180 storing that data, and stores such data in a cache memory (CM) 131 via a transfer buffer 142 of an interface device (for example, BEPK 140). In addition, the microprocessor 121 causes a parity computing unit 141 of the BEPK 140 to restore the data elements based on the data in the cache memory (CM) 131, and stores the data elements in a predetermined lower-level storage apparatus 180.

(1-2) Hardware Configuration of Computer System

The hardware configuration of the computer system is now explained. As shown in FIG. 1, the computer system includes one or more host computers (hereinafter referred to as the "hosts") 10, a management server 20, and a higher-level storage apparatus 100. The host computers 10, the management server 20, and the higher-level storage apparatus 100 are connected via a network 30. The network 30 may be a local area network or a wide area network. Moreover, one or more external storage apparatuses 40 may also be connected to the higher-level storage apparatus 100. The external storage apparatus 40 includes one or more storage devices. The storage device is a non-volatile storage medium such as a magnetic disk, a flash memory, or other semiconductor memory.

The host 10 is, for example, a computer that executes applications, and reads data to be used in the application from the higher-level storage apparatus 100, and writes data created with the application in the higher-level storage apparatus 100.

The management server 20 is a computer for executing the management processing of managing the computer system according to inputs made by an administrator. The management server 20 receives the setting regarding the type of data restoration processing to be executed during the restoration of data based on the administrator's operation of the input device, and configures settings to cause the higher-level storage apparatus 100 to execute the received data restoration processing.

The higher-level storage apparatus 100 includes one or more front-end packages (FEPK) 110, a maintenance interface (maintenance I/F) 115, one or more microprocessor packages (MPPK) 120, one or more cache memory packages (CMPK) 130, one or more back-end packages (BEPK) 140, an internal network 150, and one or more disk units (DKU) 160. The FEPK 110, the maintenance I/F 115, the MPPK 120, the CMPK 130, and the BEPK 140 are connected via the internal network 150. The BEPK 140 is connected to the DKU 160 via paths of a plurality of systems.

The FEPK 110 is an example of the interface device, and includes one or more ports 111. The port 111 connects the higher-level storage apparatus 100 to various devices via the network 30 or the like. The maintenance I/F 115 is an interface for connecting the higher-level storage apparatus 100 to the management server 20.

The MPPK 120 includes a microprocessor (MP) 121 as an example of the first control device, and a local memory (LM) 122. The local memory 122 stores various programs and various types of information. The microprocessor 121 executes various types of processing by executing the programs stored in the local memory 122. The microprocessor 121 sends various commands (for example, read command and write command in SCSI) to the lower-level storage apparatus 180 of the DKU 160 via the BEPK 140. Moreover, the microprocessor 121 sends various commands to the external storage apparatus 40 via the FEPK 110.

The CMPK 130 includes a cache memory (CM) 131. The cache memory 131 temporarily stores data (write data) to be written in the lower-level storage apparatus 18 or the like from the host 10, and data (read data) to be read from the lower-level storage apparatus 180 by the host 10.

The BEPK 140 includes a parity computing unit 141, a transfer buffer (DXBF) 142 as an example of the second control device, and a back-end controller (BE controller) 143.

The parity computing unit 141 is, for example, a compact processor, and generates a redundant code (hereinafter referred to as the "parity") for rebuilding the data elements that can no longer be read from the lower-level storage apparatus 180 due to a malfunction thereof. For example, the parity computing unit 141 generates a P parity by taking an exclusive OR of the plurality of data elements configuring the data units for the data units of the RAID group configured in RAID 5. Moreover, the parity computing unit 141 generates a Q parity taking an exclusive OR of the respective data after additionally multiplying the plurality of data elements configuring the data units by a predetermined coefficient for the data units of the RAID group configured in RAID 6. Moreover, the parity computing unit 141 performs restoration processing of restoring any one of the data elements in the data unit based on one or more stripe data elements (data elements and/or parities) regarding that data unit.

The transfer buffer 142 temporarily stores data sent from the lower-level storage apparatus 180 or data to be sent to the lower-level storage apparatus 180. The BE controller 143 communicates various commands, write data, read data and the like to and from the lower-level storage apparatus 180 of the DKU 160.

The DKU 160 includes a plurality of lower-level storage apparatuses 180 (hereinafter also referred to as the "drives"). The lower-level storage apparatus 180 includes one or more storage devices. The storage device is a non-volatile storage medium such as a magnetic disk, a flash memory, or other semiconductor memory (PRAM, ReRAM or the like). The DKU 160 includes a plurality of groups (path groups) 170 of the plurality of lower-level storage apparatuses 180 that are connected to the BE controller 143 via the same path. The lower-level storage apparatuses 180 belonging to the same path group 170 are connected via a switch 161. The lower-level storage apparatuses 180 belonging to the same path group 170 (hereinafter referred to as the "same line of drives") can communicate directly, and, for example, various data can be sent from one lower-level storage apparatus 180 to another lower-level storage apparatus 180 belonging to the same path group 170. Note that, when a switch or power source malfunctions for some reason, the same line of drives tend to be affected more than the other line of drives.

(1-3) Logical Configuration of Computer System

Figure 2:
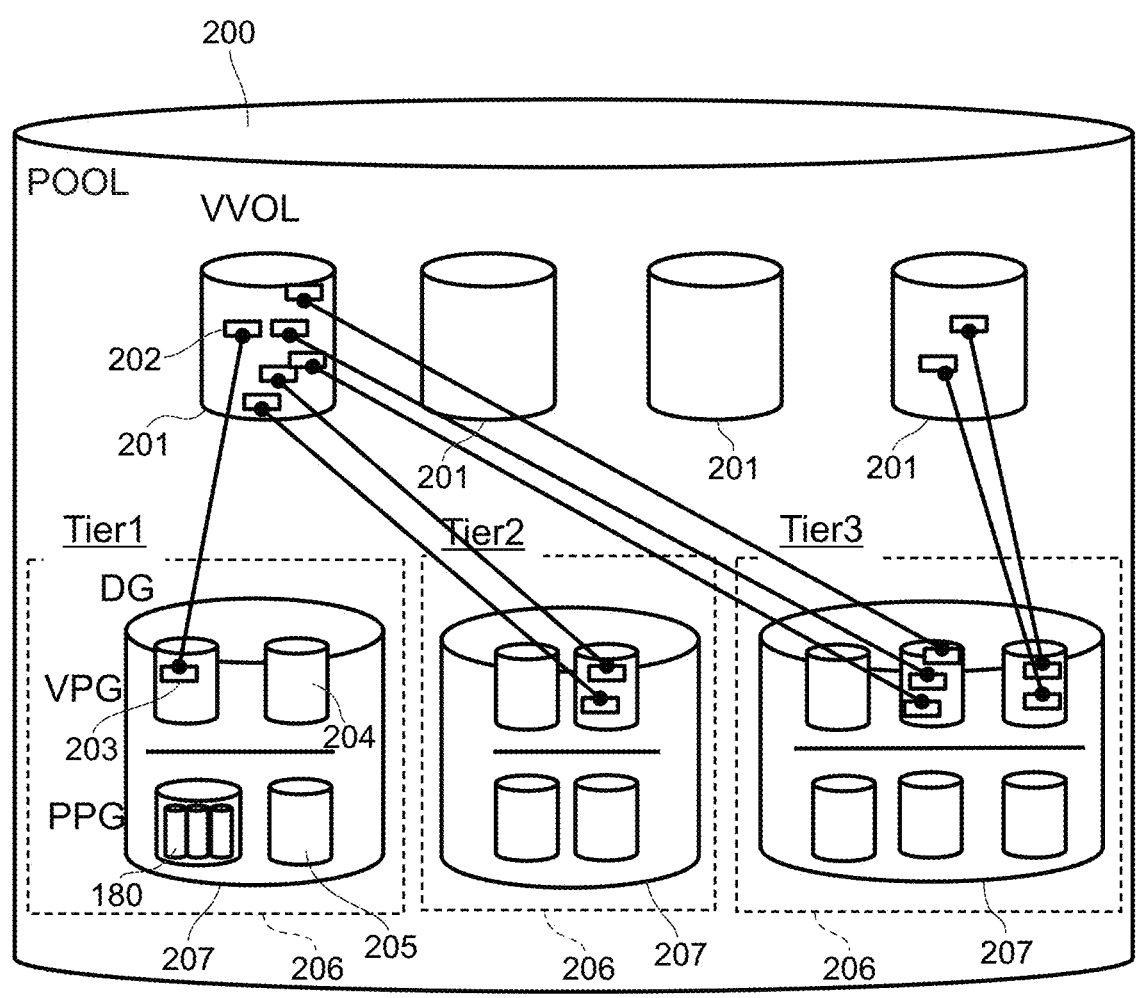
FIG. 2 is a conceptual diagram explaining the logical configuration of the computer system according to the first embodiment.

The logical configuration of the computer system is now explained. FIG. 2 is a conceptual diagram showing the logical configuration of the computer system.

The higher-level storage apparatus 100 bundles a plurality of drives 180 and configures a physical parity group (hereinafter referred to as the "physical parity group (PPG)") 205. For example, 16 drives are bundled to configure a physical parity group. The physical parity group is a unit of increasing to or decreasing from a dispersion group (DG) 207.

The dispersion group (DG) 207 bundles a plurality of physical parity groups 205 to configure a virtual parity group (VPG) 204. Here, the virtual stripe structure in the virtual parity group 204 is distributed to the drives in the physical parity group within the range of the dispersion group 207. In other words, with respect to the I/O access to the virtual parity group 204, the virtual parity group 204 is accessed by a physical drive within the range of its affiliated dispersion group 207, but is never accessed by a physical drive beyond that range. Moreover, the same number of virtual parity groups 204 and physical parity groups exist in the dispersion group, and the identifiers thereof that exist in the dispersion group are also the same. As a result of a plurality of virtual parity groups 204 being bundled, a pool 200 as an aggregate of the logical storage capacity is configured.

Moreover, as described above, the higher-level storage apparatus 100 may include, as the drives 180, for example, storage mediums such as a flash memory, a SAS drive, a SATA drive and the like which have a plurality of performances and different capacity characteristics. The classification of storage mediums according to these different characteristics is referred to as a hierarchy (Tier) 206. Since each Tier has different performance characteristics, when a dispersion group is configured across Tiers, there are cases where a low-performance drive becomes a bottleneck. Thus, a dispersion group is generally configured with the same Tier.

Moreover, a plurality of virtual volumes (VVOL) 201 exist in the pool. The virtual volume 201 is a virtual device, and is referred to and accessed by the host 10. The administrator of the higher-level storage apparatus creates a virtual volume of an arbitrary size via the maintenance interface 115. This size is not dependent on the total capacity of the actual drive 180.

Specifically, the MP 121 dynamically assigns one storage area (VPG page 203) of the virtual parity group (VPG) to one virtual storage area (VVOL page 202) of the virtual volume 201 that was I/O-accessed by the host 10. Here, for example, the access frequency is recorded for each virtual volume page 202, and a high-performance virtual parity group (VPG page belonging to the virtual parity group (VPG) of Tier 1) is assigned to a frequently accessed virtual volume page, or relocation is periodically performed by continuously monitoring the load.

Figure 3:
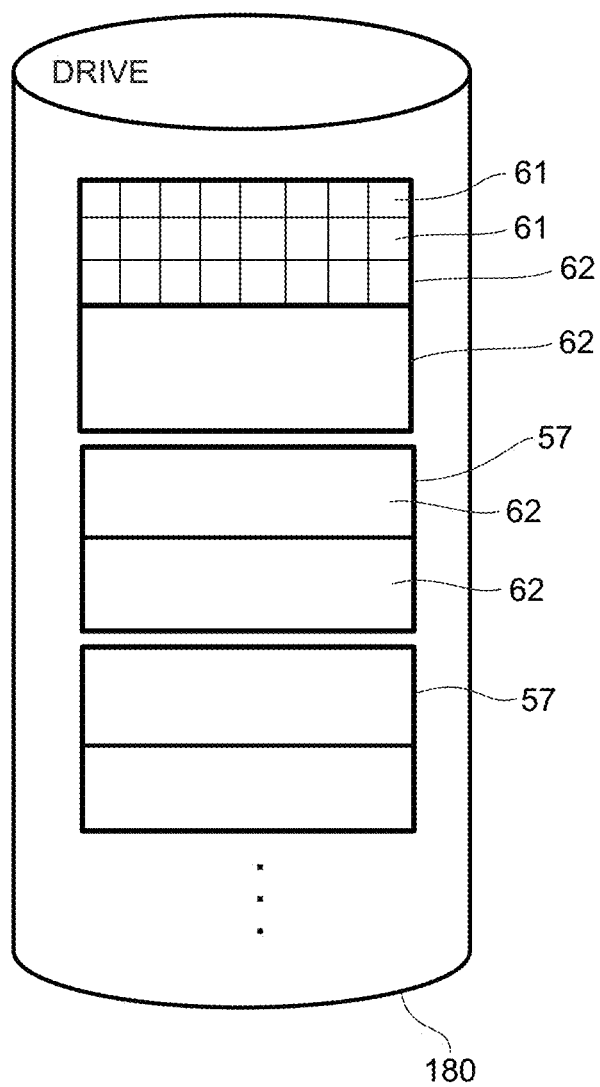
FIG. 3 is a conceptual diagram showing the data configuration of the drive according to the first embodiment.

FIG. 3 shows the data configuration diagram of the drive 180. The lower-level storage apparatus (drive) 180 can send and receive data to and from an upper-level device in units of a sub block 61, which is the minimal unit (for example, 512 B) of SCSI command processing. Moreover, a slot 62 as a management unit (for example 256, KB) upon caching data in the cache memory 131 is configured from an aggregate of a plurality of consecutive sub blocks 61. The stripe 57 is stored in a plurality of slots 62. The size of the stripe 57 is, for example, 512 KB when configured from two slots 62.

Figure 4:
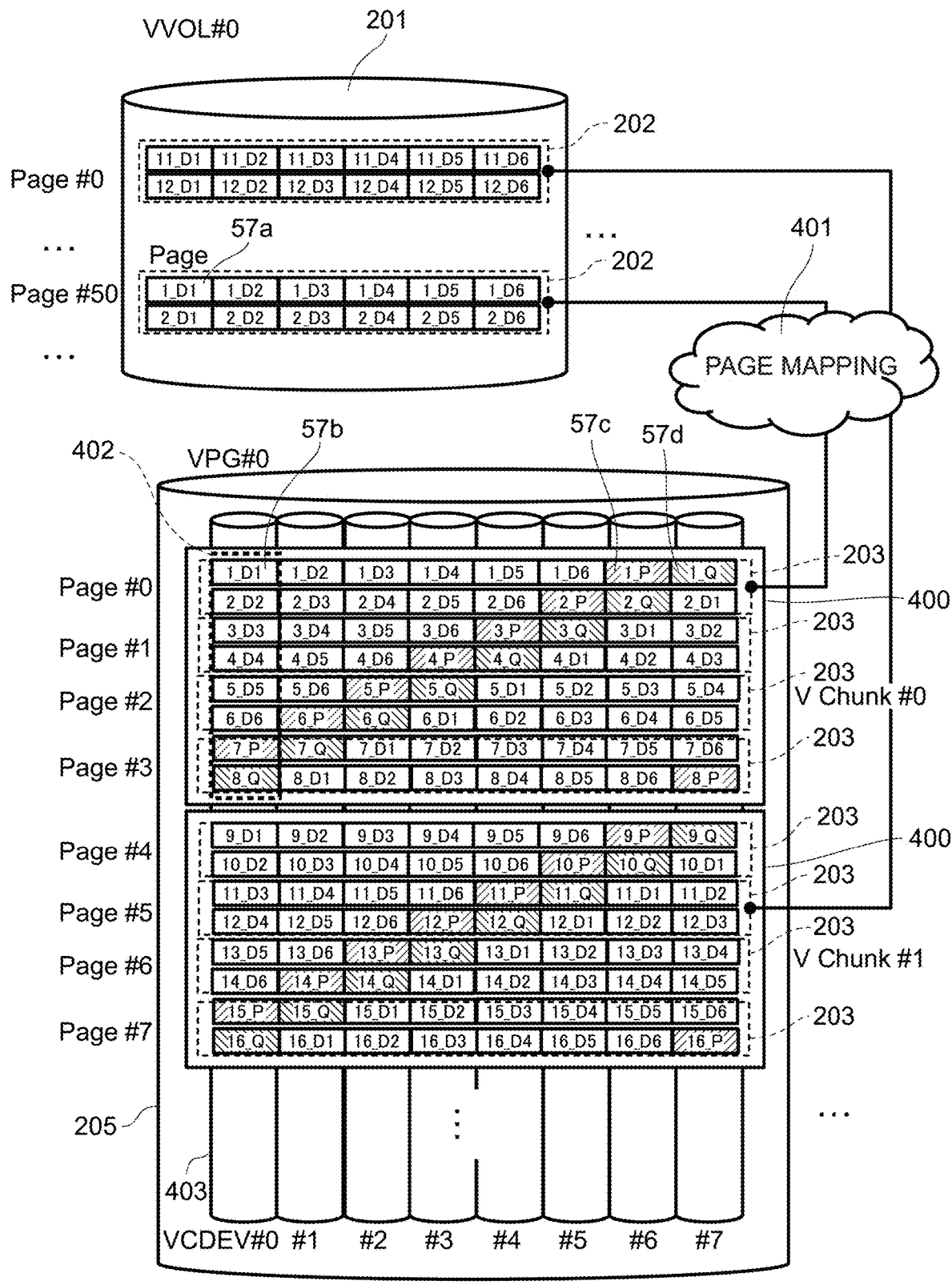
FIG. 4 is a conceptual diagram showing the data mapping structure according to the first embodiment.

FIG. 4 shows the data mapping structure diagram. The virtual volume 201 that is recognizable by the host 10 is configured from a plurality of virtual volume pages 202. The virtual parity group page 203 of the virtual parity group 204 is assigned to the virtual volume page 202. This relation is referred to as a page mapping 401, and the microprocessor 121 uses a page mapping table 705 described later to dynamically manage the page mapping 401.

In the virtual parity group 204, one or more virtual chunks (V Chunks) 400 are managed. The virtual chunk 400 is configured from a plurality of parcels (Parcels) 402. The parcel 402 is configured from consecutive areas in one storage apparatus (for example, the lower-level storage apparatus 180). In the example of FIG. 4, the parcel 402 is configured from eight stripes 57. Moreover, in the higher-level storage apparatus 100, the virtual volume 201 is managed using a unique number.

FIG. 4 shows a case of the virtual chunk 400 being configured based on the 6D+2P configuration of RAID 6; that is, a configuration where the six data elements (D) configuring the data unit and the two parities (P) corresponding to the foregoing data elements are stored in respectively different storage apparatuses. In the foregoing case, for example, the virtual chunk 400 is configured from the parcel 402 of eight different lower-level storage apparatuses 180.

The virtual chunk 400 includes a plurality of (for example, four) virtual parity group pages 203. The virtual parity group page 203 can store data elements and parities (data of the same stripe column) of a plurality of (for example, two) consecutive data units. For example, by causing such plurality of data to be several MB, even in cases where the drive 180 is a magnetic disk, the sequential performance of the host 10 can be maintained constant. In the same diagram, those in which the numerical figure before "_" is common such as in 1_D1(57b), 1_D2, 1_D3, 1_D4, 1_D5, 1_D6, 1_P (57c), 1_Q(57d) show the data elements and parities in the same data unit (stripe column). Note that the data element and parity are respectively the size of the stripe 57.

The virtual parity group 204 has a unique number in the higher-level storage apparatus 100. Moreover, each virtual parity group 204 has a drive number (VCDEV number) representing a given number of (represented as N in the ensuing explanation) virtual drives 403. This is an identifier for addressing the storage area in the virtual parity group, and is an identifier for expressing the correspondence relation with the drive (PCDEV) of a physical parity group described later.

Each virtual volume 201 is accessed by the host 10 based on the identifier representing the virtual volume 201, and an LBA (Logical Block Address). As shown in FIG. 4, a VVOL Page# is provided from the top of the virtual volume 201. The Page# can be calculated according to the following formula for an LBA that was designated with an I/O from the host 10.

$$VVOLPage\# = floor(LBA / VVOLPagesize(\text{number of sub blocks})) \qquad [\text{Math. 1}]$$

Moreover, a page is configured from a plurality of stripes. However, since the parity data cannot be accessed from the host 10 side, the parity data in the virtual volume 201 is not visible. For example, in the case of 6D2P shown in FIG. 4, the 8×2 stripes (virtual volume page 202) in the space on the virtual parity group side will be viewed as 6×2 stripes (virtual parity group page 203, VVOL Page size) in the virtual volume 201. As a result of correcting the above, the drive number (VCDEV#), the virtual chunk number (V Chunk#) and the offset address in the Parcel based on the virtual parity group number (VPG#) corresponding to the LBA on the virtual volume 201 side can be calculated in conjunction with the page mapping 401. Needless to say, the VCDEV# and the V Chunk# and the offset address in the Parcel based on the virtual parity group number (VPG#) of the parity areas (57c, 57d) corresponding to the I/O access from the host 10, and the offset address in the Parcel can also be calculated.

While FIG. 4 explained a case of RAID 6 (6D2P), for instance, the number of data may be increased to, for instance, 14D2P, and a parcel may be created only based on parities such as in RAID 4. Moreover, encoding of the Q parity may be performed using the EVEN-ODD method and other generally known methods in addition to the Galois operation.

Figure 5:
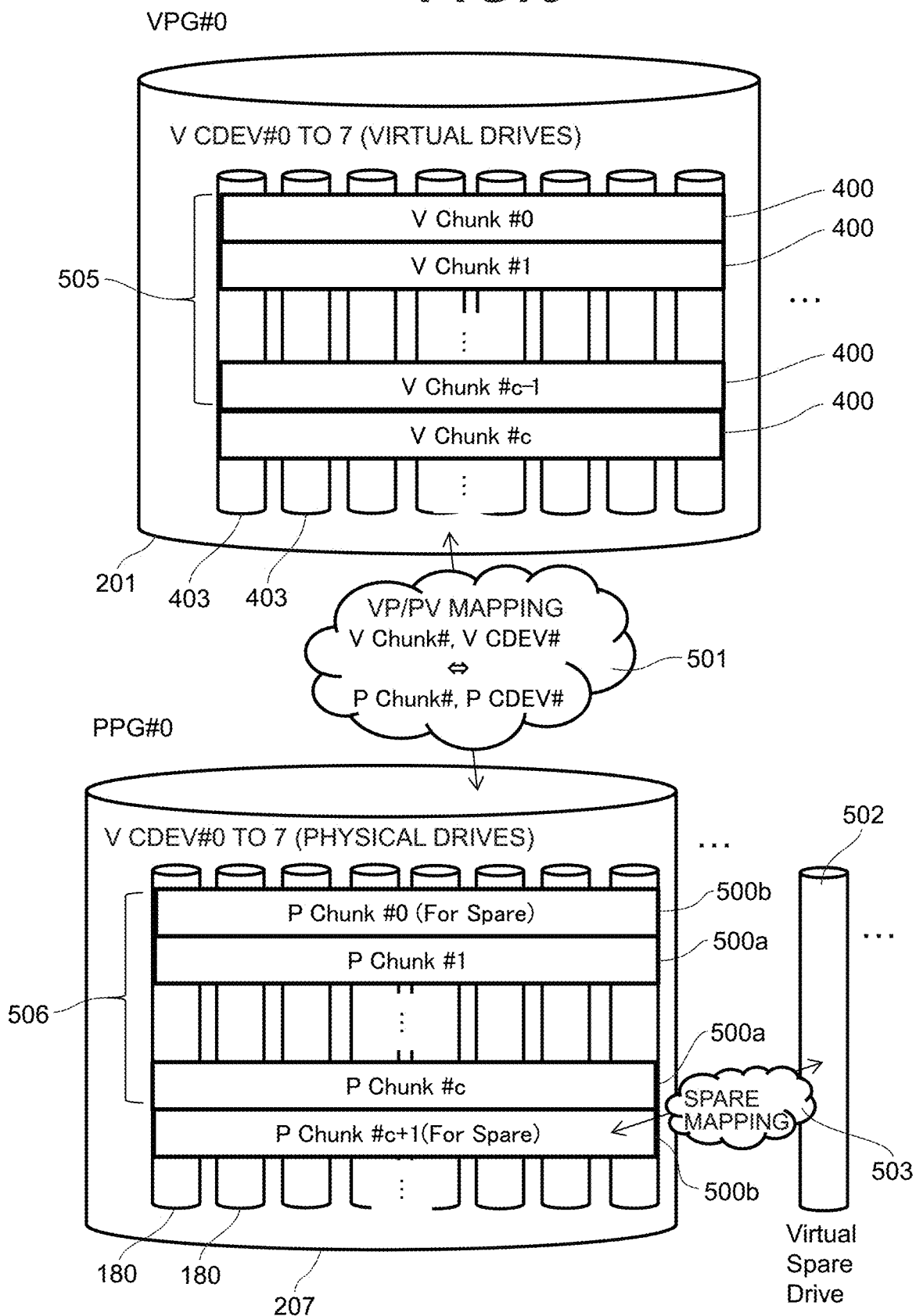
FIG. 5 is a conceptual diagram showing the data mapping structure according to the first embodiment.

FIG. 5 is a data mapping configuration diagram of the virtual parity group and the physical parity group of the computer system according to this embodiment.

The virtual chunk 400 exists consecutively relative to the space of the storage area of the virtual parity group 204 as also explained with reference to FIG. 4. The consecutive c-number of virtual chunks 400 corresponding to c-number of physical chunks (P Chunks) 500a, and the relation thereof is periodic. Moreover, the physical chunks 500a on the physical parity group side are also mapped periodically with the same pattern relative to the consecutive c+1 number of virtual chunks 400.

Moreover, the correspondence relation of the virtual chunks 400 and the physical chunks 500a is managed via VP/PV mapping 501. Here, when there are two or more physical parity groups 205, the physical parity group to be assigned belonging to the physical chunk 500a will be of a one-to-many relation relative to the c-number of virtual chunks 400 of one cycle 505 of the virtual parity group. Moreover, the virtual parity group to be assigned belonging to the virtual chunk 400 will be of a one-to-many relation relative to the c-number of physical chunks 500a of one cycle 506 of the physical parity group. Moreover, the data substance of the N-number of parcels in the virtual chunk will not be assigned 1:1 relative to the c-number of physical chunks 500a, but will rather be assigned transversely relative to the c-number of physical chunks 500a. These mapping methods will be explained in detail later.

Moreover, the reason why the physical chunk side is c+1 and one more than the virtual chunk side is because a spare physical chunk 500b is provided to the physical chunk side. When the following formula is established, the P chunk of that P Chunk# will become the spare area.

$$Pchunk\# \bmod (c + 1) = 0 \qquad [\text{Math. 2}]$$

This spare area is a reservation area that is used as the restoration destination of the rebuild processing when a drive in the dispersion group, to which the physical parity group belongs, malfunctions. The virtual spare drive 502 corresponds to the malfunctioned drive, and this is a drive without substance. As the area, a part of the spare physical chunk 500b is assigned.

The assignment of the spare physical chunk is managed with the spare mapping 503. The spare mapping method will be explained in detail later.

(1-4) Various Tables

The configuration of the various tables in this embodiment is now explained. As the tables explained below, a pointer structure or a hash table may be used for reducing the memory usage or processing time required for the search, or a reverse table may also be used.

Figure 6:
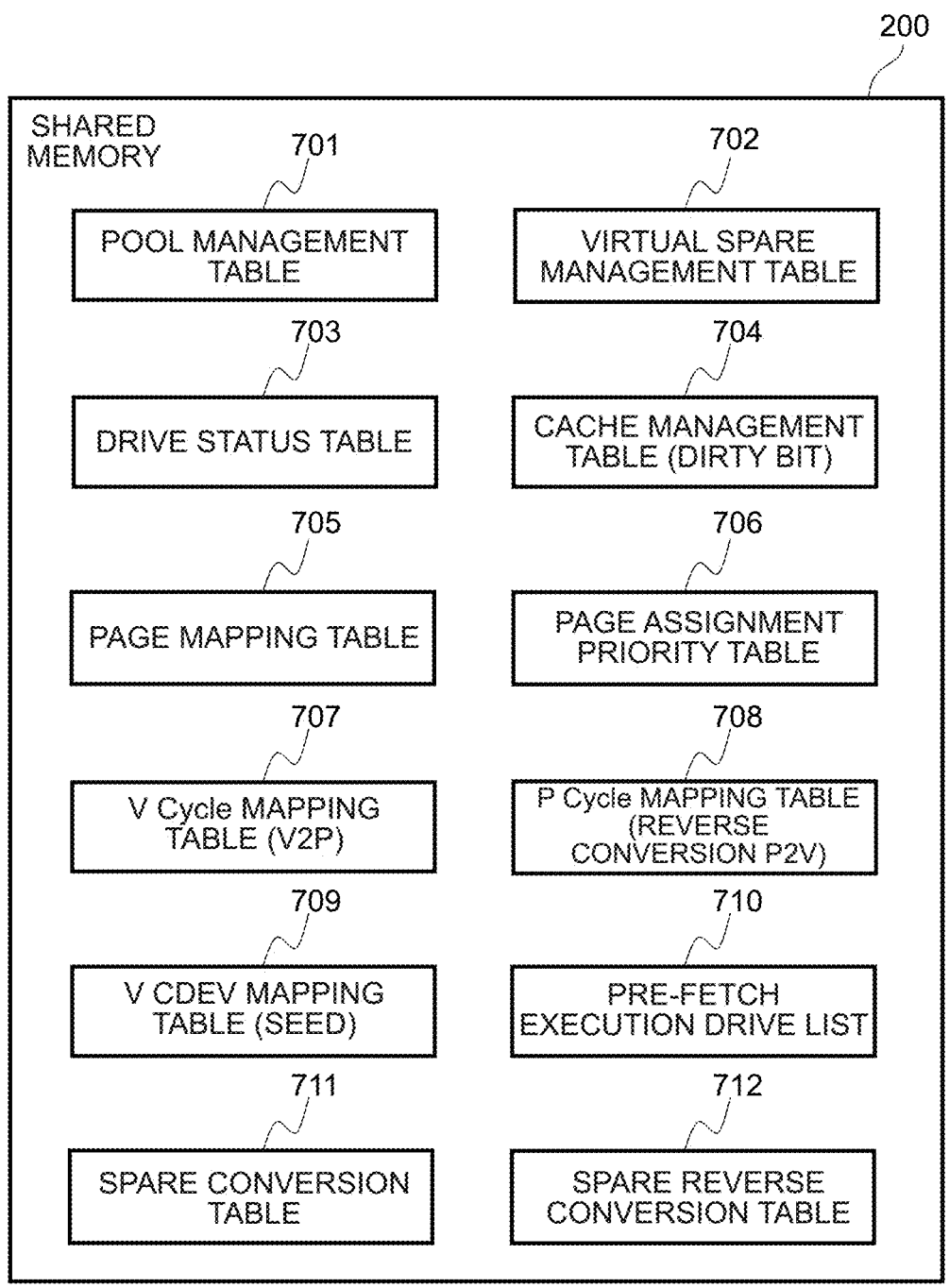
FIG. 6 is a block diagram showing the contents of the shared memory according to the first embodiment.

FIG. 6 is a diagram showing the various tables stored in the shared memory 200 according to this embodiment. The shared memory 200 is configured, for example, by using at least one storage area among the lower-level storage apparatus 180, the cache memory (CM) 131, and the local memory (LM) 122. Note that it is also possible to configure the logical shared memory 200 using the storage area of a plurality of configurations within the lower-level storage apparatus 180, the cache memory 131, and the local memory 122, and manage the various types of information based on cache management.

As shown in FIG. 6, the shared memory 200 stores a pool management table 701, a virtual spare management table 702, a drive status table 703, a cache management table (dirty bit) 704, a page mapping table 705, a page assignment priority table 706, a V cycle mapping table (V2P) 707, a P cycle mapping table (reverse conversion P2V) 708, a V CDEV mapping table (SEED) 709, a pre-fetch execution drive list 710, a spare conversion table 711, and a spare reverse conversion table 712. Contents of the respective tables will be explained in detail later.

Figure 7:
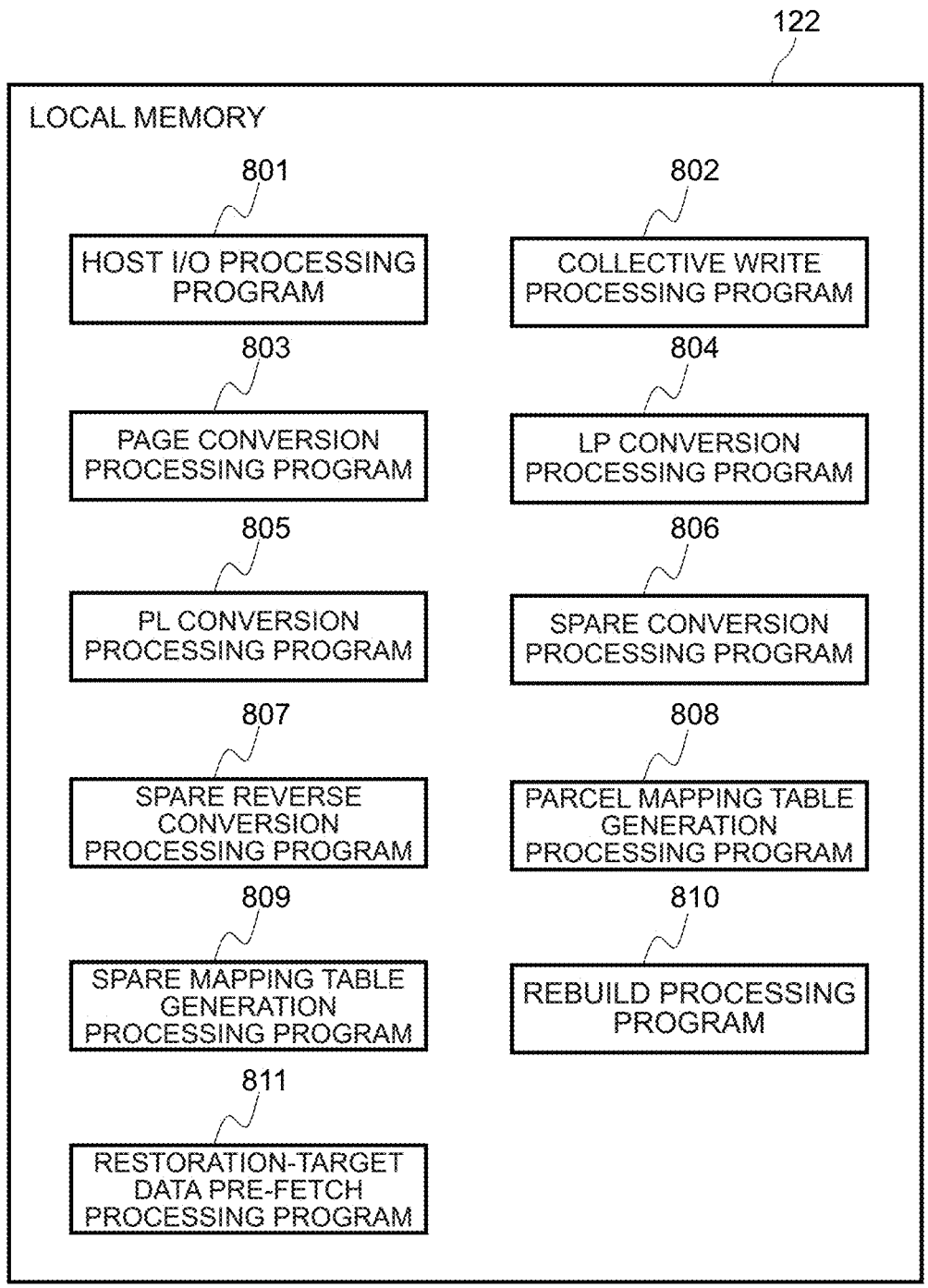
FIG. 7 is a block diagram showing the contents of the local memory according to the first embodiment.

FIG. 7 is a diagram showing the various programs stored in the local memory 122 according to this embodiment. The local memory 122 stores a host I/O processing program 801, a collective write processing program 802, a page conversion processing program 803, an LP conversion processing program 804, a PL conversion processing program 805, a spare conversion processing program 806, a spare reverse conversion processing program 807, a parcel mapping table generation processing program 808, a spare mapping table generation processing program 809, a rebuild processing program 810, and a restoration-target data pre-fetch processing program 811.

The host I/O processing program 801 is a program for executing read/write processing. The collective writing program 802 is a program for executing collective write processing. The rebuild processing program 810 is a program for executing rebuild processing. The processing to be executed by the respective programs will be explained in detail later.

The pool management table 701 is a table for managing the correspondence relation of the pool, the Tier, the dispersion group (DG), and the virtual parity group (VPG). As shown in FIG. 8, the pool management table 701 is configured from a pool number column 7011, a Tier number column 7012, a dispersion group number (DG#) column 7013, and a virtual parity group (VPG#) column 7014.

The pool number column 7011 stores the number for identifying the pool. The Tier number column 7012 stores the number for identifying the Tier. The dispersion group number column 7013 stores the number for identifying the dispersion group. The virtual parity group column 7014 stores the number for identifying the virtual parity group.

By using the pool management table 701, the microprocessor 121 can check the identifier of the dispersion group belonging to the respective Tiers of the pool, and the identifier of the virtual parity group belonging to the respective dispersion groups. Moreover, since the identifiers of the virtual parity group and the physical parity group in the dispersion group are equal, the microprocessor 121 can also know the physical parity group belonging to the respective dispersion groups.

The virtual spare management table 702 is a table for managing the virtual spare drive belonging to the dispersion group and the status thereof. As shown in FIG. 9, the virtual spare management table 702 is configured from a dispersion group number (DG#) column 7021, a virtual spare drive number (V Spare Drive#) column 7022, a status column 7023, and a copy pointer column 7024.

The dispersion group number column 7021 stores the number for identifying the dispersion group. The virtual spare drive number column 7022 stores the number for identifying the virtual spare drive. The status column 7023 stores the status of use of the generated spare drive. The copy pointer column 7024 stores the pointer information showing up to which LBA the rebuilding of data has progressed when the virtual spare drive corresponding to the drive number of the virtual spare drive column 7022 of the entry is being rebuilt. When the virtual spare drive is not being rebuilt, an invalid value is entered. Moreover, during the initial state of rebuilding, 0 is stored, and, in the final state of rebuilding, the largest LBA of the restoration-target drive is stored.

The dispersion group is provided with a spare area according to its size. The spare area is managed as a virtual spare drive. In other words, the microprocessor 121 generates the virtual spare drive as an entry of the virtual spare management table 702 according to the amount of spare area of the dispersion group. As the trigger for generating an entry of the virtual spare management table 702, for example, there is the increase or decrease of the dispersion group, or the initial setting of the higher-level storage apparatus. The virtual spare management table 702 is used for searching for an unused virtual spare drive when a drive is blocked.

The drive status table 703 is a table for managing the status of the physical drive (for example, lower-level storage apparatus 180) configuring the physical parity group. As shown in FIG. 10, the drive status table 703 is configured from a physical parity group number (PPG#) column 7031, a PDEV number column 7032, and a status column 70331.

The physical parity group column 7031 stores the number for identifying the physical parity group. The PDEV number column 7032 stores the number of the physical drive (physical drive number) configuring the physical parity group of the physical parity group column 7031 of the entry. The status column 7033 stores the status of the physical drive corresponding to the physical drive number of the PDEV number column 7032 of the entry.

As the status of the physical drive, "Normal" showing that the physical drive is normal and read/write access is possible, or "No access" showing that read/write access is not possible due to a malfunction or the like of the physical drive.

The cache management table 704 is a table for managing the data stored in the cache memory 131. As shown in FIG. 11, the cache management table 704 is configured from a virtual volume number (VVOL#) column 7041, a volume slot number column 7042, a cache slot number column 7043, a destage inhibition flag column 7044, and a dirty bitmap column 7045.

The virtual volume number column 7041 stores the number for identifying the virtual volume. The volume slot number column 7042 stores the number of the volume slot (volume slot number) of the virtual volume corresponding to the virtual volume number of the virtual volume number column 7041.

The cache slot number column 7043 stores number of the cache slot (cache slot number) in the cache memory 131 storing the volume slot corresponding to the volume slot number of the volume slot number column 7042. The cache slot number column 7043 stores the number of the cache slot (number with (data) added thereto in FIG. 11) storing the data elements stored in the volume slot, and the number of the cache slot (number with (parity) added thereto in FIG. 11) storing the parity for restoring the data elements stored in the volume slot.

The destage inhibition flag column 7044 stores a flag showing whether the data of the cache slot corresponding to the cache slot number of the cache slot number column 7043 of the entry can be destaged. In other words, the destage inhibition flag column 7044 stores a destage inhibition flag showing whether data can be written in the storage apparatus and deleted from the cache slot of the cache memory 131. The dirty bitmap column 7045 stores an aggregate of bits (bitmap) showing whether the data of the respective sub blocks in the cache slot corresponding to the cache slot number of the cache slot number column 7043 of the entry is dirty data.

The page mapping table 705 is information showing the correspondence relation of the page of the virtual volume 201 and the page of the virtual parity group 205. As shown in FIG. 12, the page mapping table 705 is configured from a pool number column 7051, a virtual volume number (VVOL#) column 7052, a virtual volume page number (Page#) column 7053, a virtual parity group number (VPG#) column 7054 corresponding to the virtual volume, and a virtual parity group page number (Page#) column 7055.

The pool number column 7051 stores the number for identifying the pool 200. The virtual volume number column 7052 stores the number for identifying the virtual volume 201, and the page number column 7053 stores the number for identifying the page configuring the virtual volume. The virtual parity group 7054 stores the number for identifying the virtual parity group corresponding to the virtual volume 201 of the entry. The page number column 7055 stores the number for identifying the page configuring the virtual parity group.

The page assignment priority table 706 is a table for managing the priority of the virtual parity group 204 to be assigned to the page of the virtual volume 201. As shown in FIG. 13, the priority table 706 is configured from a virtual volume number (VVOL#) column 7061, a priority column 7062, and a virtual parity group number (VPG#) column 7063. The virtual volume number column 7061 stores the number for identifying the virtual volume 201. The priority column 1107 stores information showing the priority, and smaller the number, the higher the priority. For example, it can be seen that the page of highest priority is placed in the virtual volume VVOL#1 from the virtual parity group VPG#2. Moreover, when there are no longer unused pages in the virtual parity group VPG#2, pages are preferentially placed from the virtual parity group VPG#0 of the next highest priority.

FIG. 14A and FIG. 14B are tables related to the data mapping between the virtual parity group and the physical parity group.

The V cycle mapping table 707 (hereinafter explained as the "V2P table") is a table for managing the mapping of the virtual chunk and the physical chunk. The V2P table 707 manages the mapping of one cycle worth of the respective chunks. As shown in FIG. 14A, the V2P table 707 is configured from a virtual parity group number (VPG#) column 7071 and a V cycle column (V Cycle#) 7072 as the index (Index) columns, and configured from a physical parity group number (PPG#) column 7073 and a P cycle column (P Cycle#) 7074 as the value (Value) columns.

With the V2P table 707, the value of the virtual parity group number (PPG#) column 1203 and the value of the P cycle number (P Cycle#) column 1204 can be obtained by using, as the key, the value of the virtual parity group number (VPG#) column 7071 and the value of the V cycle number (V Cycle#) column 1202.

The P cycle mapping table 708 (hereinafter explained as the "P2V table") is a reverse table of the V cycle mapping table 707, and is a table for managing the mapping of the virtual chunk (V chunk) and the physical chunk (P chunk). As shown in FIG. 14B, the P2V table 708 is configured from a physical parity group number (PPG#) column 7073 and a P cycle column (P Cycle#) 7074 as the index (Index) columns, and configured from a virtual parity group number (VPG#) column 7071 and a V cycle column (V Cycle#) 7072 as the value (Value) columns. Since the respective columns are the same as the V2P table, the detailed explanation thereof is omitted.

The SEED table 709 is a table for managing the information to be used for calculating the correspondence relation of the respective data placements of each VCDEV in the virtual chunk (V chunk) and each PCDEV in the physical chunk (P chunk). As shown in FIG. 15, the SEED table 709 is configured from a virtual parity group number (VPG#) column 7091 and a VCDEV# column 1302 as the index (Index) columns, and configured from a SEED column 1303 as the value (Value) column.

The SEED column 1303 stores the SEED value corresponding to the virtual parity group and the VCDEV, and stores an integer from 0 to c−1. As one efficient embodiment, a random number (integer from 0 to c−1) may be stored by using the generally known pseudo random number generation method (for example, linear congruent method or the like). The SEED value is uniquely set during the initial setting, and is not subsequently changed.

Moreover, desirably, the SEED value of each VCDEV# in the same virtual parity group number (VPG#) takes on a value that does not overlap as much as possible. When an overlapping value is taken, in a small-scale configuration (PG quantity is smaller than c), the drive redundancy of the restoration source parcel during the rebuilt will increase, and there may be cases where the simultaneously effect of the rebuild processing cannot be yielded.

The pre-fetch execution drive list 710 is a table for efficiently inhibiting the competition of drive access of the rebuild processing in the rebuild processing described later. As shown in FIG. 16, the pre-fetch execution drive list 710 includes, as its keys, a physical parity group number (PPG#) column 7101 and a PDEV# column 7102, and an I/O issue count column 7103 corresponding thereto. I/O issue count column 7103 stores information showing how many times an I/O was issued to the drive for performing the rebuild processing. The I/O issue count may be reset to 0 each time the periodic data restoration processing (total of c times) is complete in the rebuild processing.

The spare conversion table for managing the spare conversion is now explained with reference to FIG. 17A and FIG. 17B.

The spare conversion table 711 is a table for managing which parcel of which physical chunk 500b has been mapped to the virtual spare drive 502. As explained above, the virtual spare drive 502 is a drive for virtually providing a storage area of its restoration destination to the malfunctioned drive 180 in the physical parity group (PPG) 205.

As shown in FIG. 17A, the spare conversion table 711 is configured from a virtual spare drive number (V spare Drive#) column 7111 and a P cycle number (P Cycle#) column 7112 as the index (Index) columns, ad configured from a physical parity group number (PPG#) column 7113 as physical-side parcel information and a PCDEV# column 7114 as the value (Value) columns. With the spare conversion table 711, the value of the physical parity group number column 7113 and the value of the P cycle number column 7114 can be obtained with the value of the virtual spare drive number column 7111 and the value of the P cycle number column 7112 as the keys.

Moreover, the spare reverse conversion table 712 shown in FIG. 17B is a reverse table of the spare conversion table 711, and is configured from a physical parity group number (PPG#) column 7121 and a PCDEV# column 7122 as the index (Index) columns, and configured from a virtual spare drive number (V spare Drive#) column 7123 and a P cycle number (P Cycle#) column 7124 as the value (Value) columns. Since the respective columns are the same as the spare conversion table 711, the detailed explanation thereof is omitted.

(1-5) Details of Data Management Processing in Storage System

Details of the data management processing in the storage system are now explained. Foremost, the host I/O processing as the synchronous processing on the storage apparatus side corresponding to the host I/O command issued from the computer system is explained.

The host I/O processing (also referred to as the read/write processing) is executed when the microprocessor 121 receives an I/O command (read command or write command) from the host 10 via the port 111 of the FEPK 110.

Figure 18:
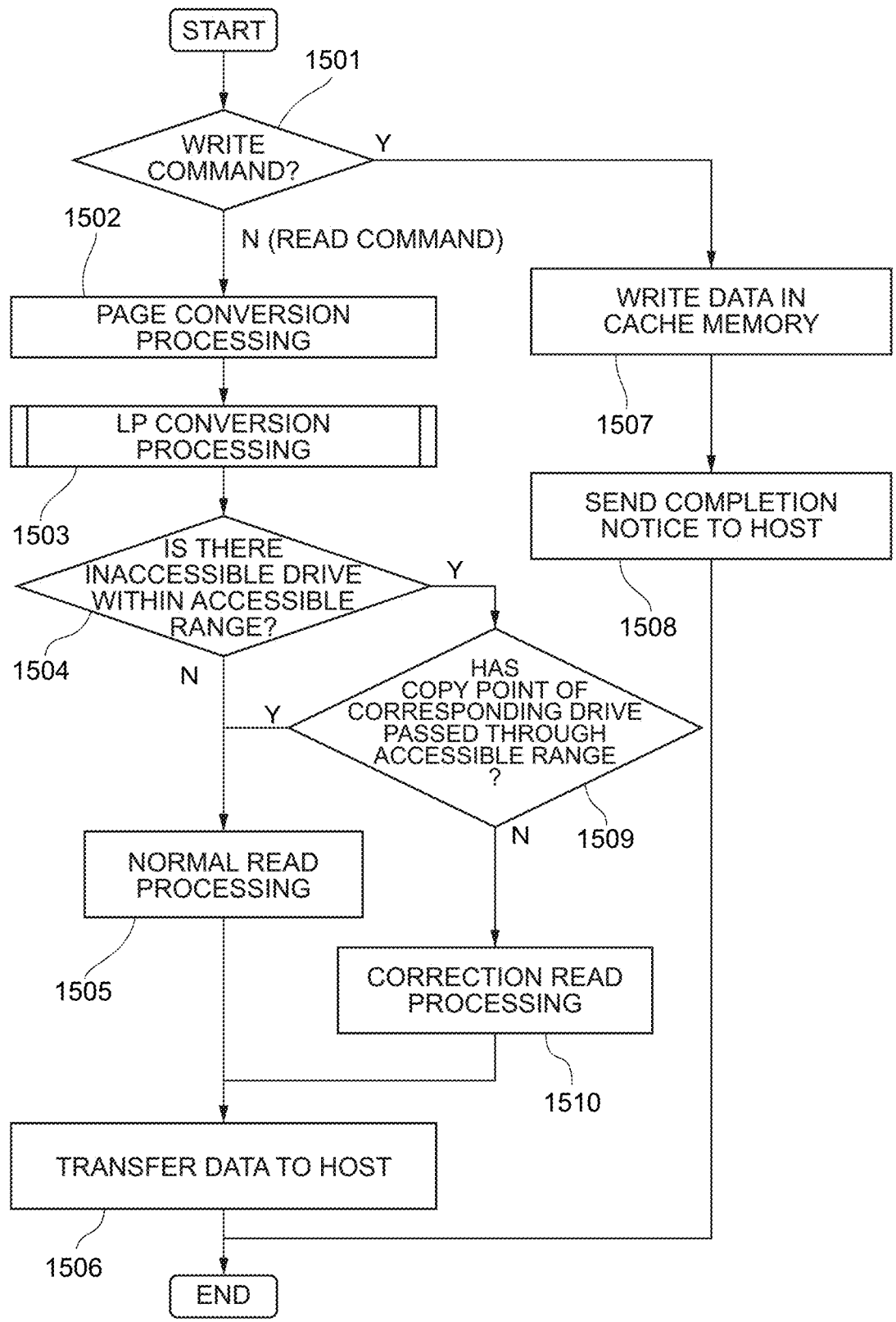
FIG. 18 is a flowchart showing the flow of host I/O processing according to the first embodiment.

As shown in FIG. 18, foremost, the microprocessor 121 determines whether the command received from the host 10 is a write command (step S1501). When the received command is a write command as a result of the determination of step S1501 (Y in step S1501), the microprocessor 121 receives the write data corresponding to the write command from the host 10 and writes that write data in the cache memory 131 (step S1507), and sends a completion notice to the host 10 via the port 111 of the FEPK 110 (step S1508). Here, in order to show that the data in the cache has not yet been reflected in the drive, the data is made dirty. To make the data dirty shows that the data in the cache is new, and further shows that the data will be subject to the data write processing to the drive in the collective write processing. Specifically, data can be made dirty by setting all BITs of the dirty bitmap column 7045 of the cache management table 704 of the target data to "1".

Meanwhile, when the received command is not a write command; that is, when the received command is a read command as a result of the determination of step S1501 (N in step S1501), the microprocessor 121 executes the page conversion processing to obtain the address of the storage area in the virtual parity group (VPG) 204 corresponding to the access range of the storage apparatus (lower-level storage apparatus 180 or external storage apparatus 40) that is subject to the read command (step S1502). The read command includes, for example, a virtual volume number and an LBA (Logical Block Address) of the access target. Since the method of obtaining the corresponding address (VPG#, V chunk#, VCDEV# or the like) in the virtual parity group (VPG) 204 from the virtual volume number and LBA was explained with reference to FIG. 4, the detailed explanation thereof is omitted.

Subsequently, the microprocessor 121 calculates, based on the LP conversion processing 1503, the address (PPG#, P chunk#, PCDEV# or the like) of the physical parity group (PPG) corresponding to the address of the virtual parity group (VPG) (step S1503). The LP conversion processing will be explained in detail later.

Subsequently, the microprocessor 121 determines whether the drive corresponding to the access range from the host 10 is accessible (step S1504). Specifically, the microprocessor 121 makes the determination by using the physical parity group number (PPG#) and PCDEV# that were calculated in step S1503 by referring to the drive status table 703, and acquiring the status of that drive. Here, when the value of the status column 7033 is inaccessible, it is determined that there is an inaccessible drive. When the foregoing value is not inaccessible, it is determined that there are no inaccessible drives.

In step S1504, when it is determined that there are no inaccessible drives, the microprocessor 121 executes the normal read processing (step S1505), and reads data into the cache memory and transfers that data to the drive. The microprocessor 121 thereafter transfers the data to the host (step S1506).

Meanwhile, in step S1504, when it is determined that there is an inaccessible drive, the microprocessor 121 determines whether the copy pointer has passed through the access range (step S1509). When it is determined that the copy pointer has passed through the access range in step S1504, the microprocessor 121 executes the normal read processing (step S1505). The reason why the normal read processing is executed in step S1505 is because, since the restoration has already been performed based on the rebuild processing in cases where the copy pointer has passed through the access range, data can be read from the spare area.

Meanwhile, when it is determined that the copy pointer has not passed through the access range in step S1504, since the restoration processing has not yet been performed, the microprocessor 121 executes the correction read processing (step S1510). Subsequently, the microprocessor 121 transfer the acquired data to the host 10 via the FEPK 110 (S1506). The correction read processing in step S1510 is the processing of restoring the lost data from redundant data (parity and mirror data).

Details of the collective write processing in the computer system are now explained. The collective write processing may be executed, for instance, periodically.

Figure 19:
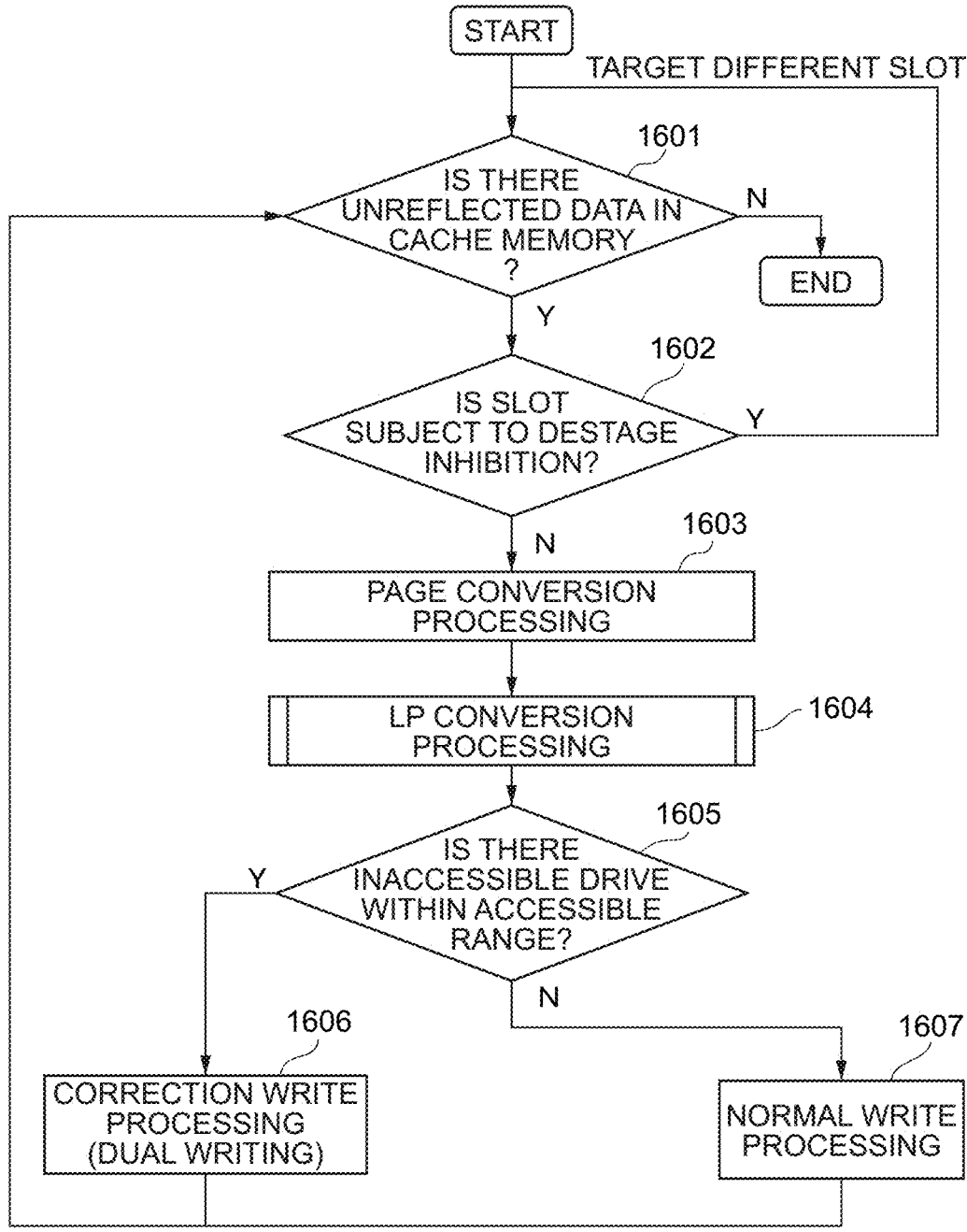
FIG. 19 is a flowchart showing the flow of collective write processing according to the first embodiment.

As shown in FIG. 19, the microprocessor 121 determines whether there is a slot including data in the cache memory 131 which has not yet been reflected in the storage apparatus (step S1601). Whether there is a slot including unreflected data can be confirmed by referring to the cache management table 240. When it is determined that there is no slot including unreflected data in step S1601, the microprocessor 121 ends the collective write processing.

Meanwhile, when it is determined that there is a slot including unreflected data in step S1601, the microprocessor 121 refers to the destage inhibition flag 244 of the entry corresponding to that slot of the cache management table 240, and determines whether that slot is a slot that is currently subject to destage inhibition (step S1602).

When it is determined that the slot that is currently subject to destage inhibition in step S1602, since this shows that the data contained in that slot is being used for restoration, the microprocessor 121 returns to step S1601 without reflecting the data of that slot in the storage apparatus, and performs processing targeting a different slot.

Meanwhile, when it is determined that the slot that is not currently subject to destage inhibition step S1602, the microprocessor 121 performs the page conversion processing (S1603) and the LP conversion processing (S1604). Based on the page conversion processing and the LP conversion processing, the physical area (PPG#, P Chunk#, PCDEV#) corresponding to that slot can be obtained. The page conversion processing and the LP conversion processing will be explained in detail later.

Subsequently, the microprocessor 121 determines whether there is an inaccessible drive in the data writing range (access range) of that slot of the storage apparatus (step S1605).

When it is determined that there is an inaccessible drive as a result of the determination of step S1605, the microprocessor 121 executes the correction write processing (step S1606), and repeats the processing of step S1601 onward. Here, in the correction write processing, the MP 121 generates a new parity in the lower-level storage apparatus 180 by using the data of the slot, and stores the generated parity in the storage apparatus. Specifically, the MP 121 reads the old data corresponding to the stripe column of the correction write-target data from the lower-level storage apparatus 180, generates a new parity based on exclusive OR or Galois operation, and writes the new parity in the lower-level storage apparatus 180.

Meanwhile, when it is determined that there is no parcel requiring restoration as a result of the determination of step S1605, the MP 121 executes the normal write processing (step S1607), and repeats the processing of step S1601 onward. Here, in the normal write processing, specifically, the MP 121 reads the old data of that data and of the old parity of that parity from the lower-level storage apparatus 180, a generates a new parity based on exclusive OR or Galois operation, and writes the new data and new parity in the lower-level storage apparatus 180.

Details of the foregoing page conversion processing are now explained. The page conversion processing is processing that is executed during the host I/O processing (read processing, write processing), and is processing of repeating the virtual parity group number (VPG#) corresponding page of the virtual volume and the address of the virtual parity group based on the page mapping table.

Figure 20:
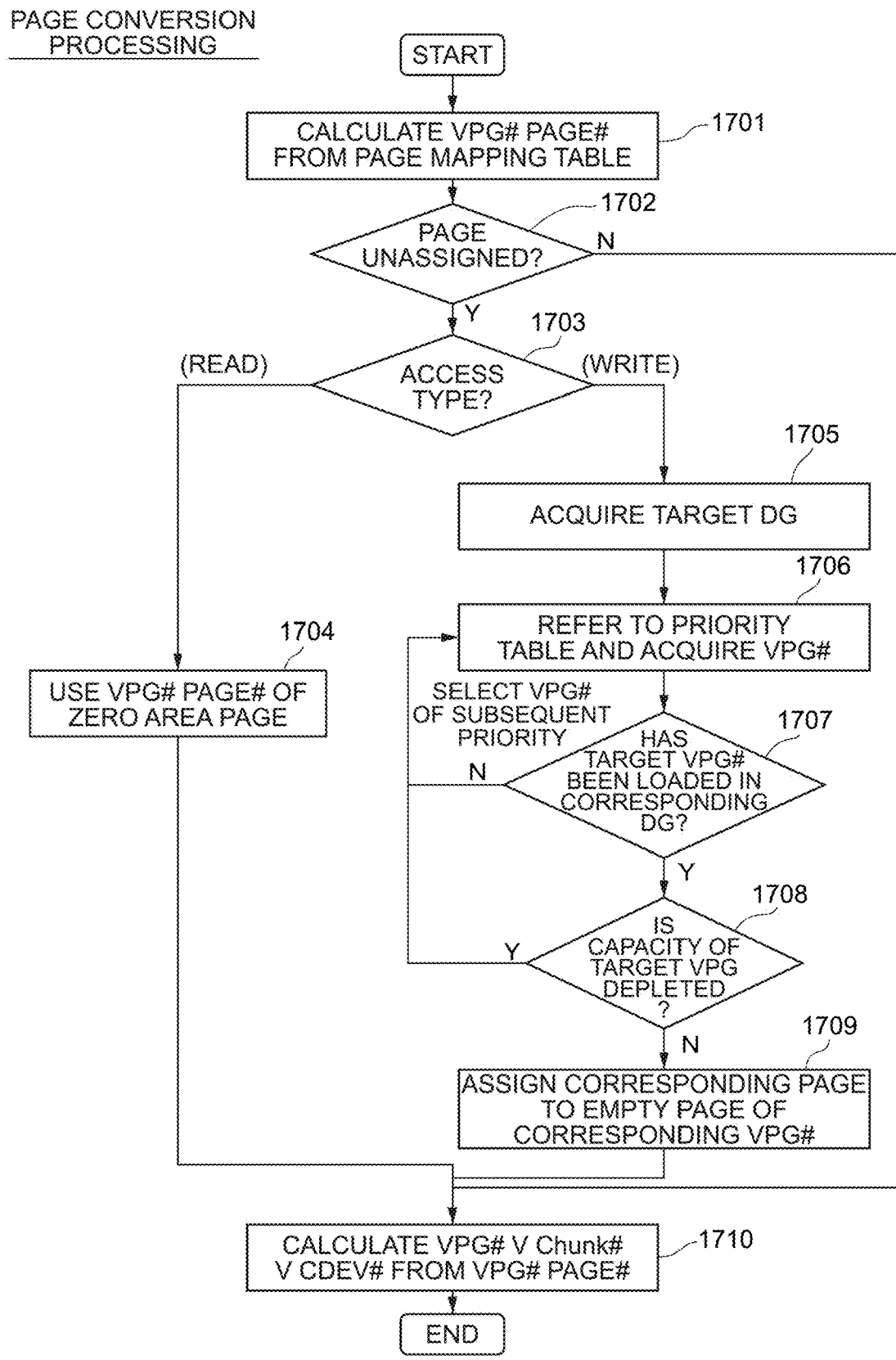
FIG. 20 is a flowchart showing the flow of page conversion processing according to the first embodiment.

As shown in FIG. 20, the microprocessor 121 calculates the virtual parity group number (VPG#) and the page number corresponding to the page of the designated virtual volume based on the page mapping table 705 (step 1701). Subsequently, the microprocessor 121 determines whether that page has not yet been assigned, or has been assigned (step 1702).

In step S1702, since there is information such as "Not-Allocate" showing that the page has not yet been assigned to the field 1104 of the virtual parity group number (VPG#) of the page mapping table 705, it is possible to determine that the page has not yet been assigned. In other words, in the initial state of the system (state where a host I/O has never been executed to the virtual volume), the status will be "Not-Allocate" in all cases.

When it is determined that the page has been allocated in step S1702 (N in step 1702), the microprocessor 121 calculates the virtual chunk number (V chunk#) and the V CDEV# from the address shown in the page mapping table 705, returns the calculated value (step 1710), and then ends the processing. Meanwhile, when it is determined that the page has not yet been assigned (Y in step 1702), the microprocessor 121 determines whether the access type is read or write (step 1703).

When it is determined that the access type is read in step S1703, the microprocessor 121 uses the virtual parity group number (VPG#) and the page number of the zero area page (step 1704) to calculate the virtual chunk number (V chunk#) and the V CDEV#, returns the calculated values (step 1710), and then ends the processing. Here, a zero area page is a page of an area in which the data value is "0". The processing of step S1704 is performed for ensuring that a never-written area is "0".

Since only one page of such a zero area page is required in the storage system, such an area is reserved in advance. When the access type is write (determination of "write" in step 1703), the target dispersion group (DG) is acquired for determining to which dispersion group (DG) 207 of the pool belonging to the designated virtual volume the page should be assigned (step 1705). Here, as the methods of selecting the target dispersion group (DG), for example, used may be the method of checking whether there is an unused page in the target pool in order from the highest Tier and selecting the dispersion group (DG) with the lowest page usage among the Tiers that contain an unused page, or the method of selecting the dispersion group (DG) with the lowest I/O load.

After selecting the dispersion group (DG) as described above, the microprocessor 121 refers to the priority table regarding the target virtual volume, and acquires the virtual parity group number (VPG#) with the highest priority (step 1706). Specifically, the microprocessor 121 refers to the page assignment priority table 706, and acquires the virtual parity group number (VPG#) 1108 with the smallest priority 1107 value.

Subsequently, the microprocessor 121 refers to the pool management table 701, and determines whether the target virtual parity group (VPG#) is loaded in the dispersion group (DG) determined in step 1705 (step 1707).

When it is determined that the virtual parity group is not loaded in the dispersion group in step 1707, the microprocessor 121 selects the virtual parity group (VPG#) with the next highest priority, and once again makes the determination of step 1707. When it is determined that the virtual parity group is loaded in the dispersion group in step S1707, the microprocessor 121 determines whether there is an unused page of the target virtual parity group (VPG) (step 1708).

When it is determined that there is no unused page in step S1708, the microprocessor 121 selects the virtual parity group (VPG#) with the next highest priority, and once again makes the determination of step 1707. When it is determined that there is an unused page in step S1708, the microprocessor 121 assigns that page to the unused page of that virtual parity group (VPG#) (step 1709). When the microprocessor 121 is to assign the page in step S1709, the microprocessor 121 updates the page mapping table 705 based on information of the assignment destination. The microprocessor 121 thereafter calculates the V chunk# and the V CDEV#, returns the values thereof (step 1710), and then ends the processing.

As described above, in this embodiment, it is possible to assign a page from the virtual parity group (VPG) with the highest priority based on the priority of each virtual volume. Moreover, the value of the page assignment priority table may be a random value (VPG#) for each predetermined appearance regarding the priority of the respective virtual volumes (VVOL), or the priority of the virtual parity group (VPG#) for each virtual volume or for each group of the virtual volume may be set by the user through a management interface or the like.

Moreover, when the replication function of the virtual volume is being used, from the perspective of data protection, the value of the priority table 706 may be automatically decided on the storage side or the management interface side so that separate virtual parity groups (VPG#) are given priority regarding the VVOL pair. In the foregoing case, when a drive malfunction occurs and data is lost, it is possible to increase the possibility of being able to restore data from the replication of the VVOL in that VVOL that was subject to data loss.

Details of the foregoing LP conversion processing are now explained. The LP conversion processing is the processing of converting, based on the parcel mapping table, the SEED table, and the spare conversion table, the address (VPG#, V chunk#, VCDEV#) of the virtual parity group space as the designated virtual address to the address (PPG#, P chunk#, PCDEV#) of the physical parity group space as the storage destination of the physical data. The LP conversion processing is processing that is executed from the page conversion processing or the like.

Figure 21:
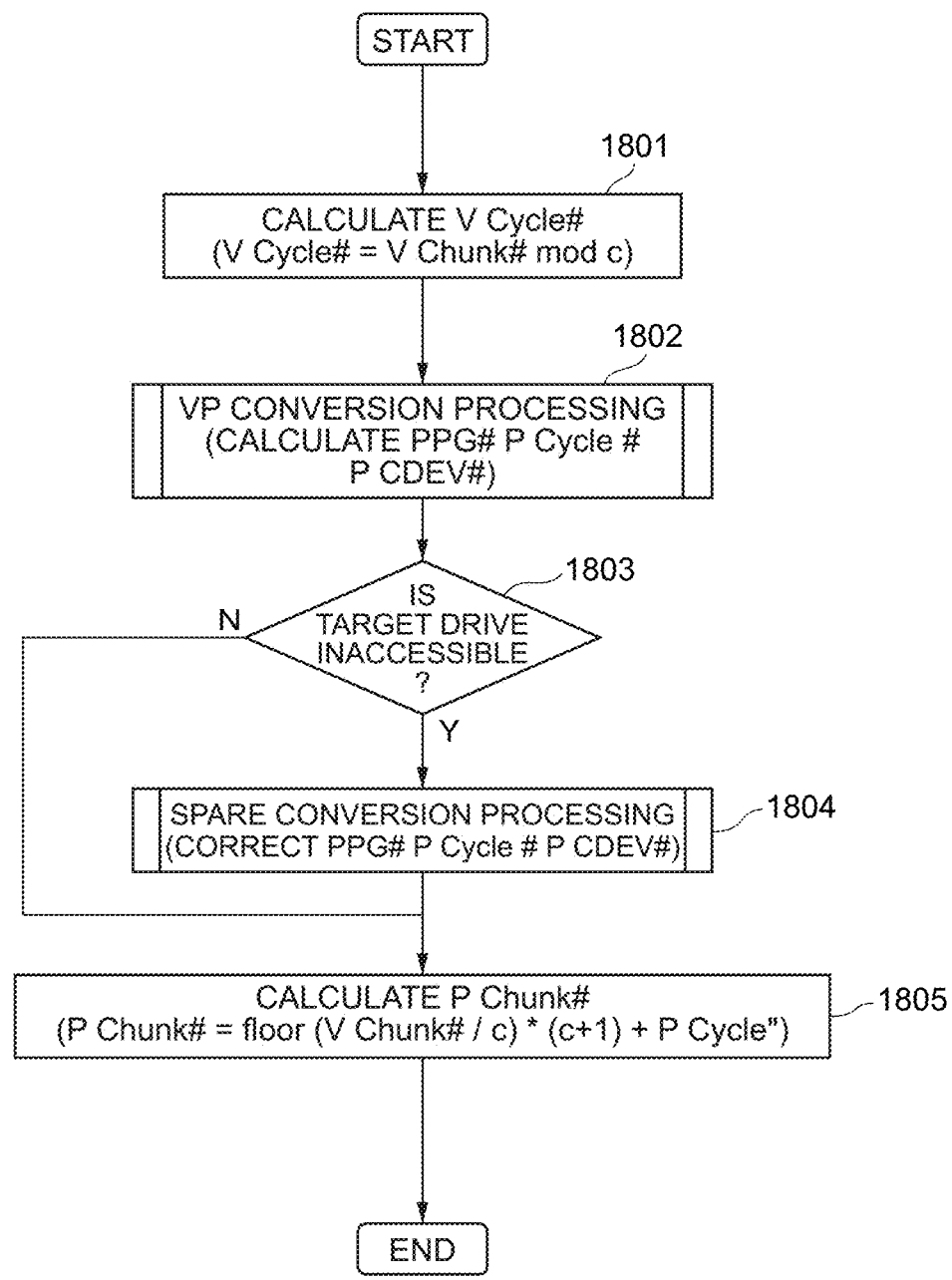
FIG. 21 is a flowchart showing the flow of LP conversion processing according to the first embodiment.

As shown in FIG. 21, with the LP conversion processing, the microprocessor 121 foremost calculates the virtual cycle (V Cycle#) from the virtual chunk (V chunk#) (step 1801). In step 1801, the virtual cycle can be calculated based on the following formula.

$$V \text{ Cycle\#} = V \text{ Chunk\#} \bmod c \qquad [\text{Math. 3}]$$

Subsequently, the microprocessor 121 executes the VP conversion processing (step 1802). The conversion processing of step 1802 will be explained in detail later. Based on the VP conversion processing in step S1802, it is possible to calculate the address (PPG# P Cycle# P CDEV#) of the physical parity group space in cases of a regular address; that is, cases where the drive has not malfunctioned.

Subsequently, the microprocessor 121 determines whether the target drive is inaccessible due to a malfunction or the like based on the PPG# and the PCDEV# that were calculated by referring to the drive status table 703 (step 1803). When the target is accessible (N in step 1803), since a regular address; that is, the address (PPG# P Cycle# P CDEV#) of the physical parity group space of the current calculated value is being used as the storage destination of the data, the physical chunk (P Chunk#) is calculated using that calculated value (step 1805), and the processing is subsequently ended. The calculation of the physical chunk (P Chunk#) from the physical cycle (P Cycle#) is carried based on the following formula.

$$P \text{ Chunk\#} = \text{floor}(V \text{ Chunk\#}/c) * (c+1) + P \text{ Cycle\#} \qquad [\text{Math. 4}]$$

Meanwhile, when the target drive is inaccessible in step S1803, since that data will be saved in a spare area, the spare conversion processing is executed (step 1804), the address of the spare destination is calculated, the physical chunk (P Chunk#) is calculated using that calculated value (step 1805), and the processing is subsequently ended. The spare conversion processing will be explained in detail later.

Details of the PL conversion processing of the computer system according to this embodiment are now explained.

The PL conversion processing is the processing that is used for identifying the data of the restoration source of the malfunctioned area in the rebuild processing or the like. PL conversion is the processing of converting, based on the parcel mapping table, the SEED table, and the spare conversion table, the address (PPG#, P chunk#, PCDEV#) of the virtual parity group space as the storage destination of the designated physical data to the address (VPG#, V chunk#, VCDEV#) of the virtual parity group space as the virtual address. In other words, the PL conversion corresponds to the reverse conversion of the LP conversion. That is, after the LP conversion is performed, if the PL conversion is performed based on the result of the LP conversion, the same address will be returned. Moreover, the same applies vice versa.

Figure 22:
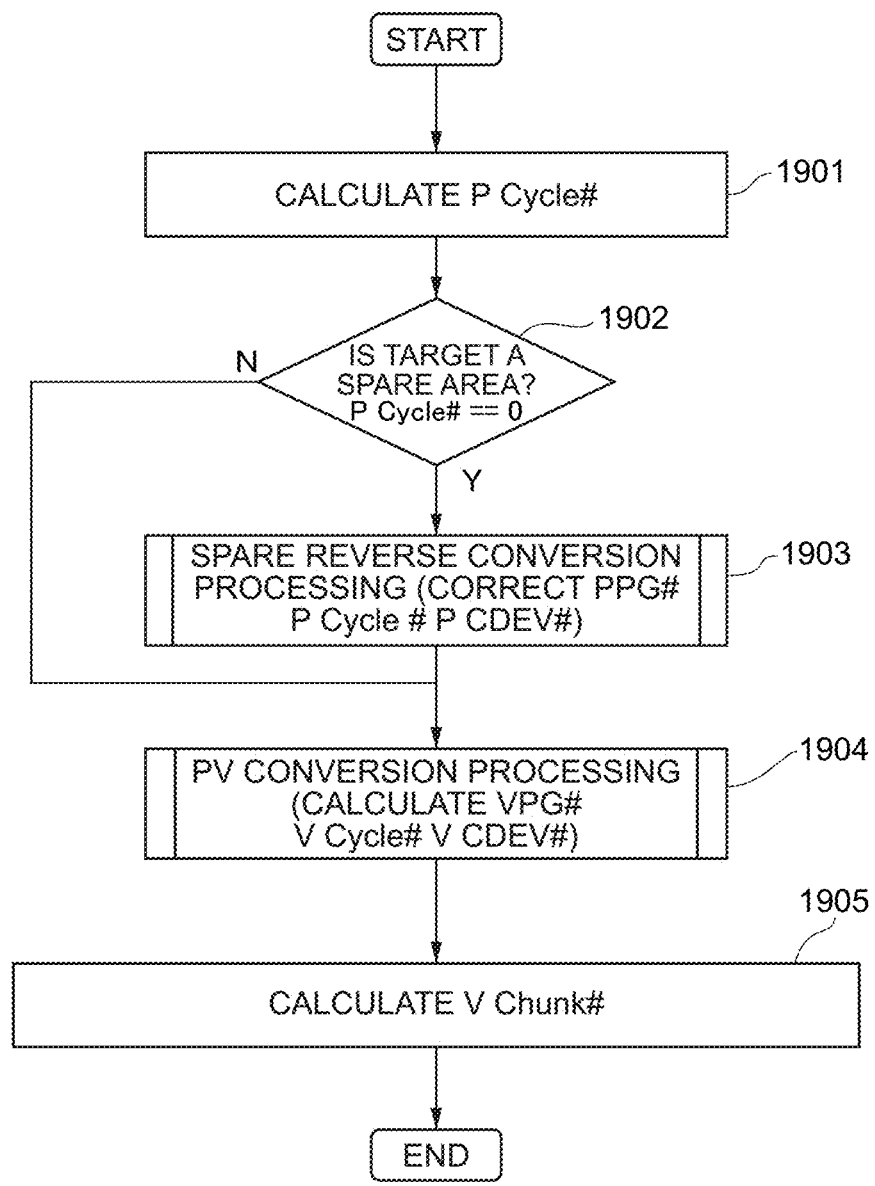
FIG. 22 is a flowchart showing the flow of PL conversion processing according to the first embodiment.

As shown in FIG. 22, in the PL conversion processing, the microprocessor 121 foremost calculates the physical cycle (P Cycle#) from the physical chunk (P chunk#) (step 1901). In step 1901, the physical cycle can be calculated based on the following formula.

$$P \text{ Cycle\#} = P \text{ Chunk\#} \bmod (c+1) \qquad [\text{Math. 5}]$$

Subsequently, the microprocessor 121 determines whether the target is a spare area based on the calculated physical cycle (P Cycle#) (1902). This determination can be made by determining whether or not the physical cycle (P Cycle#) is 0.

When the target is not a spare area in step 1902; that is, when it is determined that the physical cycle (P Cycle#) is not 0, the microprocessor 121 executes the PV conversion processing, and calculates the virtual parity group address (VPG# V Cycle# V CDEV#) (step 1904). The PV conversion processing will be explained in detail later.

The microprocessor 121 thereafter calculates the virtual chunk (V chunk#) (step 1905). The calculation of the virtual chunk (V chunk#) from the virtual cycle (V Cycle#) can be made based on the following formula.

$$V \text{ Chunk\#} = \text{floor}(P \text{ Chunk\#}/(c+1)) * c + P \text{ Cycle\#} - 1 \qquad [\text{Math. 6}]$$

Meanwhile, when it is determined that the target is a spare area in step S1902; that is, when it is determined that the P Cycle# is 0, the microprocessor 121 implements the spare reverse conversion processing, and corrects the physical parity group address (PPG# P Cycle# P CDEV#) (step 1903). The microprocessor 121 thereafter proceeds to step 1904. The correction processing of step 1903 will be explained in detail later.

Figure 23:
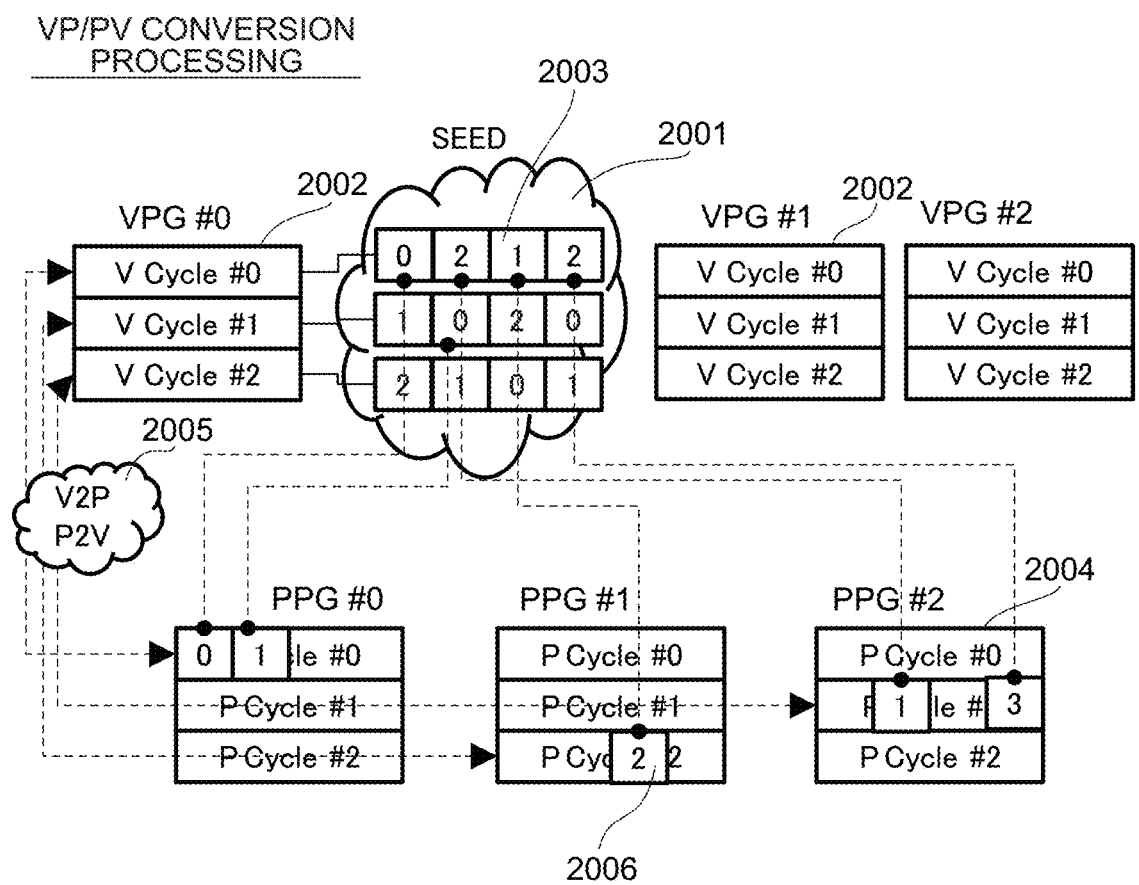
FIG. 23 is a flowchart showing the flow of VP/PV conversion processing according to the first embodiment.

The VP/PV conversion processing of the computer system according to this embodiment is now explained with reference to FIG. 23. FIG. 23 is a conceptual diagram showing the VP/PV conversion. The VP/PV conversion is calculated according to the conversion 2005 based on the parcel mapping table (V2P, P2V) and the conversion 2001 based on the SEED table.

The parcel mapping table (V2P, P2V) manages the prioritized aggregate of PPG#P Cycle# as the physical placement destination regarding the parcel in the respective virtual cycles (V Cycle#) in the virtual parity group (VPG#). Moreover, the SEED table is a table for managing the pattern upon distributing and placing the data in the aggregate of PPG#P Cycle#. For example, it can be seen that the V chunk

2002 of the V Cycle#0 of the VPG#0 corresponds to the P Cycle#0 of the PPG#0 based on the V2P. In addition, correction is performed using the values of the SEED table. For example, the V Cycle#0 of the VPG#0 and the parcel of the VCDEV#2 correspond to the V Cycle#2 of the PPG#1 and the parcel 2006 of the PCDEV#2. As a specific formula, the VP conversion is calculated based on the following formula.

$$PPG\# = V2P[VPG\#] \qquad \text{[Math. 7]}$$

$$P\ Cycle\# = \frac{[(SEED[VPG\#][VCDEV\#] + V\ Cycle\#)\ \text{mod}\ c] \cdot PPG}{V2P[VPG\#][(SEED[VPG\#][VCDEV\#] + V\ Cycle\#)\ \text{mod}\ c] \cdot PCycle}$$

$$P\ CDEV\# = VCDEV\#$$

Moreover, the PV conversion is calculated based on the following formula.

$$VPG\# = P2V[PPG\#][P\ Cycle\#] \cdot VPG \qquad \text{[Math. 8]}$$

$$V\ Cycle\# = (P2V[PPG\#][P\ Cycle\#] \cdot V\ Cycle - SEED[P2V[PPG\#][P\ Cycle\#] \cdot VPG]$$

$$[PCDEV\#])\ \text{mod}\ c$$

$$V\ CDEV\# = PCDEV\#$$

Figure 24A:
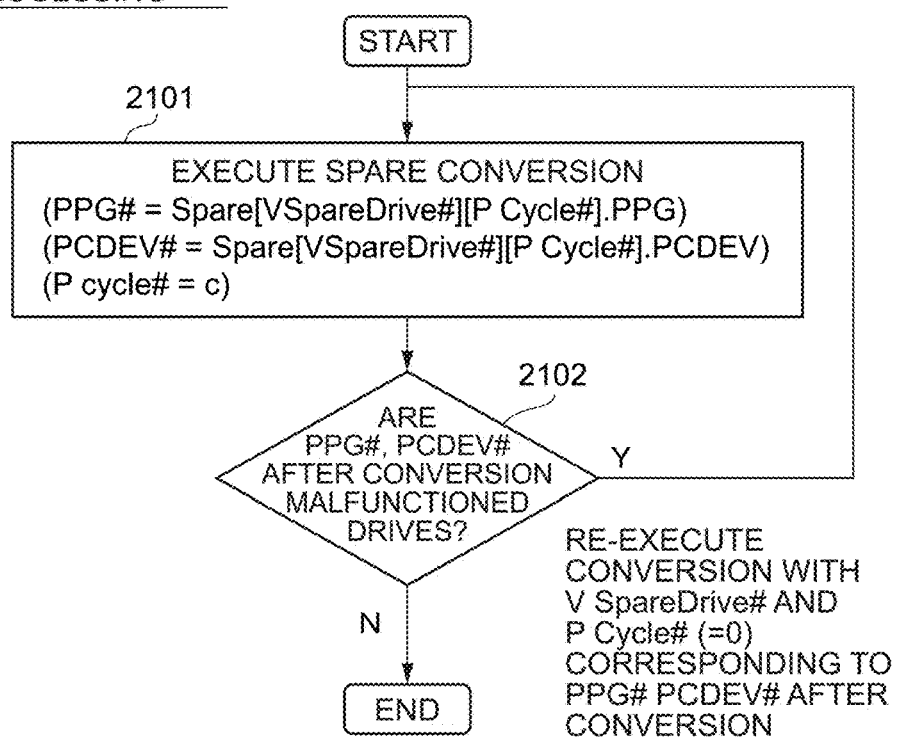
FIG. 24A is a flowchart showing the flow of spare conversion processing according to the first embodiment.
Figure 24B:
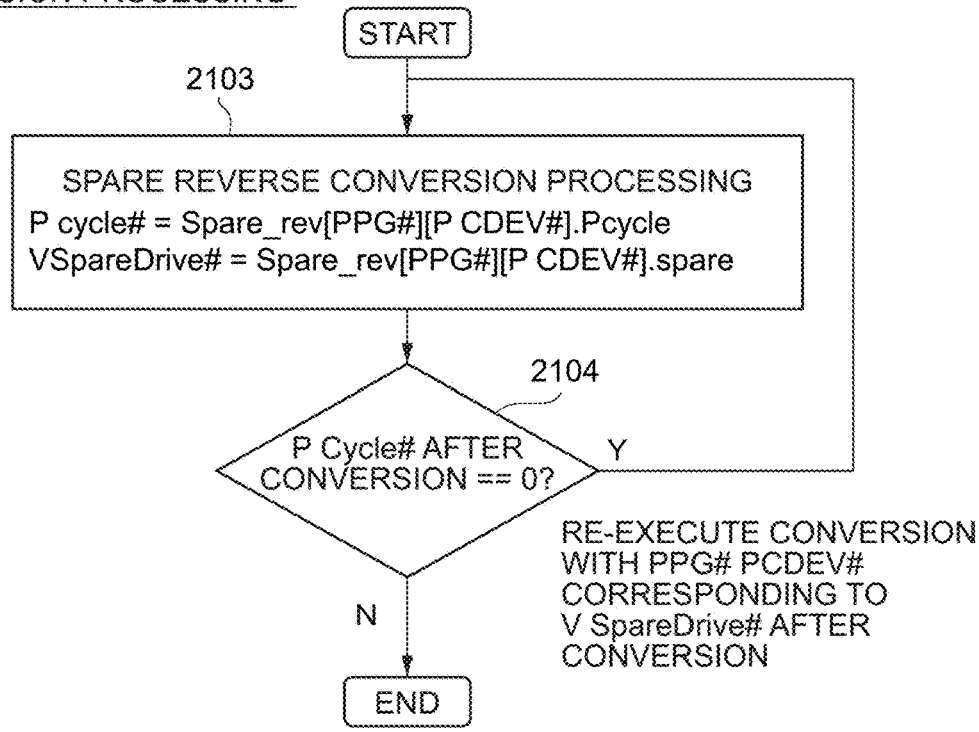
FIG. 24B is a flowchart showing the flow of spare reverse conversion processing according to the first embodiment.

The spare conversion processing of the computer system according to this embodiment is now explained. FIG. 24A shows the spare conversion processing, and FIG. 24B shows the spare reverse conversion processing.

The spare conversion processing is executed as a part of the LP conversion processing. As the input, the PPG#, PCDEV# and P Cycle# of the malfunctioned drive during a normal state before being saved in the spare area are given, and the equivalent address of the spare save destination is calculated.

The microprocessor 121 executes the spare conversion based on the spare conversion table (step 2101). Specifically, the microprocessor 121 calculates the address of the spare save destination based on the following formula.

$$PPG\# = Spare[VSpareDrive\#][P\ Cycle\#] \cdot PPG) \qquad \text{[Math. 9]}$$

$$PCDEV\# = Spare[VSpareDrive\#][P\ Cycle\#] \cdot PCDEV)$$

$$P\ cycle\# = c$$

The microprocessor 121 determines whether the PPG#, PCDEV# after the conversion is a malfunctioned drive based on the drive status table (step 2102). When it is determined that the PPG#, PCDEV# after the conversion is a malfunctioned drive in step 2102, the microprocessor 121 returns to step 2101, and executes the spare conversion once again upon inputting the V SpareDrive# and the P cycle# (=0) corresponding to the calculation result (PPG# PCDEV#) of the previous step 2101. Step 2102 is executed to search for the ultimate storage destination after saving the data in the spare area. This is because, when the drive containing that spare area additionally malfunctions, there are cases where that area is saved to a spare area of another drive. When it is determined that the PPG#, PCDEV# after the conversion is not a malfunctioned drive (N in step 2102), the processing is ended with the result of step 2101 as the ultimate result.

The spare reverse conversion processing is now explained with reference to FIG. 24B. The spare reverse conversion processing corresponds to the reverse conversion of the foregoing spare conversion processing. Based on the spare reverse conversion processing, the address of the malfunctioned drive during a normal state is calculated from the address of the spare save destination. That is, after the spare conversion processing is performed, if the spare reverse conversion processing is performed based on the result of the spare conversion processing, the same address will be returned. Moreover, the same applies vice versa.

As shown in FIG. 24B, the microprocessor 121 executes the spare conversion based on the spare reverse conversion table (step 2103). Specifically, the address of the malfunctioned drive is calculated based on the following formula.

$$P\ cycle\# = Spare\_rev[PPG\#][P\ CDEV\#] \cdot Pcycle \qquad \text{[Math. 10]}$$

$$VSpareDrive\# = Spare\_rev[PPG\#][P\ CDEV\#] \cdot spare$$

Subsequently, the microprocessor 121 determines whether the physical cycle (P cycle#) after the conversion is 0 (step 2104). When it is determined that the physical cycle (P cycle#) after the conversion is 0 in step 2104, since that address is being used as the spare save destination, the PPG# PCDEV# corresponding to the calculation result (V Spare-Drive#) of step 2103 are input, and the spare reverse conversion (step 2103) is executed once again. Meanwhile, when it is determined that the physical cycle (P cycle#) after the conversion is not 0 in step 2104, since it means that the address is a regular address, the processing is ended with the result of step 2101 as the ultimate result.

The parcel mapping table generation processing of the computer system according to this embodiment is now explained. The parcel mapping table generation processing is the processing that is executed during the initial setting of the system or during the creation of a pool, and determines the initial placement of the parcel mapping table (V2P, P2V). This processing is implemented to the VPG#, V Cycle# to which mapping has not yet been performed.

Figure 25:
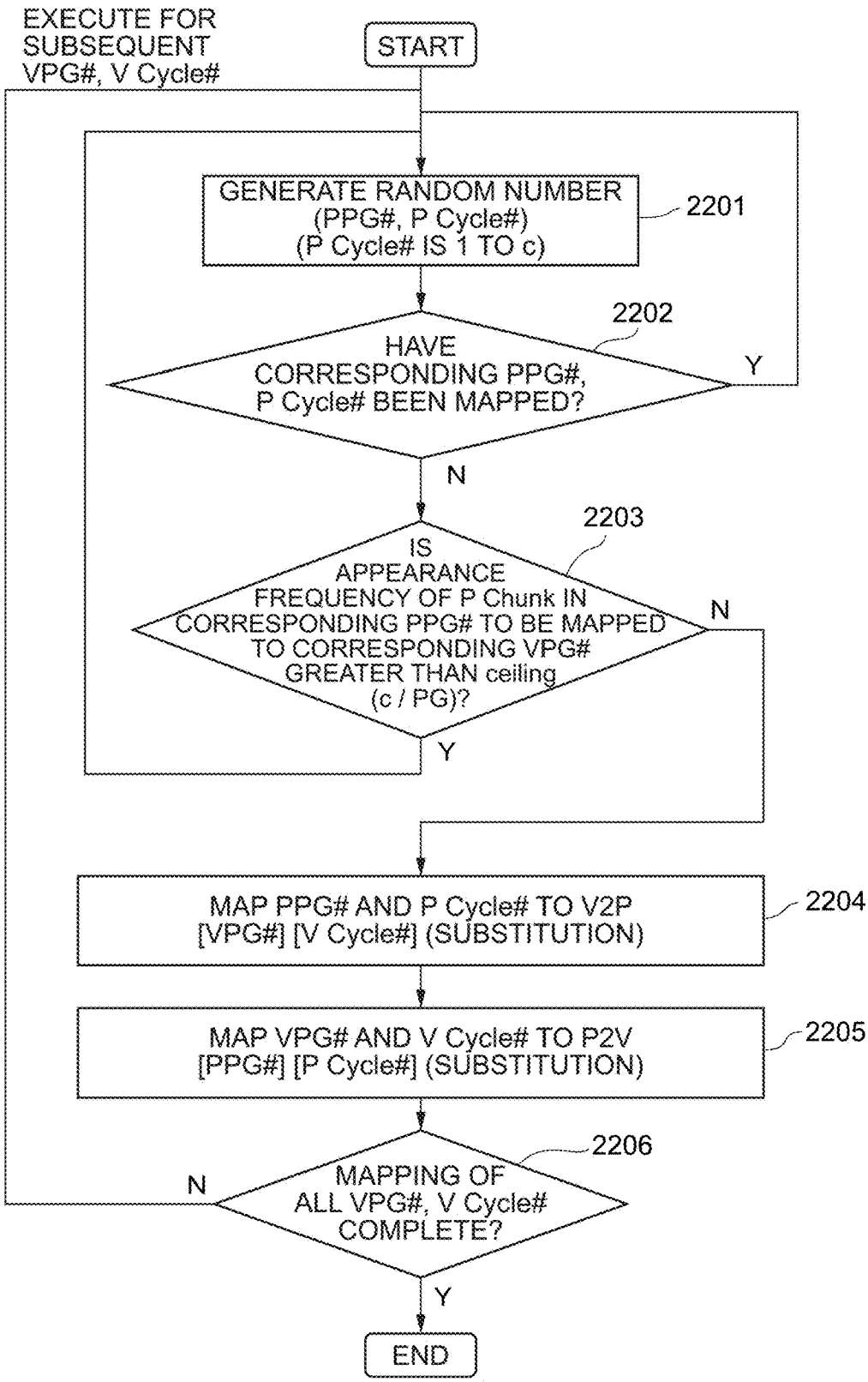
FIG. 25 is a flowchart showing the flow of parcel mapping table generation processing according to the first embodiment.

As shown in FIG. 25, the microprocessor 121 foremost generates a random number (PPG#, P Cycle#) (step 2201). As the methods of generating a random number, used may be, for instance, a method of generating a pseudo random number such as the linear congruent method, or the random number may be generated according to a predetermined random number table. Here, the random number is generated by considering the PPG# to be the identifier loaded in the dispersion group (DG), and the P Cycle# as the integer in the range of 1 to c.

Subsequently, the microprocessor 121 determines whether the PPG#, P cycle# obtained in step 2201 have already been subject to mapping by referring to the P2V table (step 2202). In step 2202, the determination of whether mapping to the P2V table has already been performed can be made by determining when an invalid value is input in the P2V table.

When it is determined that mapping has been performed in step 2202, the microprocessor 121 returns to step 2201, and generates a different random number. Meanwhile, when it is determined that mapping has not been performed in step 2202, the microprocessor 121 determines whether the appearance frequency of the physical chunk (P Chunk) of the physical parity group (PPG#) to be subsequently mapped to the virtual parity group (VPG#) is greater than the ceiling (c/PG) (step 2203). Specifically, the microprocessor 121 refers to the P2V table with the physical parity group (PPG#) and the physical cycle (P Cycle) (search with 1 to c), and determines whether the result of counting the appearance frequency of the virtual parity group (VPG#) is not less than the ceiling (c/PG).

The purpose of step 2203 is to balance the load of the drive to be accessed by the respective virtual parity groups (VPG) as much as possible. When the determination of step 2203 is affirmative, since the load balancing efficiency will deteriorate, the microprocessor 21 returns to step 2201 and generates a different random number. Meanwhile, when the determination of step 2203 is negative, the PPG#, P Cycle# and the VPG#, V cycle# are mapped. Specifically, the microprocessor 121 maps (performs substitution of) the PPG# and P cycle# to the V2P [VPG#] [V Cycle#] (step 2204), and maps (performs substitution of) the VPG# and V cycle# to the P2V [PPG#] [P Cycle#] (step 2205).

The microprocessor 121 thereafter determines whether the mapping is complete for all VPG#, V cycle# (step 2206). When it is determined that the mapping is not complete in step 2206, the processing of step 2201 onward is executed for the subsequent unmapped VPG#, V Cycle#. Meanwhile, when it is determined that the mapping is complete in step 2206, this processing is ended.

The spare mapping table generation processing of the computer system according to this embodiment is now explained. The spare mapping table generation processing is the processing that is executed at the initial stage of the rebuild processing when a drive becomes inaccessible due to a malfunction of the drive or the like. This processing generates the spare area as the save destination of data stored in the malfunctioned drive, and the mapping (spare mapping table) of the virtual spare drive.

Figure 26:
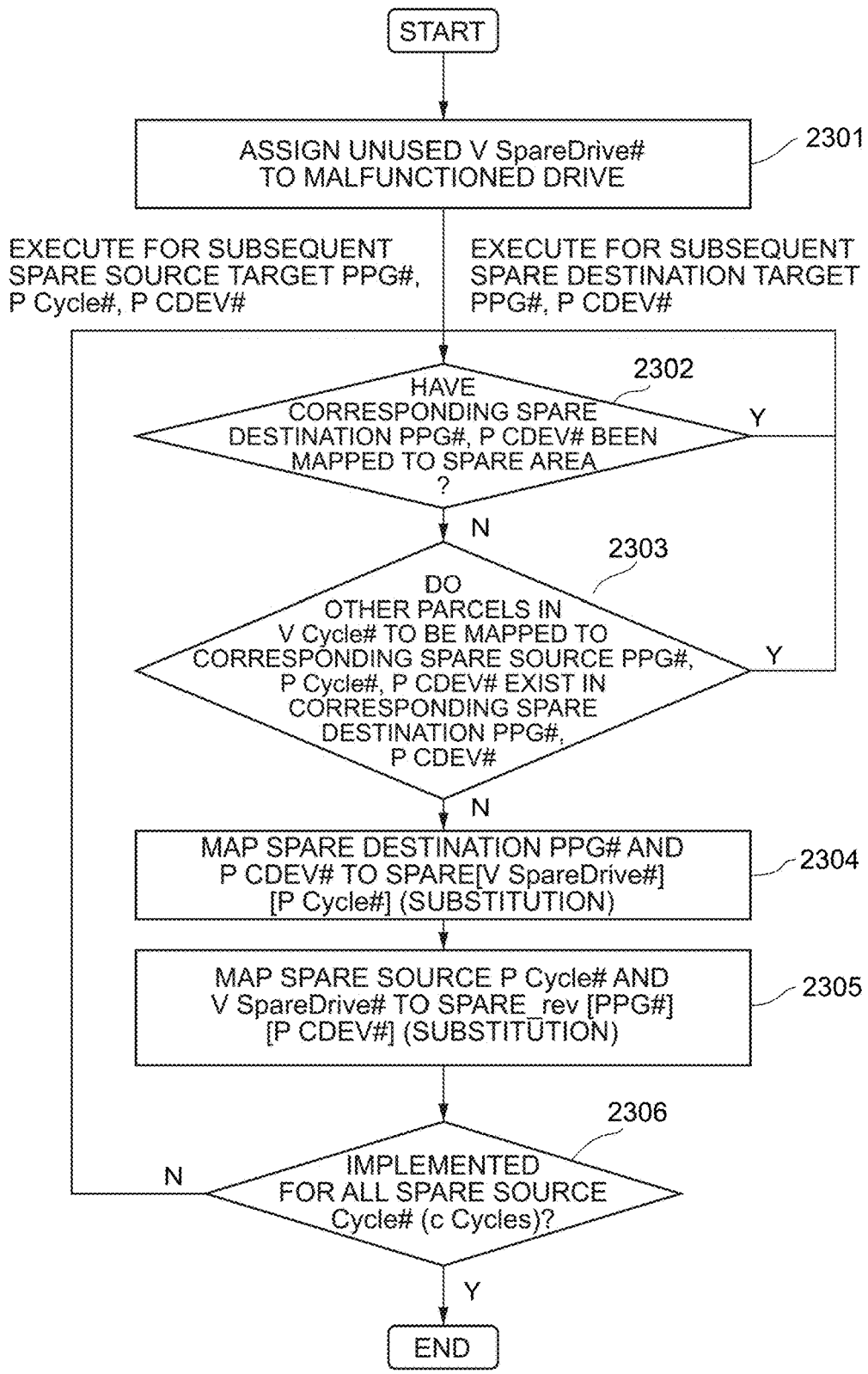
FIG. 26 is a flowchart showing the flow of spare mapping table generation processing according to the first embodiment.

As shown in FIG. 26, the microprocessor 121 assigns an unused V SpareDrive# to the malfunctioned drive (step 2301). Specifically, the microprocessor 121 refers to the virtual spare management table 702, and selects a virtual spare drive belonging in the dispersion group (DG) to which the physical parity group (PPG#) corresponding to the malfunctioned drive belongs, and which is of an "unused" state.

The microprocessor 121 thereafter implements the subsequent processing to the parcel (PPG#, P Cycle#, P CDEV#) in which the mapping of the spare area in the spare source target parcel has not yet been decided.

The microprocessor 121 selects one spare destination-target parcel (PPG#, P CDEV#, P Cycle#=0 fixed), and determines whether the spare destination PPG# and P CDEV# have already been subject to spare area mapping (step 2302). As the method of selecting the spare destination-target parcel, considered may be a method of assigning to the same CDEV# as the malfunctioned drive as much as possible in order to prevent the occurrence of data loss during the simultaneously malfunction of the same CDEV# caused by a path failure or the like. Otherwise, the method of randomly selecting the spare destination-target parcel, or the method of selecting the spare destination-target parcel in the numerical order of CDEV#, PPG# may also be adopted.

In step 2302, the microprocessor 121 can refer to the spare mapping reverse conversion table (spare_rev), and determines whether the target has already been mapped. When it is determined that the target has already been mapped in step 2302, the microprocessor 121 selects a different spare destination-target parcel and implements the determination processing of step 2302 once again.

Meanwhile, when it is determined that the target has not been mapped in step 2302, whether another Parcel in the V Cycle# to be mapped to the spare source PPG# P Cycle#, P CDEV# exists in the spare destination PPG#, P CDEV# is determined (step 2303). The determination processing of step 2303 can also be determined by referring to the spare mapping reverse conversion table (spare_rev). In step 2303, when two or more parcels in the same V chunk are included in the same drive as the spare save destination, the redundancy level will drop two levels in one sitting if that drive were to malfunction and deteriorate the data loss resistance. Thus, the non-overlap of parcels is confirmed.

When it is determined that another parcel exists in step 2303, the microprocessor 121 selects a different spare destination-target parcel, and implements the determination processing of step 2302 once again. Meanwhile, when it is determined that another parcel does not exist in step 2303, the microprocessor 121 updates the spare mapping table in the subsequent processing since the spare destination parcel has been determined. Specifically, the microprocessor 121 maps (performs substitution of) the spare destination PPG# and P CDEV# to the Spare [V SpareDrive#] [P Cycle#] (step 2304), and maps (performs substitution of) the spare source P Cycle# and V SpareDrive# to the Spare_rev [PPG#] [P CDEV#] (step 2305).

Subsequently, the microprocessor 121 determines whether mapping has been performed for all spare source Cycle# (c cycles) (step 2306). When it is determined that mapping is not complete in step 2306, the microprocessor 121 executes processing from step 2302 to the unmapped spare source targets. Meanwhile, when it is determined that mapping is complete in step 2306, the microprocessor 121 ends the processing.

The rebuild processing of the computer system according to this embodiment is now explained. The rebuild processing is executed when it is no longer possible to access a drive due to a malfunction of that drive or other reasons, and is the processing of reading data of the recovery source to recover the redundancy level of the dispersion group (DG) and executing the data recovery processing, and thereafter writing the recovery data in the spare area. The rebuild processing is also referred to as the correction copy processing.

Figure 27:
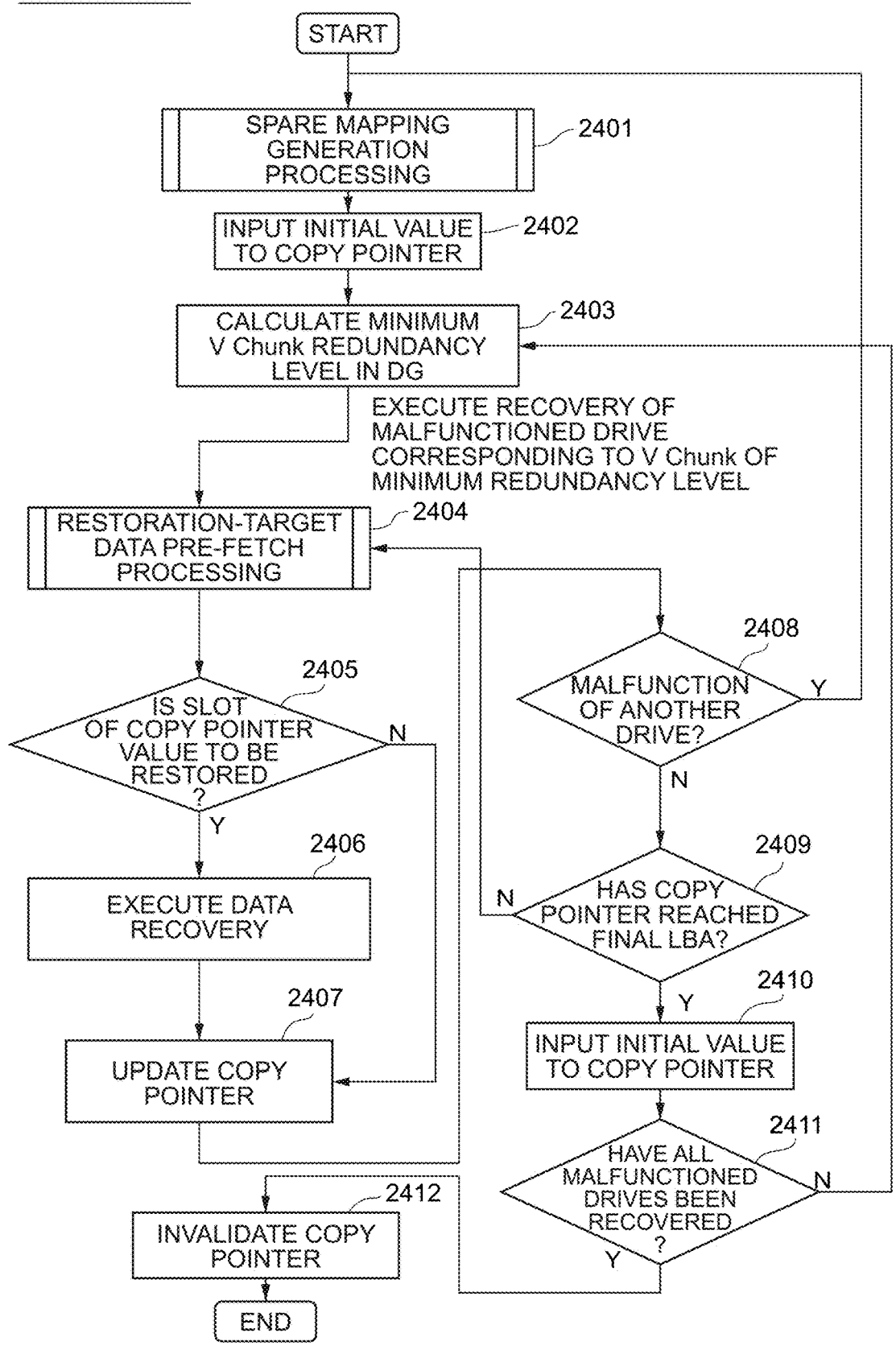
FIG. 27 is a flowchart showing the flow of rebuild processing according to the first embodiment.

As shown in FIG. 27, the microprocessor 121 foremost executes the spare mapping generation processing, and determines the virtual spare drive corresponding to the malfunctioned drive and the mapping to the spare area (step 2401).

Subsequently, the microprocessor 121 enters the initial value (=0) in the copy pointer of the virtual spare drive (step 2402). This copy pointer is the pointer showing up to which area the restoration has been completed.

Subsequently, the minimum virtual chunk (V chunk) redundancy level in the dispersion group (DG) is calculated (step 2403). With the placement of data in which chunks are distributed as with this embodiment, virtual chunks of a low redundancy level and virtual chunks of a high redundancy level will simultaneously arise during the multiple failure of drives. Under the foregoing circumstances, as shown in step 2403, the reliability can be improved further by executing the rebuild from the area of a low redundancy level. This priority processing (priority rebuild processing) is effective when the redundancy level is 2 or more, and the effect will be higher as the redundancy level increases. In the subsequent processing, recovery is executed regarding the malfunctioned drive corresponding to the V chunk of the minimum redundancy level (when multiple drives have malfunctioned).

Subsequently, the microprocessor 121 executes the restoration-target data pre-fetch processing (step 2404). Pre-fetch is the processing of staging, asynchronously with the present processing, the restoration-target data of the subsequent cycle onward (before the current copy pointer). The pre-fetch processing will be explained in detail later. Based on this pre-fetch processing, restoration processing can be performed in multiplicity, and the rebuilding time can be shortened.

Subsequently, the microprocessor 121 determines whether the slot of the copy pointer value is to be restored (step 2405). Specifically, when the redundancy level of the virtual chunk to which the restoration target parcel belongs is not the minimum redundancy level obtained in step 2403 or when a page has not been assigned regarding the area of the copy pointer location (N in step 2405), since the execution of the recovery processing is not required, the microprocessor 121 skips the determination processing of step 2405 and proceeds to step 2407.

Meanwhile, when the target slot is to be restored in step 2405, the microprocessor 121 executes the data recovery processing (step 2406). In step 2406, while it can be expected that the data of the of the copy pointer value will be staged in the cache based on the pre-fetch processing of step 2404, when the restoration-target data is not in the cache (when pre-fetch was not performed at a stage when the copy pointer is small), after executing data staging, the data recovery processing is executed. Moreover, after executing the data recovery processing, by turning ON the dirty bit, the restored data is destaged to the spare area asynchronously with the collective writing.

The microprocessor 121 thereafter updates the copy pointer (step 2407). The copy pointer adds and advances the portion in which the data recovery was completed.

Subsequently, the microprocessor 121 checks whether another drive as not additionally malfunctioned (step 2408). In step 2408, when it is determined that another drive has additionally malfunctioned, the microprocessor 121 returns to step 2401, and executes the spare mapping generation processing to the additionally malfunctioned drive.

Meanwhile, in step 2408, when it is determined that another drive has not additionally malfunctioned, the microprocessor 121 determines whether the copy pointer has reached the final LBA (step 2409). The final LBA refers to the LBA at the tail end of the drive, and shows that the drive recovery processing is complete. In step 2409, when it is determined that the copy pointer has not yet reached the final LBA, the microprocessor 121 returns to step 2404.

Meanwhile, in step 2409, when it is determined that the copy pointer has reached the final LBA, the microprocessor 121 substitutes the initial value in the copy pointer (step 2410), and thereafter checks whether all malfunctioned drives have been recovered (step 2411). Whether all malfunctioned drives have been recovered is to confirm whether the redundancy level has been completely recovered.

In step 2411, when there is a malfunctioned drive that has not yet been recovered, the microprocessor 121 returns to the processing of step 2403. Meanwhile, when all malfunctioned drives have been recovered, the microprocessor 121 enters an invalid value to the copy pointer of the recovered drive (step 2412), and then ends the rebuild processing.

The restoration-target data pre-fetch processing of the computer system according to this embodiment is now explained. The restoration-target data pre-fetch processing is a part of the rebuild processing.

Figure 28:
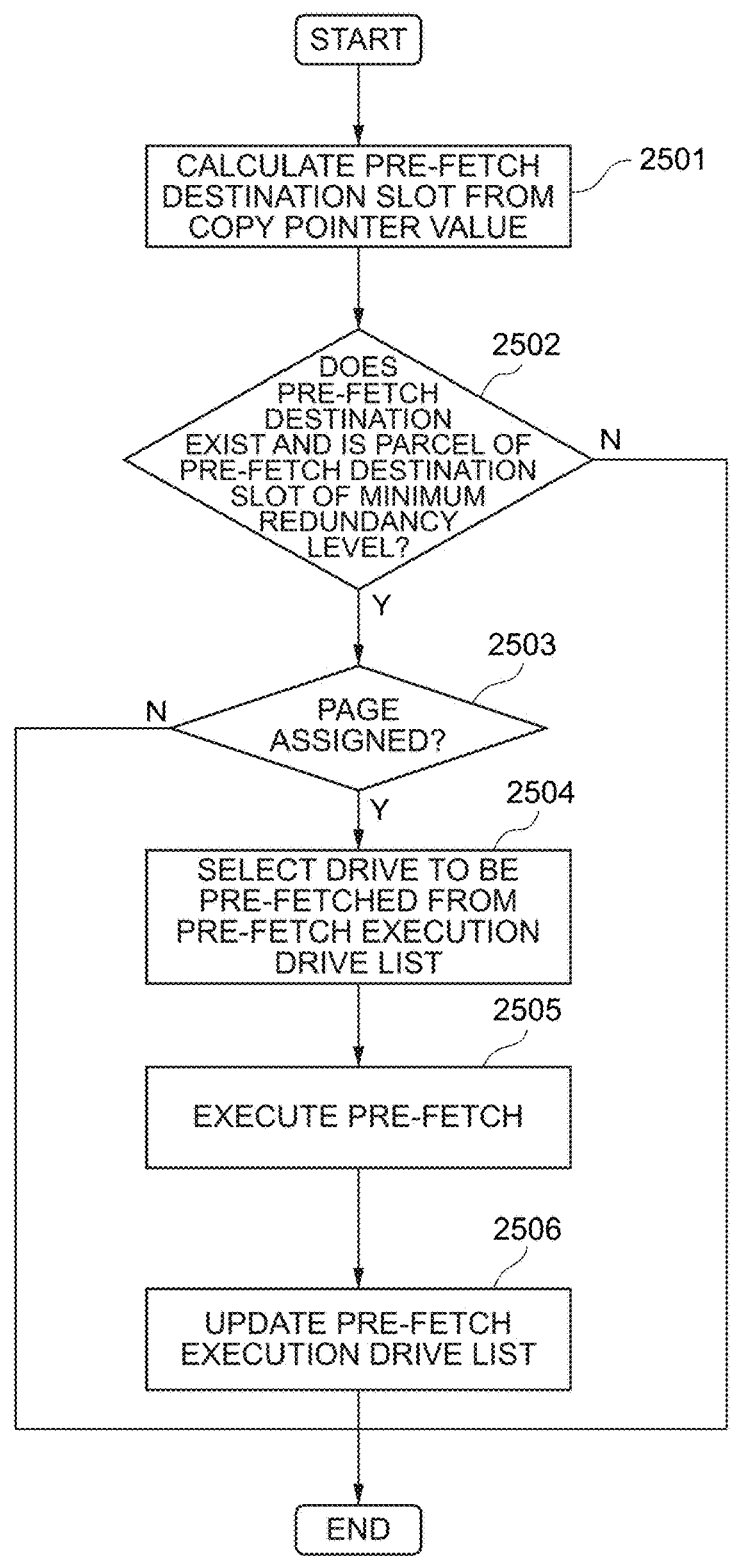
FIG. 28 is a flowchart showing the flow of restoration-target data pre-fetch processing according to the first embodiment.

As shown in FIG. 28, the microprocessor 121 foremost calculates the pre-fetch destination slot from the copy pointer value of the recovery-target drive (virtual spare drive) (step 2501). Specifically, a value obtained by adding a given value to the copy pointer value decided based on the system policy may be used as the address of the pre-fetch destination slot, or that value may be dynamically corrected based on the assignment status or the like of the parcel mapping table.

Subsequently, the microprocessor 121 determines whether there is a pre-fetch destination, and whether the parcel of the pre-fetch destination slot is of a minimum redundancy level (step 2502). Here, the existence of a pre-fetch destination represents that the process has not yet reached the tail end of the drive. In step 2502, when the pre-fetch destination is a virtual chunk (V chunk) that is not of a minimum redundancy level, the microprocessor 121 skips the parcel restoration processing, and executes it later. This is because, as described above, since a parcel of the virtual chunk (V chunk) that is not of a minimum redundancy level also exists, the restoration processing of the parcel of the virtual chunk (V chunk) that is not of a minimum redundancy level is skipped in step 2502, and executed later.

Meanwhile, in step 2502, when it is determined that it is of a minimum redundancy level, the microprocessor 121 determines whether a page has been assigned (step 2503). In step 2503, when it is determined that a page has not yet been assigned, since it is not a restoration target, the process is skipped and this processing is ended. Meanwhile, when it is determined that a page has been assigned, the microprocessor 121 selects a drive to be pre-fetched from the pre-fetch execution drive list (step 2504).

This processing aims to efficiently balance the load to the drives in cases of holding two or more redundant data such as in RAID 6 or triple mirroring. When there are two or more redundant data (this quantity is hereinafter referred to as "P"), data can be restored by reading N—P data. When the malfunctioned drive is P or less, options will appear in the read destination drives of the restoration data.

For example, when the RAID is 6D2P and one drive malfunctions, it will suffice if the data of six out of the seven non-malfunctioned drives is read. Thus, in the series of rebuild processing, by recording in the pre-fetch execution drive list the access count (I/O issue count 1306) of each drive to the drive that is being accessed for data restoration (to be used as the restoration source/destination before and after the process), and avoid selecting the Parcel of a drive with a high access frequency (to which the load is concentrated), it is possible to exhibit the parallel effect and thereby further shorten the rebuild time. In step 2504, it would be efficient to make the selection from the drive having the smallest I/O issue count in the foregoing pre-fetch execution drive list.

The microprocessor 121 subsequently executes the pre-fetch (step 2505). The pre-fetch is the staging processing to be asynchronously executed with the present processing (reading the designated data from the drive and storing such data in the cache). Subsequently, as described above, the microprocessor 121 updates the I/O count of the pre-fetch execution drive list (step 2506), and then ends the processing.

An example of the data mapping of the virtual parity group and the physical parity group is now explained. FIGS.

29A to 29C are conceptual diagrams showing an example of the data mapping of the virtual parity group and the physical parity group.

Figure 29A:
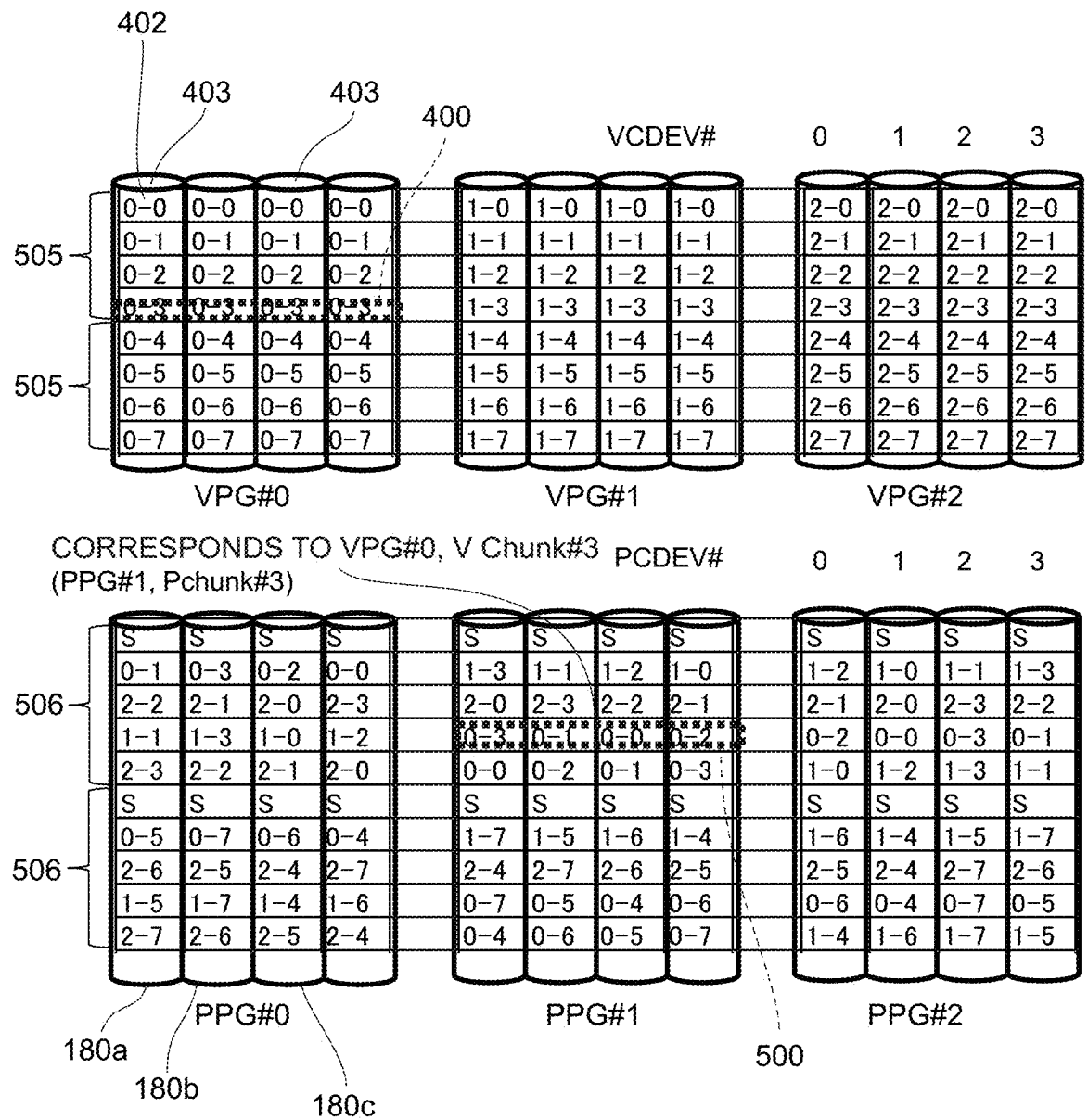
FIG. 29A is a conceptual diagram showing an example of the data mapping according to the first embodiment.

FIGS. 29A to 29C show an example of N=4 (four drives), c=4 (four parcels), PG=3 (PG represents the number of physical parity groups in the dispersion group (DG)). In the ensuing explanation, the effect of this embodiment is described with reference to FIGS. 29A to 29C.

The symbol "x" of the identifier "x-y" indicated in the parcel 402 in the virtual parity group (VPG) of the diagram represents the virtual parity group number (VPG#). The symbol "y" represents the virtual chunk number (V Chunk#). The physical drive location corresponding to that parcel is indicated with the same identifier within the square (parcel) in the physical parity group (PPG).

In FIG. 29A, for example, the V Chunk 400 surrounded by a dotted line in the diagram corresponds to the P Chunk 500. Here, the top parcel in the V Chunk 400 corresponds to the top parcel in the P Chunk 500.

Moreover, each PPG is the same pattern for each cycle 506 (c=four parcels+one spare parcel), and each VPG is also the same pattern for each cycle 505 (c=four parcels).

FIG. 29B shows a case where one drive has malfunctioned (upper diagram) and a case where two drives have malfunctioned (lower diagram). (Placement on the VPG side is the same as FIG. 29A, and has been omitted.)

Here, shown is the rebuilding operation when the drive 180a malfunctions; that is, when the CDEV#0 of the PPG#0 malfunctions. Foremost, the parcel included in the malfunctioned drive is placed in the spare area (indicated as S) (spare mapping table generation processing). In FIG. 29B, the parcel shown with diagonal lines is the parcel placed in the spare area.

As shown in the upper diagram of FIG. 29B, the rebuild processing is executed to the spare area assigned to the parcel of the malfunctioned drive. When the redundancy level is 2 (2D2P), the lost data of the malfunctioned drive can be restored by reading the data of two drives. Parcels are selected among three drives so that the number of overall parcels will not overlap regarding the two drives. Consequently, the maximum read amount from the drive per cycle can be limited to an amount of two parcels worth of data, and the rebuild performance can be improved roughly 2.5 times in comparison to conventional RAID.

Moreover, the lower diagram of the FIG. 29B shows an example of a case where two drives (180a, 180b) have malfunctioned. The area shown with the diagonal dotted lines in the diagram is the area with a redundancy level of 0. In this embodiment, the area having a redundancy level of 0 is preferentially recovered. Consequently, the maximum read amount from the drive per cycle can be limited to an amount of one parcel worth of data, and the rebuild performance can be improved roughly 5 times in comparison to conventional RAID. Moreover, even in comparison to the foregoing case where one drive has malfunctioned, the recovery performance of the redundancy level can be improved roughly double.

At the point that the recovery of the dotted diagonal line portion is complete, since the overall redundancy level in the dispersion group (DG) becomes 1, it is possible to prevent the occurrence of data loss even when a drive subsequently malfunctions, and the reliability of the system can be improved in comparison to conventional RAID. This method of preferentially recovering the area in which the redundancy level is 0 can be implemented when the data protection method of a redundancy level of 2 or more is applied (RAID 6 or triple mirroring).

FIG. 29C shows a case where a failure exceeding the redundancy level has occurred; for example, a case where three or more drives simultaneously malfunction. The upper diagram of FIG. 29C shows an example where three drives (180a, 180b, 180c) are simultaneously blocked. With conventional RAID technology or the distributed RAID technology, when this kind of simultaneous multiple malfunction which exceeds the redundancy level occurs in an increased drive group (that is, PPG), it was not possible to prevent the occurrence of data loss. An increased drive group is often a drive group that went through the same production process at around the same time, and it is considered that the probability of multiple malfunctions occurring may increase upon the lapse of the product life or the like. Nevertheless, with this embodiment, since the combination of physical drives configuring the redundancy level is limited, it is possible to increase the possibility of being able to prevent the occurrence of data loss even if the foregoing simultaneous multiple malfunction.

For example, the upper diagram of FIG. 29C shows that there is no data loss area. However, it does not mean that data loss can be prevented in all cases where three drives simultaneously malfunction. Specifically, data loss will occur when the drives included in the area of the dotted diagonal lines (area of redundancy level 0) shown in the upper diagram of FIG. 29C simultaneously malfunction.

The lower diagram of FIG. 29C shows a case where data loss will occur. The lower diagram of FIG. 29C shows an example where three drives (180a, 180b, 180d) are simultaneously blocked. In the foregoing case, data loss will occur in the area corresponding to VPG#2, V chunk#2. Nevertheless, according to the present invention, since the combination of physical drives configuring the redundancy level is limited, in terms of probability, the area that will be subject to this kind of data loss will only be one area in nearly all cases. In this embodiment, since the virtual parity group (VPG) corresponding to the virtual volume is additionally assigned based on the priority, the virtual volume in which data loss will occur will be limited to those which have been preferentially assigned to the VPG#2.

As described above, even if data loss does occur, the ratio of virtual volumes that will be affected will decrease in accordance with the number of physical parity groups (PPG) that are increased. Accordingly, even in cases where a large-scale pool is configured, an effect is yielded in that the data recovery work during data loss can be limited to specific virtual volumes. Many systems have data backups in virtual volume units, and even if data is destroyed, such data can be restored in virtual volume units from that backup.

In the foregoing example, a case was explained where there are four (c=4) parcels, but generally speaking, the probability of causing the number of parcels per cycle during data loss to be one or less can be increased by setting the value of c to be not greater than the power of P of the parity group (PG). Moreover, generally speaking, as a result of setting the value of c to be not greater than the power of P−1 of the parity group (PG), it is possible to reduce the probability of the occurrence of data loss caused by simultaneous malfunction exceeding the redundancy level.

However, when the value of c is made too small, the effect of shortening the rebuild time will decrease, and the data loss ratio will become equivalent to a conventional RAID when c=1, and the data loss ratio will decrease as the value of c is greater. Moreover, when the value of c is made too large, while the stripe distribution range will expands; for instance, the band of the BE controller 143, the switch 161 and the CMPK 131, and the capacity limitation of the parity computing unit 141, due to the internal transfer bottleneck, the reliability will decrease. In other words, in order to simultaneously enjoy these three properties; namely, the simultaneous multiple drive failure resistance, shortening of the rebuild time, and the localization of loss range, the value of c is desirably set to be roughly the power of P−1 of PG, and to a level that will not exceed the transfer bottleneck.

(2) Second Embodiment (2-1) Outline of Computer System

The computer system including the storage system according to the second embodiment is now explained. In the ensuing explanation, the configuration that is different from the first embodiment is explained in detail, and a detailed explanation of the same configuration is omitted.

Since the hardware configuration of the computer system according to this embodiment is the same as the first embodiment, the detailed explanation thereof is omitted.

FIG. 30 is a diagram of the shared memory and the local memory of the computer system according to this embodiment.

As shown in FIG. 30, the shared memory 200 stores a V2P (Current) table 707a, a P2V (Current) table 708a as the reverse conversion table thereof, a V2P (Target) table 707b, a P2V (Target) table 708b as the reverse conversion table thereof, and a DG swap pointer table 2601.

As described above, with respect to the respective V2P tables and P2V tables, there are two types of tables of Current and Target. These are used for referring to the proper address midway during the increase/decrease processing of the dispersion group (DG) explained below. Current represents the current mapping table, and Target represents the target mapping table after the increase/decrease. Since the values stored in the respective V2P tables and P2V tables are the same as with the V2P tables and P2V tables of the first embodiment, the detailed explanation thereof is omitted. Moreover, the data generation method and data referral method of the respective V2P tables and P2V tables will be explained later.

Moreover, the local memory 122 additionally stores a PPG increase processing program 821, a PPG decrease processing program 822, a parcel rebalance processing program 823 and a page rebalance processing program 824. The processing to be executed by the respective programs will be explained in detail later. The DG swap pointer table 713 is a table for managing the value of the DG swap pointer when the target dispersion group (DG) is being increased or decreased.

As shown in FIG. 31, the DG swap pointer table 713 is configured from a pool number (pool#) column 7131, a Tier number (Tier#) column 2702, a dispersion group number (DG#) column 2703 and a DG swap pointer column 2704.

The pool number column 7131 stores the number for identifying the pool. The Tier number column stores the number for identifying the Tier. The dispersion group number column stores the number for identifying the dispersion group. DC swap pointer column 2704 stores the value of the DG swap pointer.

The DG swap pointer indicates the address of the LBA direction of the virtual parity group (VPG) space, and the data of the address before the DG swap pointer value represents that the data swap processing based on increase or decrease has been completed. Moreover, the data of the address which exceeds the value of the DG swap pointer represents that the increase or decrease is not yet complete.

Moreover, when the value of the DG swap pointer is an invalid value, this shows a state where the increase or decrease is not being performed, or has been completed. Moreover, the value of the DG swap pointer is initialized to 0 at the start of increase or decrease.

Figure 32:
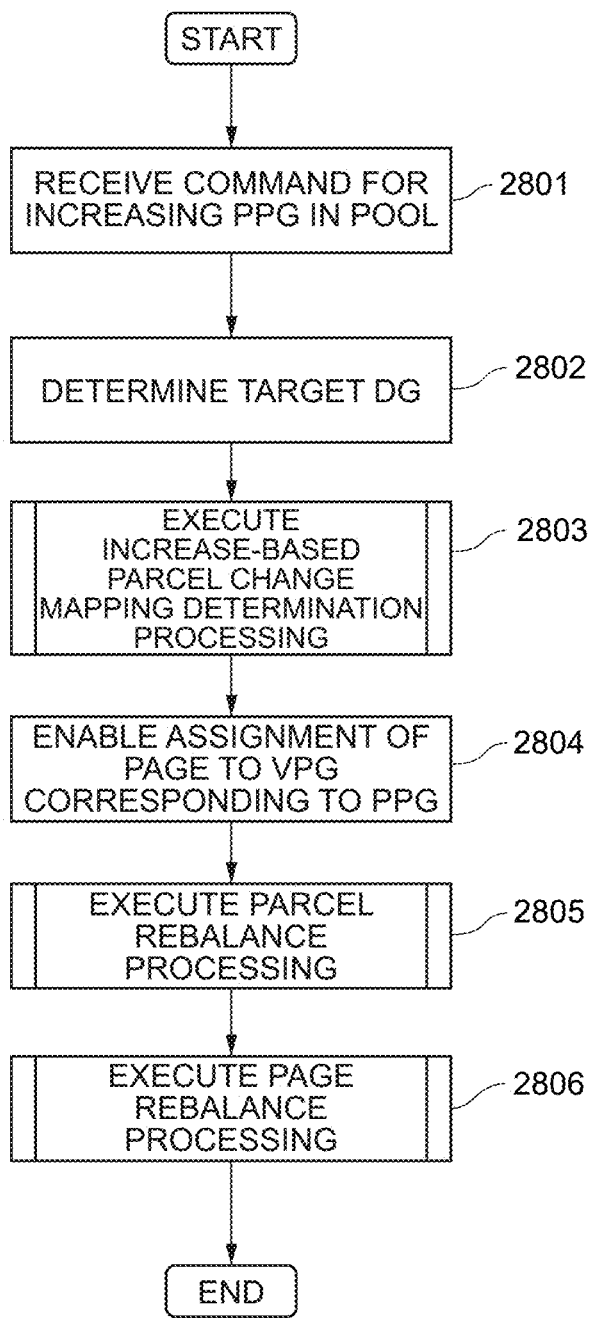
FIG. 32 is a flowchart showing the flow of PPG increase processing according to the second embodiment.

Details of the PPG increase processing in the computer system are now explained. The PPG increase processing is the processing of increasing the physical parity group (PPG) in the dispersion group (DG). Particularly, with a mission-critical storage system, in order to maintain the availability thereof, it is necessary to realize the increase of the physical parity group (PPG) in order to add capacity or improve performance while continuing the host I/O processing to the dispersion group (DG). Moreover, based on the increase, the load (host I/O load, rebuilding load) needs to be balanced. FIG. 32 shows the overall image of the PPG increase processing.

As shown in FIG. 32, the microprocessor 121 receives an increase command for increasing the physical parity group (PPG) in the pool (step 2801), whereby the PPG increase processing is started. In the increase command received in step 2801, the increase-target physical parity group number (PPG#) is designated. There may be a plurality of increase-target physical parity groups (PPG#).

Subsequently, the microprocessor 121 determines the increase-target dispersion group (DG) (step 2802). The increase-target dispersion group may be automatically determined from the drive type of the physical parity group (PPG) by using the pool management table, or determined from the dispersion group (DG#) included in the increase command.

Subsequently, the increase-based parcel change mapping determination processing is executed (step 2803). As a result of the increase-based parcel change mapping determination processing, the Current table of the increased physical parity group (PPG) and virtual parity group (VPG) and the Target table as the target mapping after the increase are generated. The specific generation method will be explained in detail later.

Subsequently, page assignment to the virtual parity group (VPG) corresponding to the physical parity group (PPG) is enabled (step 2804). Specifically, the identifier of the increased physical parity group (PPG#) is added, as the virtual parity group (VPG#) to the entry of that dispersion group (DG) of the pool management table. Based on the processing of step 2804, the increased physical parity group (PPG) can be used as the pool capacity.

The processing of step 2801 to step 2804 can be executed at a high speed since the data migration between drives is not required. Consequently, it is possible to respond to a request of wanting to immediately start the assignment of pages due to the depletion of capacity.

Subsequently, the microprocessor 121 executes the parcel rebalance processing (step 2805). In the parcel rebalance processing, the data swap processing is executed to relocate the data placement of the Current parcel mapping table to the data placement of the Target data placement. The specific method will be explained in detail later.

Subsequently, the microprocessor 121 executes the page rebalance processing (step 2806). In the page rebalance processing, the page placement in the virtual volume is changed based on the priority table. The effect of failure range localization is greater as the number of virtual parity groups (VPG) (=PG) in the dispersion group (DG) is greater relative to the overall virtual volume.

When the number of virtual volumes is constant, the failure range can be localized more if the number of virtual volumes assigned per one virtual parity group (VPG) based on the priority table is fewer. In other words, if the number of virtual volumes to be assigned is decreased, the number of virtual volumes that will be affected upon the occurrence of a failure can also be reduced. This page rebalance processing aims to reduce the number of virtual volumes to be assigned per one virtual parity group (VPG) based on the priority table by migrating the page of a specific virtual volume to the increased virtual parity group (VPG).

Figure 33:
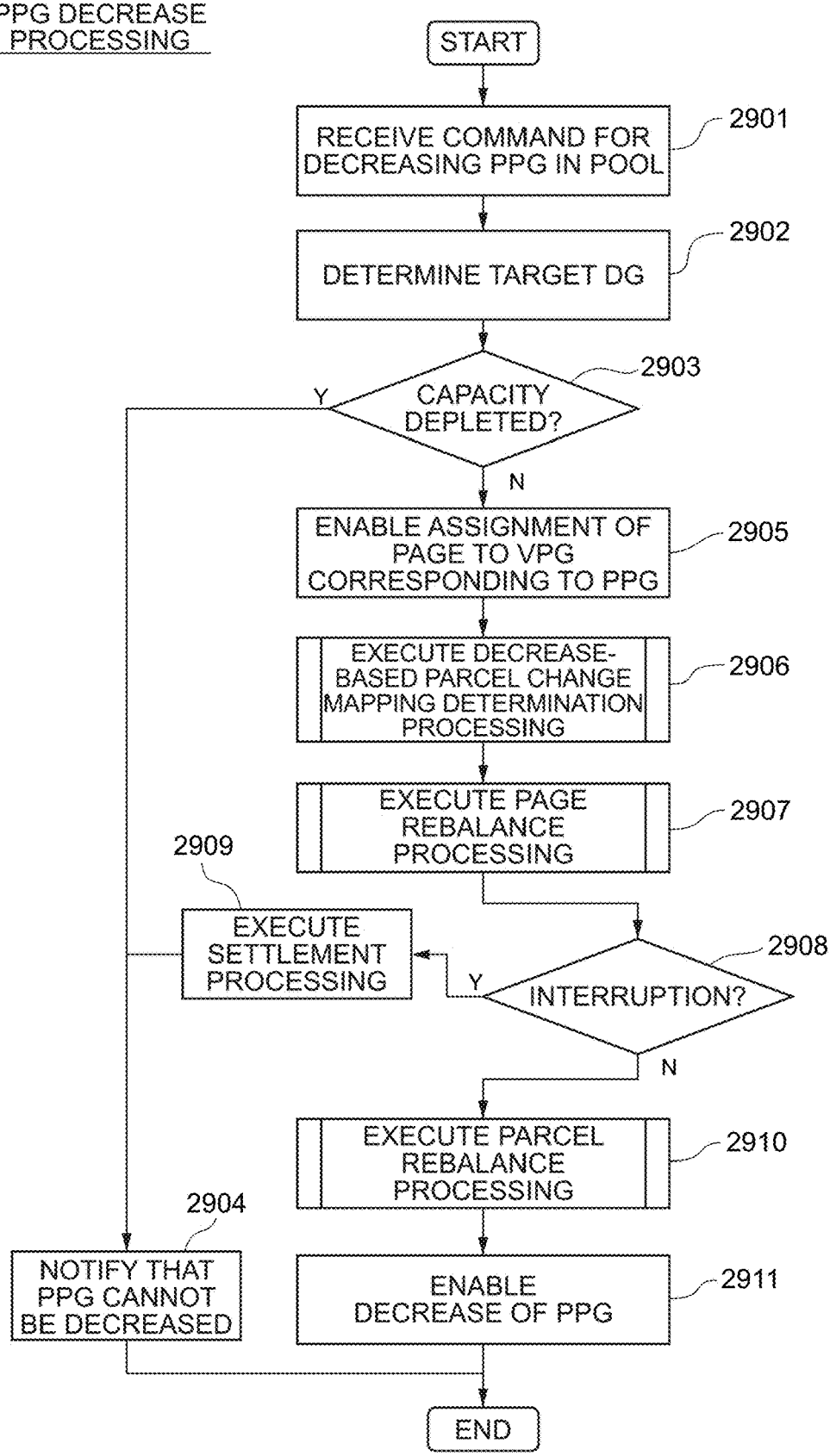
FIG. 33 is a flowchart showing the flow of PPG decrease processing according to the second embodiment.

Details of the PPG decrease processing in the computer system are now explained. The PPG decrease processing is the processing of decreasing the physical parity group (PPG) from the dispersion group (DG). Particularly, with a mission-critical storage system, in order to maintain the availability thereof as with the foregoing PPG increase processing, it is necessary to realize the decrease of the physical parity group (PPG) for maintenance of the like while continuing the host I/O processing to the dispersion group (DG). FIG. 33 shows the overall image of the PPG decrease processing.

As shown in FIG. 33, the microprocessor 121 receives a decrease command for decreasing the physical parity group (PPG) in the pool (step 2901), whereby the PPG decrease processing is started. In the decrease command received in step 2901, the decrease-target physical parity group number (PPG#) is designated. There may be a plurality of decrease-target physical parity groups (PPG#).

Subsequently, the microprocessor 121 determines the decrease-target dispersion group (DG) (step 2902). The decrease-target dispersion group (DG#) may be automatically determined from the drive type of the physical parity group (PPG) by using the pool management table, or determined from the dispersion group (DG#) included in the decrease command.

Subsequently, whether the pool capacity will become depleted during the decrease processing is determined based on estimation (step 2903). Specifically, whether the total page amount of the pool after the decrease will fall below the current page assignment is determined. In addition, since in reality pages are assigned even during the execution of the decrease, there is a possibility that the capacity may become depleted until the decrease is completed, and the estimation may be made in consideration of the inclination of the current new page assignment.

In step 2903, when it is estimated that the capacity will become depleted (Y in step 2903), the microprocessor 121 notifies, through the maintenance I/F or the like, the storage administrator that decrease is not possible (step 2904), and then ends the processing. In the foregoing case, the administrator may take measures such as executing the decrease processing after executing the increase processing to the pool in advance.

Meanwhile, in step 2903, when it is estimated that the capacity will not become depleted (N in step 2903), the assignment of pages to the virtual parity group (VPG) corresponding to the decreased physical parity group (PPG) is disabled (step 2905). Specifically, the entry of the virtual parity group (VPG#) of the identifier of the decreased physical parity group (PPG#) is deleted from the entry of that dispersion group (DG) of the pool management table.

Subsequently, the decrease-based parcel change mapping determination processing is executed (step 2906). Based on this processing, the Target mapping for the parcel rebalance is determined. The decrease-based parcel change mapping determination processing will be explained in detail later.

Subsequently, the page rebalance processing is executed (step 2907). Based on this processing, the page assigned to the decrease-target virtual parity group (VPG) can be migrated to a remaining virtual parity group that will not be decreased, and the target virtual parity group (VPG) can be decreased together with the physical parity group (PPG).

The page rebalance processing will be explained in detail later. The page rebalance processing is cancelled when there is no longer any unused page area of the virtual parity group (VPG) of the page migration destination (Y in step 2908). For example, there may be cases where the total number of pages becomes greater than the total number of pages estimated in step 2903 as a result of new assignments occurring numerous times unexpectedly due to the characteristics of the host I/O processing. In such a case (Y in step 2908), the microprocessor 121 executes the settlement processing (step 2909). Subsequently, the microprocessor 121 notifies the system administrator, through the maintenance I/F or the like, that the decrease is not possible (step 2904), and then ends the processing.

The settlement processing is to return the page rebalance to its original state since the page rebalance executed in step 2907 is still midway (migrate the page to the VPG that was to be decreased). When the page rebalance processing is not cancelled (N in step 2908), all pages of the decrease-target virtual parity group (VPG) will be of an unassigned state.

The parcel rebalance processing is thereafter executed (step 2910). Based on the parcel rebalance processing, the parcels placed in the decrease-target physical parity group (PPG) are migrated to the non-decrease-target physical parity group (PPG). Specifically, data is migrated to the parcel area of the non-decrease-target physical parity group to which was mapped the decrease-target virtual parity group (VPG) that became unused in step 2907.

Subsequently, the physical decrease of the physical parity group (PPG) is enabled (step 2911), and the processing is then ended. The processing of enabling the physical decrease of the physical parity group (PPG) specifically corresponds to the spin down processing in the case of an HDD.

The VP/PV conversion processing upon increasing the physical parity group (PPG) of the computer system according to this embodiment is now explained. The increase-based VP/PV conversion processing corresponds to the VP/PV conversion processing that is executed during the LP/PL conversion explained in the first embodiment. While the increase/decrease processing is being implemented, it is necessary to refer to one of the two types of mapping tables (Current/Target) and determine whether to implement the VP/PV conversion.

Figure 34:
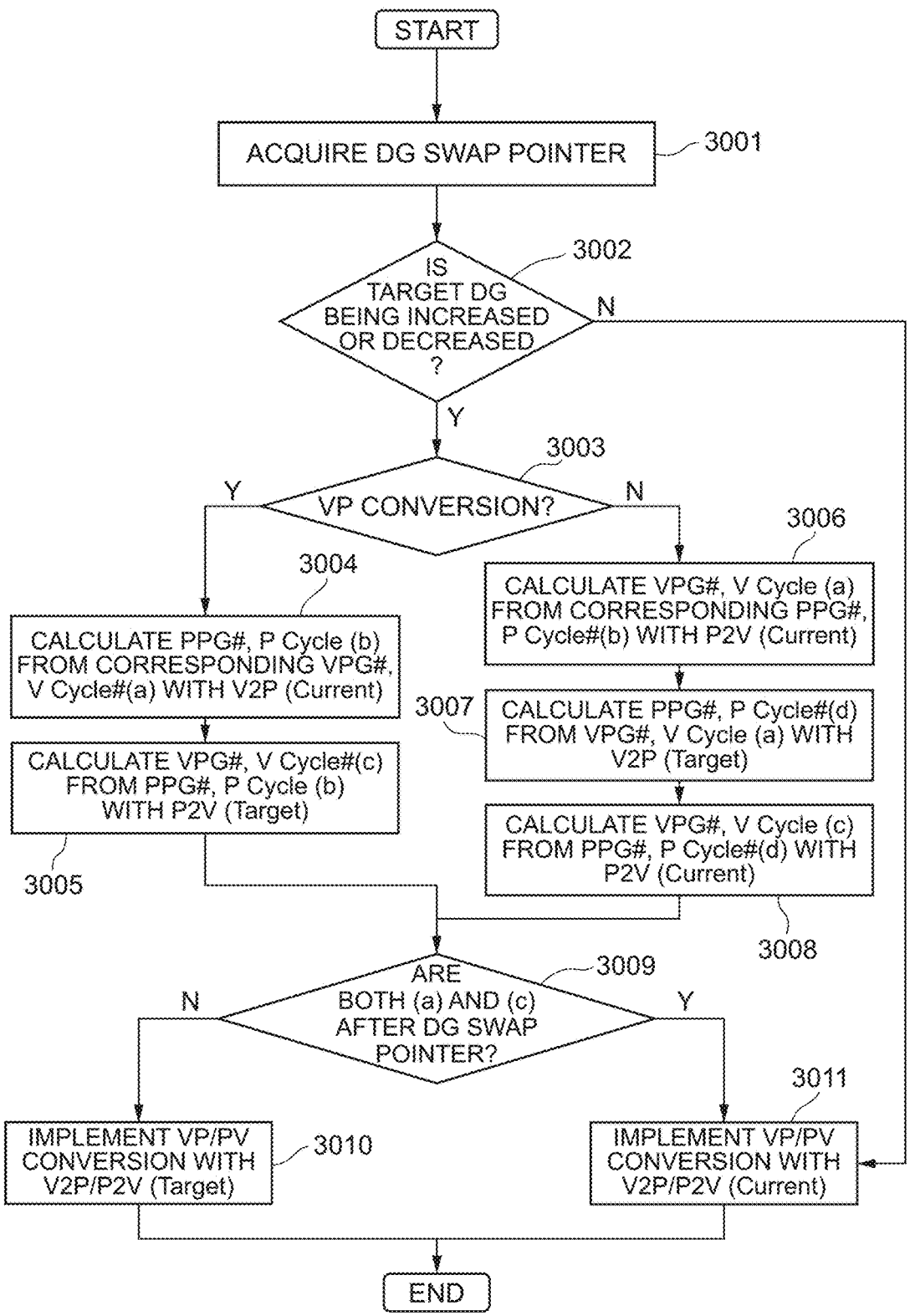
FIG. 34 is a flowchart showing the flow of VP/PV conversion processing according to the second embodiment.

As shown in FIG. 34, the microprocessor 121 acquires the DG swap pointer with VPG#, VCDEV#, V Cycle#, V Chunk#, LBA as the inputs in the case of VP conversion, and with PPG#, PCDEV#, P Cycle#, P Chunk#, LBA as the inputs in the case of PV conversion (step 3001). The dispersion group (DG#) can be obtained from the input VPG# or PPG# by referring to the pool management table 701, and the target DG swap pointer can thereby be found.

Subsequently, whether the target dispersion group (DG) is currently being increased or decreased is determined (step 3002). When the swap pointer is an invalid value, it can be determined that the target dispersion group (DG) is not being increased or decreased.

In step 3002, when it is determined that the target dispersion group (DG) is not being increased or decreased, the microprocessor 121 implements the VP/PV conversion with the V2P/P2V (Target) (step 3011), and then ends the processing.

Meanwhile, in step 3002, when it is determined that the target dispersion group (DG) is being increased or decreased, the microprocessor 121 determines whether the target conversion operation is a VP conversion or a PV conversion (3003).

In step 3003, when it is determined as being the VP conversion, the microprocessor 121 refers to the V2P (Current) table, the microprocessor 121 calculates the PPG#, P Cycle (b) from the VPG#, V Cycle# (a) (step 3004), and calculates the PPG#, P Cycle (b) to the VPG#, V Cycle# (c) from the P2V (Target) table (step 3005).

By using the input of (a) and (c) calculated in the foregoing step, whether the values of both (a) and (c) are after the DG swap pointer is determined (step 3009). Specifically, the LBA address of the DG swap pointer is compared with the value of the LBA of (a) and (c) calculated from the V cycle# of (a) and (c) and the LBA of the input value (corresponds to the LBA in the swap source and swap destination VPG), and the conditions of step 3009 are satisfied when the values of both (a) and (c) are greater than the LBA address of the DG swap pointer.

When the determination in step 3009 is affirmative, the microprocessor 121 refers to the V2P/P2V (Current) table and implements the VP/PV conversion (step 3011). In other words, (b) is returned as the result. When the determination in step 3009 is negative, the microprocessor 121 refers to the V2P/P2V (Target) table and implements the VP/PV conversion (step 3010), and then ends the processing. In other words, the PPG#, P Cycle#(d) are calculated from (a) by using the V2P (Target), and returned as the result.

Moreover, in step 300, when it is determined as being the PV conversion, the microprocessor 121 calculates the VPG#, V Cycle (a) from the PPG#, P Cycle# (b) with the P2V (Current) (step 3006), calculates the PPG#, P Cycle# (d) from the VPG#, V Cycle (a) with the V2P (Target) (step 3007), calculates the VPG#, V Cycle (c) from the PPG#, P Cycle# (d) with the P2V (Current) (step 3008), and then proceeds to step 3009. As the subsequent processing, when the microprocessor 121 proceeds to step 3010, (c) is used as the result, and, when the microprocessor 121 proceeds to step 3011, (a) is used as the result and the processing is ended.

Details of the parcel rebalance processing in the computer system are now explained. The parcel rebalance processing is the processing of changing the data location of the parcel that is executed during the increase/decrease of the physical parity group (PPG) in the dispersion group (DG). This processing enables the implementation of the address conversion shown in FIG. 34 by destaging the data and advancing the swap pointer.

Figure 35:
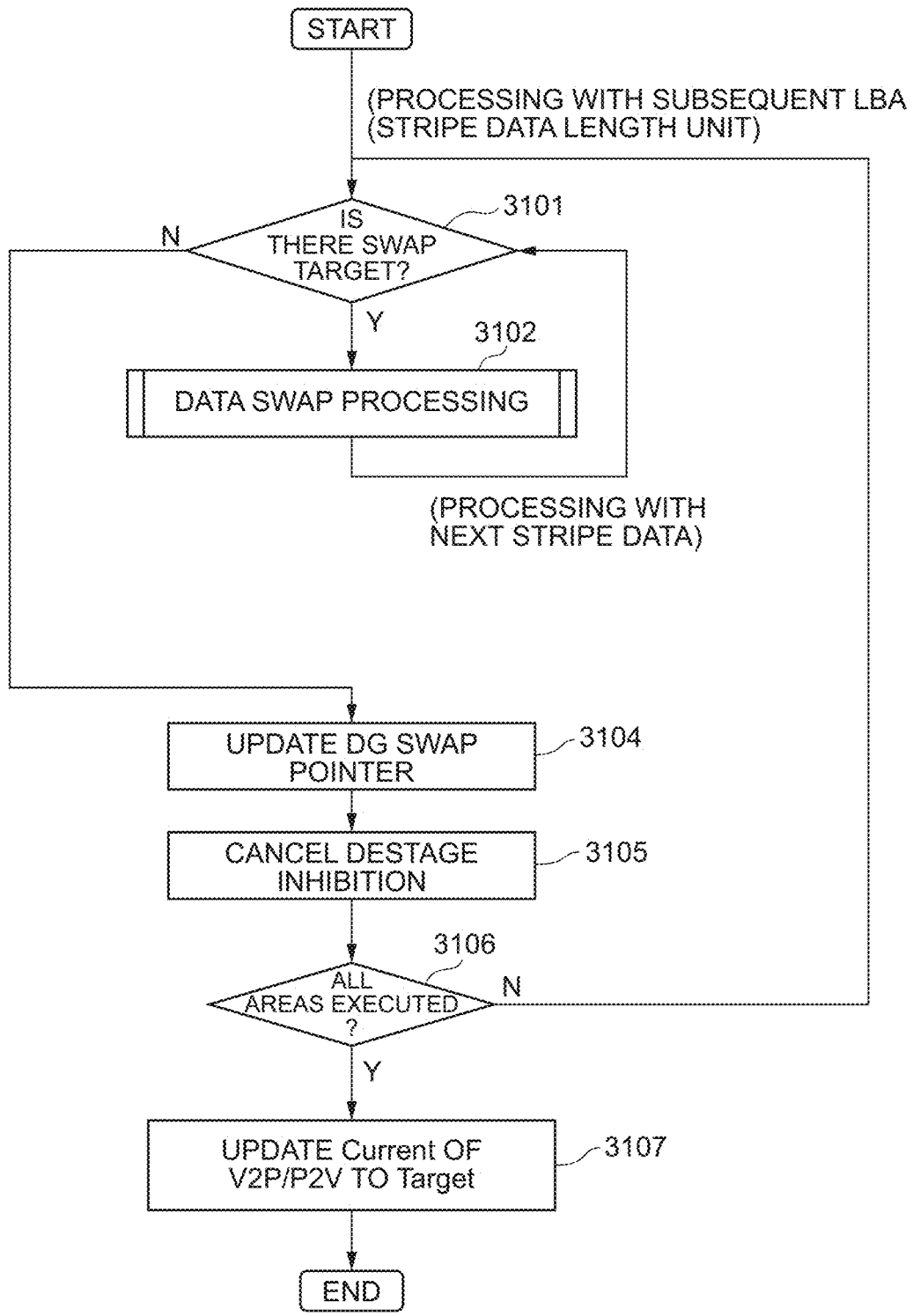
FIG. 35 is a flowchart showing the flow of parcel rebalance processing according to the second embodiment.

As shown in FIG. 35, when this processing is started, whether the stripe data calculated from the DG swap pointer of the dispersion group (DG) is to be swapped is determined (step 3101). Specifically, for instance, when the PPG#0, 1, 2 exist in the dispersion group (DG) and the PPG#3 is to be increased, the difference in the parcel mapping of the PPG space of the assignment destination by referring to the Current and Target V2P tables with the target stripe data (regarding all drives of PPG#0, 1, 2, 3).

In step 3101, when there is a difference in the parcel mapping and it is not yet a swap target, the data swap processing is executed upon designating the different VPG#, VCDEV#, stripe data location (LBA in VCDEV or the like) (step 3102). Specifically, the data location in the virtual parity group (VPG) of the relation of (a) and (c) calculated in FIG. 34 above is designated with a pair.

Subsequently, the subsequent stripe data is sequentially processed upon returning to step 3101. When the determination in step 3101 is negative, the microprocessor 121 updates the DG swap pointer (step 3104). Here, one stripe data worth of blocks is added to the swap pointer.

In addition, when the destage inhibition setting is being implemented during the implementation of step 3102, the microprocessor 121 cancels such destage inhibition setting (step 3105). Subsequently, whether all areas have been executed is determined (step 3106). Specifically, whether the value of the DG swap pointer has reached the tail end of the drive is determined.

In step 3106, when it is determined that all areas have not been executed, the microprocessor 121 returns to step 3101, and executes the processing once again to the subsequent LBA (to be advanced in stripe data units). Meanwhile, in step 3106, when it is determined that all areas have been executed, the microprocessor 121 copies the Current mapping information of the V2P/P2V to the Target mapping information (step 3107), and then ends the processing.

Details of the data swap processing in the computer system are now explained. The data swap processing is the processing that is executed from the parcel rebalance processing, and is the processing for swapping the stripe data in the parcel. Swap processing is, specifically, the processing of switching the stripe data in the parcels of two physical PPG addresses corresponding to the two VPG addresses based on data copy and mapping change.

Here, since the mapping and data are simultaneously switched, when viewed from the virtual parity group 2 (VPG) space, the correspondence relation of the data and address will not change. In fact, with this processing, the stripe data pair in the parcels to be swapped is staged, but when the staging processing is multiplexed via pre-fetch processing or the like, the time required for the increase/decrease can be further shortened.

Figure 36:
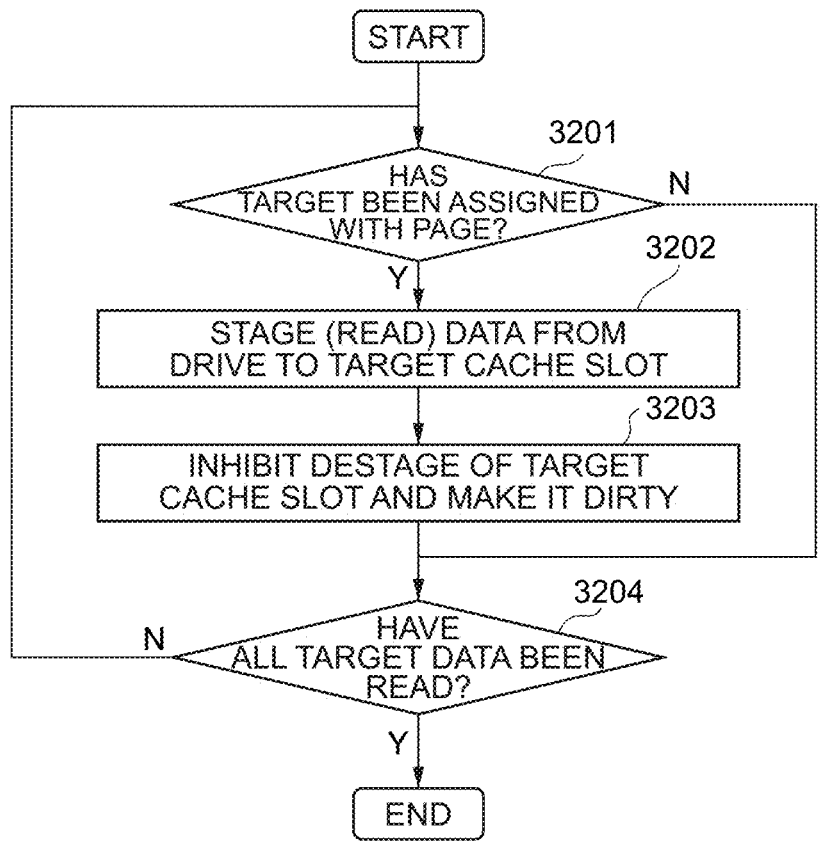
FIG. 36 is a flowchart showing the flow of data swap processing according to the second embodiment.

The data swap processing uses the two VPG space addresses (swap source, swap destination) as the inputs as described above. As shown in FIG. 36, when this processing is started, the microprocessor 121 executes the processing from step 3201 regarding the designated swap source and swap destination, one by one. The microprocessor 121 determines whether a page has been assigned to the swap-target address (step 3201). Specifically, the microprocessor 121 determines whether a page has been assigned by referring to the page mapping table 705.

In step 3201, when it is determined that a page has not been assigned, since the physical area thereof is in an unused state and the data copy can be omitted during the swap, the microprocessor 121 proceeds to the processing of step 3204. Meanwhile, in step 3201, when it is determined that a page has been assigned, the microprocessor 121 implements data staging (reading) from the drive to the target cache slot (step 3202). The cache slot corresponding to the virtual volume area corresponding to that page can be distinguished by referring to the cache management table. Similar to the case of data reading of the host I/O processing, based on the pre-swap LP address conversion, the drive area on the corresponding PPG# is identified, and data is read into the foregoing cache slot.

Subsequently, the microprocessor 121 inhibits the destaging of the target cache slot, and makes it dirty (step 3203). Destage inhibition is the function of inhibiting the reflection processing (collective write processing) from the cache data to the drive. As a result of turning ON the destage inhibition flag 1108 of the cache management table, the destage inhibition is enabled. Moreover, to make certain data dirty represents that the data in the cache is new, and becomes the target of the data write processing to the drive in the collective write processing. Specifically, data can be made dirty by setting all BITs of the dirty bitmap of the cache management table to "1".

Subsequently, the microprocessor 121 determines whether all target data have been read (step 3204). In step 3204, whether all data have been read is determined regarding the two VPG addresses designated in this processing. In step 3204, when it is determined that there is data that has not yet been read, the microprocessor 121 executes the processing of step 3201 onward to the address of the target virtual parity group (VPG). Meanwhile, in step 3204, when it is determined that all data have been read, the microprocessor 121 ends the processing.

Details of the increase-based parcel change mapping determination processing in the computer system are now explained. This processing is the processing of generating the temporary Current parcel mapping (P2V, V2P) of the increase-target VPG and PPG during the increase and the Target parcel mapping (P2V, V2P) after the increase upon increasing the physical parity group (PPG) in the dispersion group (DG).

Figure 37:
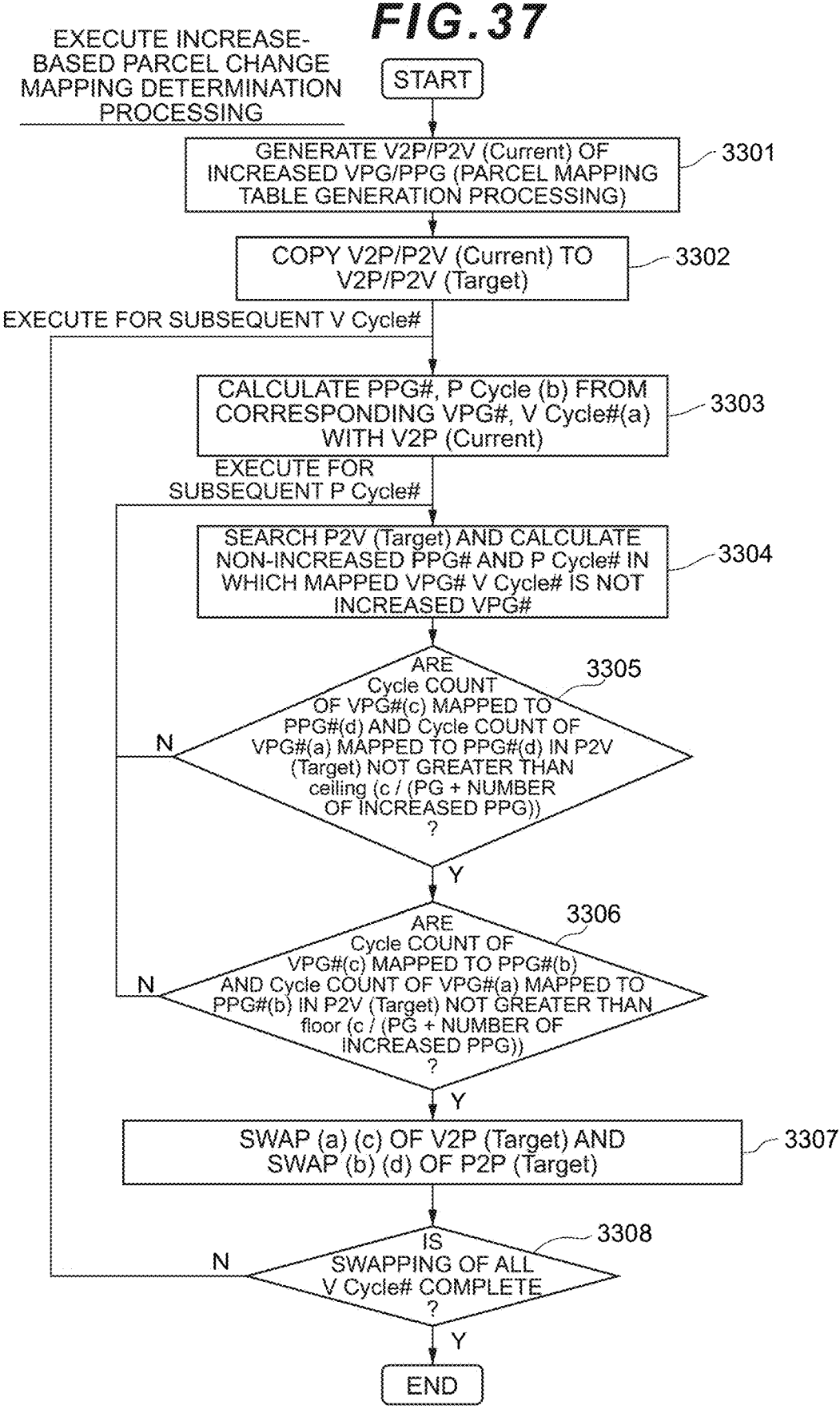
FIG. 37 is a flowchart showing the flow of increase-based parcel change mapping determination processing according to the second embodiment.

As shown in FIG. 37, when this processing is started, the microprocessor 121 generates the V2P/P2V (Current) of the increased VPG/PPG based on the parcel mapping table generation processing (step 3301). This mapping is temporary mapping processing to enable to the use of the physical capacity of the increased PPG even during the increase.

Subsequently, the microprocessor 121 copies the V2P/P2V (Current) to the V2P/P2V (Target) (step 3302). This processing is the advance preparation for generating the Target mapping in the subsequent processing. The subsequent processing is comprehensively executed to each V Cycle# of each increased virtual parity group (VPG).

Foremost, the microprocessor 121 refers to the V2P (Current) table, and calculates the PPG#, P Cycle (b) from the VPG#, V Cycle# (a) (step 3303). The subsequent processing is comprehensively executed to each P Cycle# of each increased PPG.

Subsequently, the microprocessor 121 searches the P2V (Target), and calculates the non-increased PPG# and P Cycle# (d) in which the mapped VPG# V Cycle#(c) is not the increased VPG# (step 3304). The microprocessor 121 thereafter determines whether the number of cycles of the VPG#(c) mapped to the PPG#(d) in the P2V (Target) and the number of cycles of the VPG#(a) mapped to the PPG#(d) are not greater than the ceiling (c/(PG+number of increased PPG)) (step 3305). The significance of this determination is, upon changing the mapping, to maintain the distribution level of data placement to the respective PPG to be constant when viewed from the VPG even after the change of the mapping.

In step 3305, when it is determined that the number of cycles is greater than the ceiling (c/(PG+number of increased PPG)), since the placement will not enable the balancing level to be maintained at a constant level, the microprocessor 121 returns to the processing of step 3304 in order to find another swap destination. Meanwhile, in step 3305, when the number of cycles is determined to be not greater than the ceiling (c/(PG+number of increased PPG)), since the placement enables the balancing level to be maintained at a constant level, the microprocessor 121 executes the processing of step 3306.

Subsequently, the microprocessor 121 determines whether the number of cycles of the VPG#(c) mapped to the PPG#(b) and the number of cycles of the VPG#(a) mapped to the PPG#(b) in the P2V (Target) are not greater than the floor (c/(PG+number of increased PPG)) (step 3306). The determination in step 3306 aims, as with foregoing step 3305, upon changing the mapping, to maintain the distribution level of data placement to the respective physical parity groups (PPG) to be constant when viewed from the virtual parity group (VPG) even after the change of the mapping.

In step 3306, when it is determined that the number of cycles is greater than the floor (c/(PG+number of increased PPG)), since the placement will not enable the balancing level to be maintained at a constant level, the microprocessor 121 returns to the processing of step 3304 in order to find another swap destination. Meanwhile, in step 3306, when the number of cycles is determined to be not greater than the floor (c/(PG+number of increased PPG)), since the placement enables the balancing level to be maintained at a constant level, the microprocessor 121 executes the processing of step 3307.

Subsequently, the microprocessor 121 swaps (a) and (c) of the V2P (Target), and (b) and (d) of the P2P (Target) (step 3307).

Subsequently, the microprocessor 121 determines whether the swap is complete regarding all V cycle# (step 3308). In step 3308, when it is determined that the swap is not complete, the microprocessor 121 executes the processing of step 3303 onward regarding the V Cycle# of the subsequent increase-target VPG#. Meanwhile, in step 3308, when the swap is completed (Y in step 3308), the microprocessor 121 ends the processing.

Basically, the V2P/P2V target table is determined based on the foregoing processing. In this processing, there are two loops; namely, the loop that is started in step 3303 and the loop that is started in step 3304, and, in step 3304, considered may be a case where it is not possible to fine a VPG# V Cycle#(c) that will enable the routine to proceed to step 3307. In the foregoing case, in the loop that is started from step 3303, it is necessary to try various combinations for the order of selection upon selecting the VPG#, V Cycle# (a). Moreover, in the loop that starts from step 3304 also, it is necessary to find the appropriate placement by trying various combinations for the order of selection upon selecting the PPG# and P Cycle# (d).

Details of the decrease-based parcel change mapping determination processing of the computer system in this embodiment are now explained. This processing is the processing of generating the Target parcel mapping (P2V, V2P) after the decrease upon decreasing the physical parity group (PPG) in the dispersion group (DG).

Figure 38:
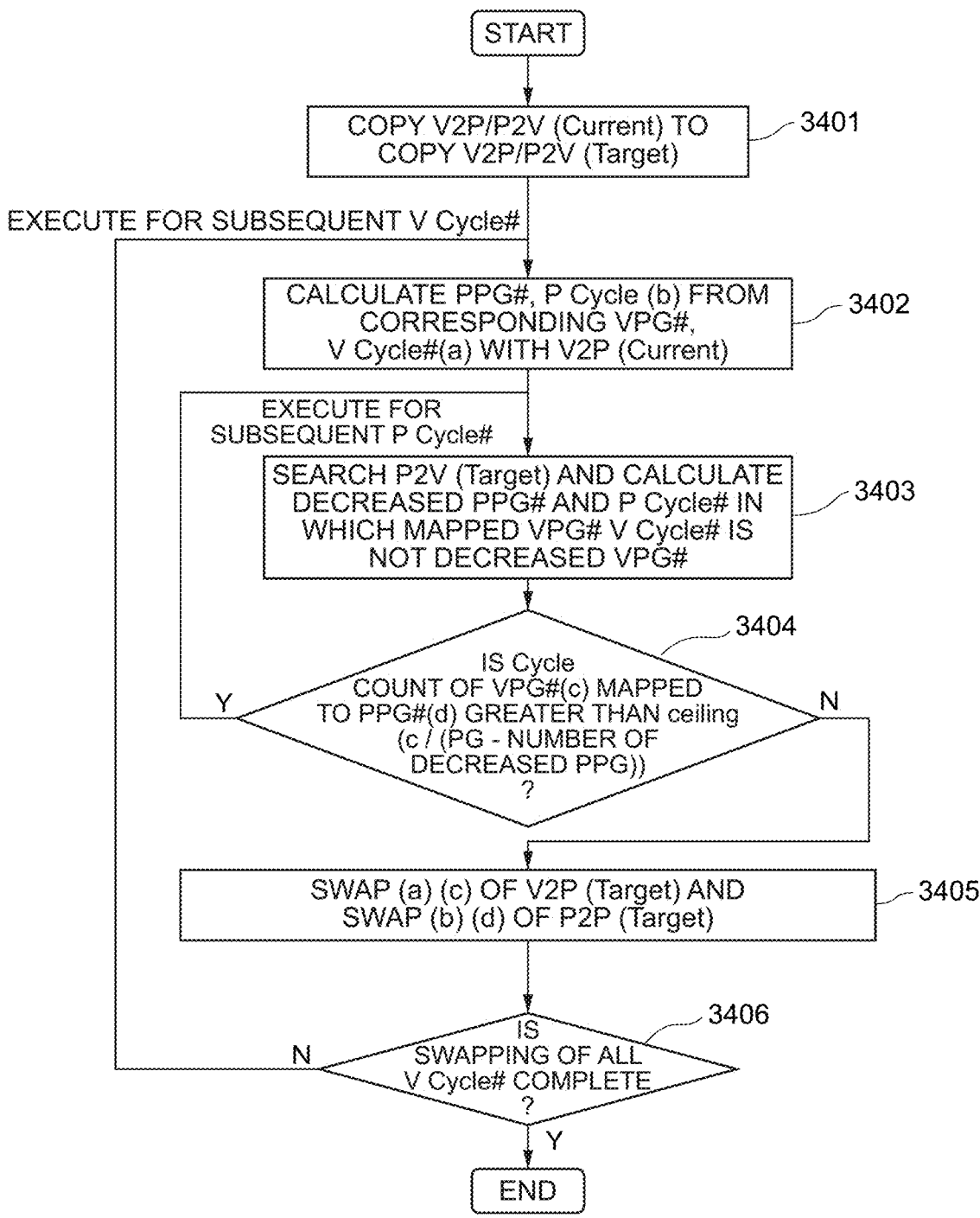
FIG. 38 is a flowchart showing the flow of decrease-based parcel change mapping determination processing according to the second embodiment.

As shown in FIG. 38, when this processing is started, the microprocessor 121 copies the V2P/P2V (Current) to the V2P/P2V (Target) (step 3401). This processing is the advance preparation for generating the Target mapping in the subsequent processing. The subsequent processing is comprehensively executed to each V Cycle# of each increased/decreased virtual parity group (VPG).

Foremost, the microprocessor 121 refers to the V2P (Current) table, and calculates the PPG#, P Cycle (b) from the VPG#, V Cycle# (a) (step 3402). The subsequent processing is comprehensively executed to reach P Cycle# of each increased PPG.

Subsequently, the microprocessor 121 searches the P2V (Target), and calculates the non-decreased PPG# and P Cycle# (d) in which the mapped VPG# V Cycle#(c) is not the decreased VPG# (step 3304). The microprocessor 121 thereafter determines whether the number of cycles of the VPG#(a) mapped to the PPG#(d) in the P2V (Target) is not greater than the ceiling (c/(PG−number of decreased PPG)) (step 3404). The significance of this determination is, upon changing the mapping, to maintain the distribution level of data placement to the respective physical parity groups (PPG) to be constant when viewed from the virtual parity group (VPG) even after the change of the mapping.

In step 3404, when it is determined that the number of cycles is not greater than the ceiling (c/(PG−number of decreased PPG)), since the placement will not enable the balancing level to be maintained at a constant level, the microprocessor 121 returns to the processing of step 3402 in order to find another swap destination. Meanwhile, in step 3404, when the number of cycles is determined to be greater than the ceiling (c/(PG+number of increased PPG)), since the placement enables the balancing level to be maintained at a constant level, the microprocessor 121 executes the processing of step 3405.

Subsequently, the microprocessor 121 swaps (a) and (c) of the V2P (Target), and swaps (b) and (d) of the P2P (Target) (3405).

Subsequently, the microprocessor 121 determines whether the swap is complete regarding all V cycle# (step 3406). In step 3406, when it is determined that the swap is not complete, the microprocessor 121 executes the processing of step 3303 onward regarding the V Cycle# of the subsequent decrease-target VPG#. Meanwhile, in step 3406, when it is determined that the swap is completed, the microprocessor 121 ends the processing.

Basically, the V2P/P2V target table is determined based on the foregoing processing. In this processing, there are two loops; namely, the loop that is started in step 3402 and the loop that is started in step 3403, and, in step 3403, considered may be a case where it is not possible to fine a VPG# V Cycle#(c) that will enable the routine to proceed to step 34057. In the foregoing case, in the loop that is started from step 3402, it is necessary to try various combinations for the order of selection upon selecting the VPG#, V Cycle# (a). Moreover, in the loop that starts from step 3403 also, it is necessary to find the appropriate placement by trying various combinations for the order of selection upon selecting the PPG# and P Cycle# (d).

Details of the page rebalance processing of the computer system according to this embodiment are now explained. The page rebalance processing is the processing for changing the placement of the pages in the virtual parity group (VPG) upon increasing/decreasing the physical parity group (PPG) in the dispersion group (DG). When the page rebalance processing is executed, the processing shown in FIG. 39 is sequentially executed to the respective pages of the respective virtual volumes (VVOL) in the target pool.

Figure 39:
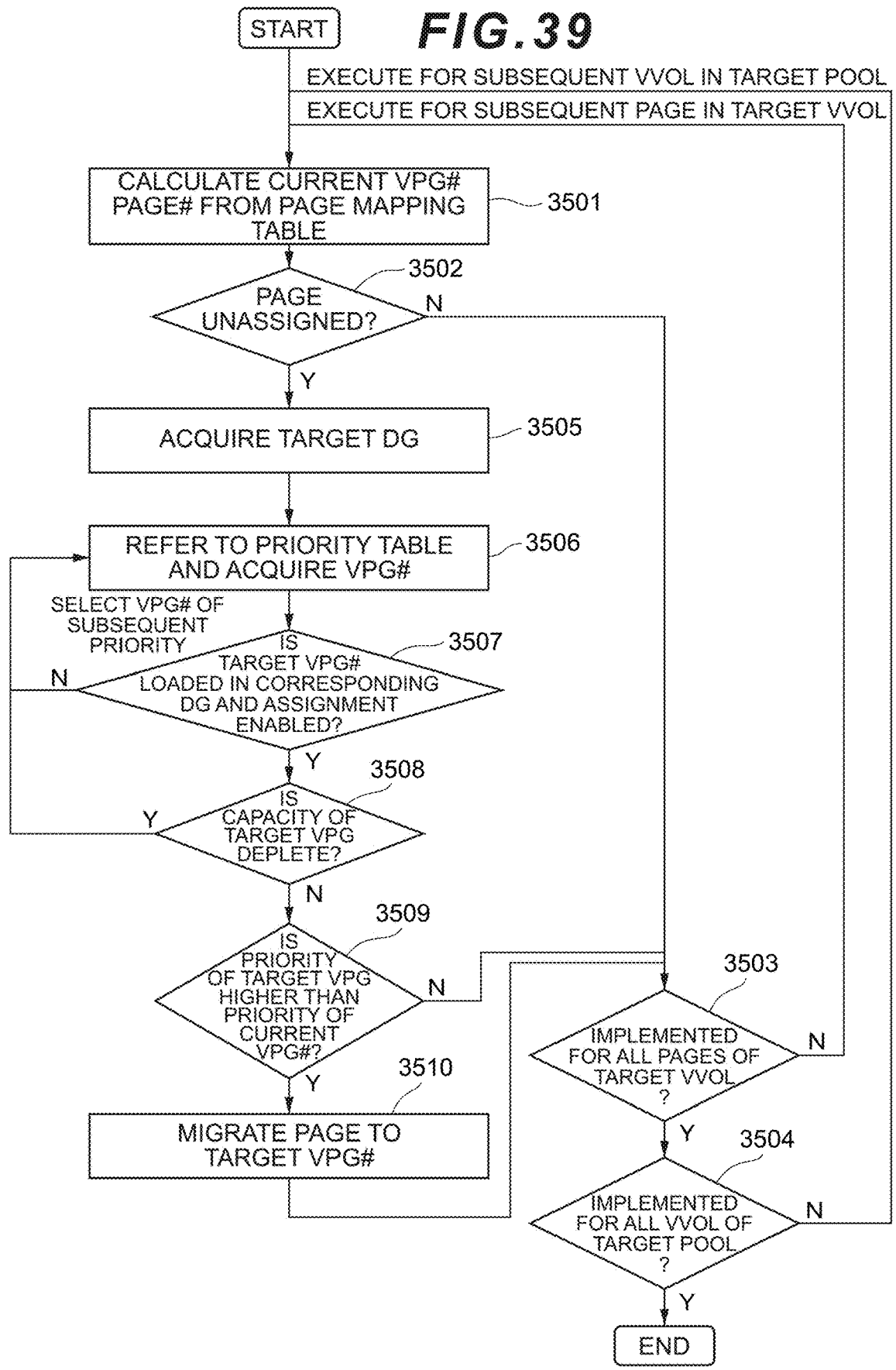
FIG. 39 is a flowchart showing the flow of page rebalance processing according to the second embodiment.

As shown in FIG. 39, the microprocessor 121 refers to the page mapping table 705 regarding those pages, and calculates the current virtual parity group number (VPG#) and page# (step 3501). Subsequently, the microprocessor 121 determines whether the page has not yet been assigned (step 3502).

The microprocessor 121 can determines whether a page has not yet been assigned based on the processing of step 3501. In step 3502, when it is determined that a page has not yet been assigned, the microprocessor 121 proceeds to step 3503. Meanwhile, when it is determined that a page has been assigned, the microprocessor 121 acquires the target dispersion group (DG) (step 3505). Specifically, the microprocessor 121 refers to the pool management table 701 and acquires the dispersion group (DG) belonging to that virtual parity group (VPG).

Subsequently, the microprocessor 121 refers to the priority table 706, and acquires the virtual parity group (VPG# (migration destination candidate)) with the highest priority (step 3506). The microprocessor 121 thereafter determines whether the target virtual parity group (VPG#) is loaded in the dispersion group (DG) and whether a page can be assigned thereto (step 3507). Specifically, the microprocessor 121 makes the determination by determining whether the virtual parity group (VPG#) of the migration destination candidate belongs in the dispersion group (DG) of the pool management table.

Subsequently, in step 3507, when it is determined that the target virtual parity group (VPG#) is not loaded in the dispersion group (DG) and a page cannot be assigned thereto (N in step 3507), the microprocessor 121 refers to the priority table 706, selects the virtual parity group (VPG#) with the second highest priority, and repeats the subsequent processing.

Meanwhile, in step 3507, when it is determined that the target virtual parity group (VPG#) is loaded in the dispersion group (DG) and a page can be assigned thereto, the microprocessor 121 determines whether the capacity of the target virtual parity group (VPG) has become depleted (step 3508). This can be determined based on the number of unused pages of the page mapping table.

In step 3508, when it is determined that the capacity has become depleted, since it cannot become a migration destination candidate, the microprocessor 121 selects the VPG# with the next highest priority, and repeats the processing of step 3506 onward. Meanwhile, in step 3508, when it is determined that the capacity has not become depleted, the microprocessor 121 determines whether the priority of the virtual parity group (VPG) of the migration destination candidate is higher than the priority of the current virtual parity group (VPG#) (step 3509). Specifically, the microprocessor 121 refers to the priority table 706 and compares the priorities of the virtual parity groups.

In step 3508, when it is determined that the priority of the migration destination candidate is not high, since the migration of pages is not required, the microprocessor 121 executes the processing of step 3503 onward. Meanwhile, in step 3508, when it is determined that the priority of the migration destination candidate is high, the microprocessor 121 migrates the page to the target virtual parity group (VPG#) (step 3510). Specifically, the page of the virtual parity group (VPG) of the mapping destination of the virtual page of the page number corresponding to that virtual volume is migrated from the migration source to the migration destination (the page mapping table is updated). Data is simultaneously copied.

Subsequently, the microprocessor 121 determines whether all pages of the target virtual volume (VVOL) have been processed (step 3503). In step 3503, when it is determined that all pages have not yet been processed, the microprocessor 121 executes the processing of step 3501 onward to the subsequent page. Meanwhile, in step 3503, when it is determined that all pages have been processed, the microprocessor 121 determines whether all virtual volumes (VVOL) of the target pool have been processed (3504). In step 3504, when it is determined that all virtual volumes have not yet been processed, the microprocessor 121 executes the processing of step 3501 onward to the subsequent virtual volume (VVOL) in the target pool. Meanwhile, in step 3504, when it is determined that all virtual volumes have been processed, the microprocessor 121 ends this processing.

Figure 40A:
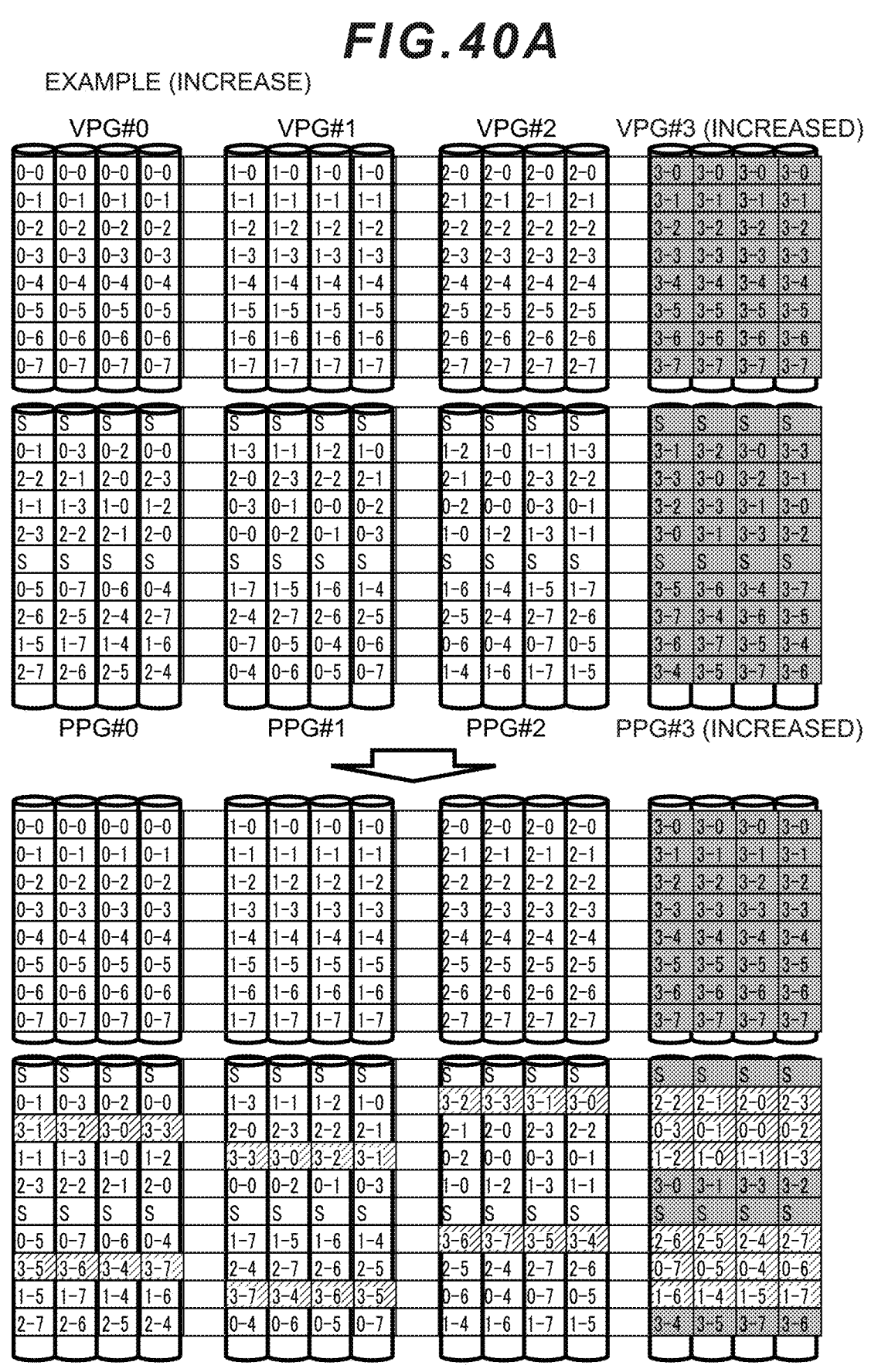
Figure 40B:
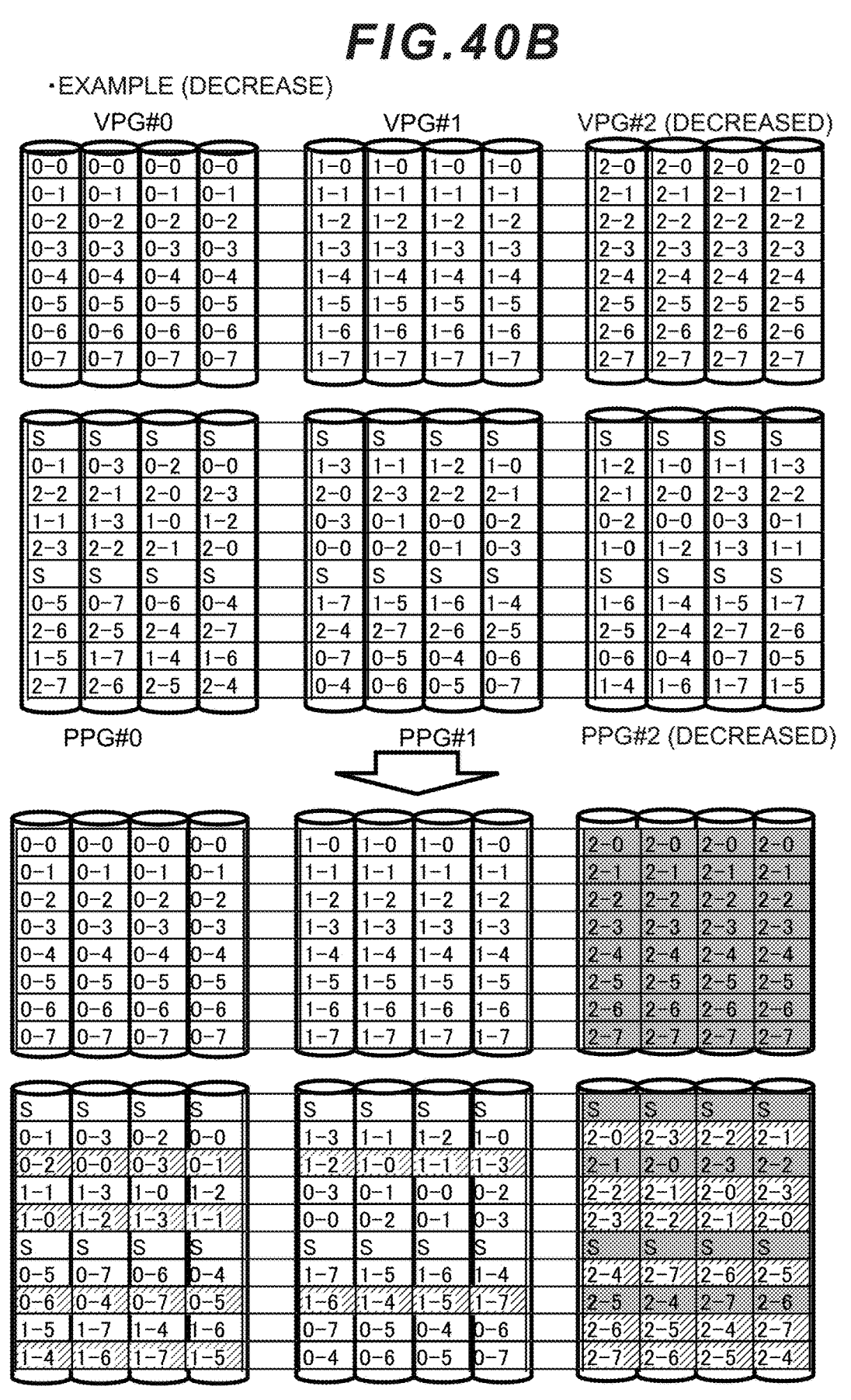

FIGS. 40A and 40B are conceptual diagrams showing a modified example of the parcel mapping upon the increase/decrease of the dispersion group (DG) of the computer system according to this embodiment.

FIG. 40A shows an example of the increase of three physical parity groups (PPG) and virtual parity groups (VPG) relative to the example of N=4 (four drives), c=4 (four parcels), PG=3 (PG represents the number of physical parity groups in the dispersion group (DG)) shown in FIG. 29A to FIG. 29C. The upper diagram of FIG. 40A shows the mapping before the increase, and corresponds to the current V2P table. The lower diagram of FIG. 40A shows the mapping after the increase, and corresponds to the target V2P table.

The shaded portion of FIG. 40A is the temporary, current V2P mapping that was generated during the start of increase. At the start of increase, it can be seen that the mapping of the VPG#3 is closed in the PPG#3. Meanwhile, the portion shown with the diagonal lines in FIG. 40A shows that, after the increase is complete, the mapping of the VPG#3 is mapped to the overall physical parity group (PPG), and the mapping of a part of the VPG#0 to 2 is mapped to the PPG#3.

Moreover, FIG. 40B shows an example of the decrease of two physical parity groups (PPG) and virtual parity groups (VPG) relative to the example of N=4 (four drives), c=4 (four parcels), PG=3 (PG represents the number of physical parity groups in the dispersion group (DG)) shown in FIG. 29A to FIG. 29C. The upper diagram of FIG. 40B shows the mapping before the decrease, and corresponds to the current V2P table. The lower diagram of FIG. 40B shows the mapping after the decrease, and corresponds to the target V2P table.

The shaded portion of the lower diagram of FIG. 40B is the decrease-target data. In FIG. 40B, operation of the parcel rebalance is explained, but during decrease, since the page rebalance is performed before this parcel rebalance, it can be expected that a page has not yet been assigned to the area of this gray portion. Accordingly, since the area that was previously assigned as the VPG#2 is unused, the PPG#2 can be made empty by copying the parcel of the VPG#0, 1 that were assigned to the PPG#2 to the area (unused) of the PPG 0 and PPG 1 that were assigned as the VPG#2.

The foregoing copy-target parcels are shown with diagonal lines. In the final state, since only the area of the VPG#2 is assigned to the PPG#2, it is unused, and can therefore be physically separated (decreased) from the dispersion group (DG).

As explained above, with the increase/decrease method of this embodiment, since two types of mapping tables are used and the data is relocated while updating the DG swap pointer, the drives can be increased or decreased while continuing the host I/O processing.

Moreover, when viewing the physical parity group (PPG) space upon increasing or decreasing the drive, it can be seen that the migration of data between the respective PPG# is being conducted in P chunk units. The reason why this can be realized is because the V chunk# that appear in the same PCDEV# will not overlap based on the operation using the SEED table. In other words, since the V chunk# that appear in the same PCDEV# will not overlap, the parcels of the same V chunk# will not appear in the same physical drive. The redundancy of data can thereby be maintained.

Moreover, when complete fixed mapping is performed during the increase or decrease of drives, there is a problem in that the amount of data to be migrated will increase in accordance with the size before the increase during the balancing process such as the parcel rebalance. Nevertheless, according to the method of this embodiment, without having to replace all parcels, the amount of migration thereof will be constant without dependence on the size of the pool (number of PPGs) before the increase. Specifically, the parcel rebalance can be completed with the data swap in the amount of the increased capacity even at maximum, and the page rebalance can also be completed with the data swap in the amount of the increased capacity.

In addition, with the increase/decrease method of this embodiment, since the physical parity group (PPG) to be assigned to the virtual parity group (VPG) is distributed via parcel rebalance, the host I/O load to the virtual volumes can be distributed to the respective drives upon completion of the increase/decrease. Since the load balancing can be realized with the overall pool, a complicated performance design is not required.

In addition, based on the increase method of the present invention, the probability of data loss itself can be reduced in comparison to conventional RAID (increase units configure independent parity groups) when the redundancy level is 2 or more. Conventionally, with RAID, the probability of data loss increased proportionately after the increase, but when the technology of the present invention is used when the redundancy level is 2 or more, the number of drives that may malfunction can be reduced while speeding up the rebuilding processing, and, therefore, if the number of PGs considerably exceeds c, constant reliability can be generally maintained regardless of the size.

In addition, with the increase method of this embodiment, even if data loss occurs, the locality of the range of the virtual volume that is affected can be improved, and the number of virtual volumes requiring overall restoration can be reduced. Moreover, it is possible to considerably shorten the data copy time required for the recovery, and the availability of the overall information system can be improved.

While the preferred embodiments of the present invention were explained in detail above with reference to the appended drawings, the present invention is not limited to the foregoing examples. It is evident that a person with common knowledge in the technical field to which this invention belongs can conceive various modified examples or revised examples within the scope of the technical concepts described in the scope of claims, and it should be understood that such modified examples and revised examples also fall within the technical scope of the present invention as a matter of course.

REFERENCE SIGNS LIST

10 host
20 management server
30 network
40 external storage apparatus
100 higher-level storage apparatus
180 lower-level storage apparatus
201 virtual volume
204 virtual parity group
205 physical parity group
400 virtual chunk
500 physical chunk

The invention claimed is:

1. A storage system comprising
a plurality of first storage devices, and
a control unit coupled to the plurality of first storage devices, wherein
the control unit is configured to:
form a pool area, which comprises a plurality of virtual parity groups, based on a storage area of the plurality of first storage devices, manage a mapping which comprises associations between the plurality of virtual parity groups and the plurality of first storage devices, store, when storing a first data set in a first virtual parity group, the first data set in the plurality of first storage devices associated with the first virtual parity group, wherein the first data set comprises a plurality of first data elements whose number is a predetermined number, and the first data elements are a plurality pieces of data and one or more pieces of redundant data and are respectively stored in different multiple storage devices, and when a set of second storage devices is added, form an additional pool area, which comprises an additional virtual parity group, based on the added set of second storage devices, migrate at least one data element of the first data set of the first virtual parity group to the added set of second storage devices and not migrate at least one other data element of the first data set to the added set of second storage devices, and change a part of associations for the first data set in order to associate a part of the first virtual parity group with a part of the added set of second storage devices instead of a part of the first storage devices, and maintain another part of the associations of the first virtual parity group with the first storage devices.

2. The storage system according to claim 1, wherein the control unit is configured to associate at least a part of the additional virtual parity group with the first storage devices.

3. The storage system according to claim 1, wherein the control unit is configured to associate the additional virtual storage group with the added set of second storage devices when the additional pool area is formed, and change, after the additional pool area is formed, associations among the additional virtual parity group, the added set of second storage devices, the plurality of virtual parity groups which existed before the additional virtual parity group is added, and the first storage devices.

4. The storage system according to claim 1, wherein the control unit is configured to, when a virtual parity group and a plurality of storage devices are removed, associate a part of virtual parity groups other than a target virtual volume which is related to the virtual parity group to be removed with storage devices other than target storage devices which are the storage devices to be removed, migrate data sets from the target virtual parity group and the target storage devices to the virtual parity groups other than the target virtual parity group and the storage devices other than the target storage devices.

5. A storage control method comprising forming a pool area, which comprises a plurality of virtual parity groups, based on a storage area of a plurality of first storage devices, managing a mapping which comprises associations between the plurality of virtual parity groups and the plurality of first storage devices, storing, when storing a first data set in a first virtual parity group, the first data set in the plurality of first storage devices associated with the first virtual parity group, wherein the first data set comprises a plurality of first data elements whose number is a predetermined number, wherein the first data elements are a plurality pieces of data and one or more pieces of redundant data and are respectively stored in different multiple storage devices in the plurality of first storage devices, and when a set of second storage devices are added, forming an additional pool area, which comprises an added virtual parity group, based on the added set of second storage devices, migrating at least one data element of the first data set of the first virtual parity group to the added set of second storage devices and not migrate at least one other data element of the first data set to the added set of second storage devices, and changing a part of associations for the first data set in order to associate a part of the first virtual parity group with a part of the added set of second storage devices instead of a part of the first storage devices, and maintain another part of the associations of the first virtual parity group with the first storage devices.

* * * * *